United States Patent
Raterman et al.

(10) Patent No.: US 7,672,499 B2
(45) Date of Patent: Mar. 2, 2010

(54) METHOD AND APPARATUS FOR CURRENCY DISCRIMINATION AND COUNTING

(75) Inventors: Donald R. Raterman, Deerfield, IL (US); Bradford T. Graves, Arlington Heights, IL (US); Lars R. Stromme, Arlington Heights, IL (US); Aaron M. Bauch, Boxborrow, MA (US)

(73) Assignee: Cummins-Allison Corp., Mt. Prospect, IL (US)

( * ) Notice: Subject to any disclaimer, the term of this patent is extended or adjusted under 35 U.S.C. 154(b) by 2223 days.

(21) Appl. No.: 10/163,757

(22) Filed: Jun. 6, 2002

(65) Prior Publication Data

US 2003/0108233 A1 Jun. 12, 2003
US 2005/0117791 A2 Jun. 2, 2005

Related U.S. Application Data

(63) Continuation of application No. 09/453,200, filed on Dec. 2, 1999, now Pat. No. 6,459,806, which is a continuation of application No. 08/841,203, filed on Apr. 29, 1997, now Pat. No. 6,028,951, which is a continuation of application No. 08/339,337, filed on Nov. 14, 1994, now Pat. No. 5,692,067, which is a continuation of application No. 08/127,334, filed on Sep. 27, 1993, now Pat. No. 5,467,405, which is a continuation of application No. 07/885,648, filed on May 19, 1992, now Pat. No. 5,295,196, which is a continuation-in-part of application No. 07/475,111, filed on Feb. 5, 1990, now abandoned.

(51) Int. Cl.
*G06K 9/00* (2006.01)

(52) U.S. Cl. .................... 382/135; 382/321

(58) Field of Classification Search ............. 382/135, 382/190, 218, 318–323; 194/206; 209/534; 256/71
See application file for complete search history.

(56) References Cited

U.S. PATENT DOCUMENTS 3,246,295 A 4/1966 DeClaris et al. ............. 382/56

(Continued)

FOREIGN PATENT DOCUMENTS

DE 2659929 C3 5/1976

(Continued)

OTHER PUBLICATIONS

'456 1$^{st}$ Reexam, U.S. Appl. No. 90/010,057: Form PTO/SB/57 Request for *Ex Parte* Reexamination Transmittal Form, 2 pages (Nov. 29, 2007).

(Continued)

*Primary Examiner*—Phuoc Tran
(74) *Attorney, Agent, or Firm*—Nixon Peabody LLP

(57) ABSTRACT

A U.S. currency evaluation device for receiving a stack of U.S. currency bills and rapidly evaluating all the bills in the stack. According to one embodiment the device comprises an input receptacle positioned to receive a stack of bills to be evaluated and at least one output receptacle positioned to receive bills after evaluation. A transport mechanism transports the bills, one at a time, from the input receptacle to the at least one output receptacle. The device also comprises a denomination discriminating unit adapted to denominate bills of a plurality of U.S. denominations. According to some embodiments, the device is adapted to deliver any bill that has been denominated to one and only one of the at least one output receptacle. According to some embodiments, the device has a single output receptacle.

110 Claims, 30 Drawing Sheets

U.S. PATENT DOCUMENTS

| | | | | |
|---|---|---|---|---|
| 3,280,974 A | 10/1966 | Riddle et al. | ............. | 209/111.8 |
| 3,409,109 A | 11/1968 | Lizuka et al | ................ | 194/207 |
| 3,480,785 A | 11/1969 | Aufderheide | ............... | 250/219 |
| 3,496,370 A | 2/1970 | Haville et al. | ................ | 250/219 |
| 3,509,535 A | 4/1970 | Berube | ....................... | 340/149 |
| 3,612,835 A | 10/1971 | Andrews et al. | ........ | 235/61.11 D |
| 3,618,765 A | 11/1971 | Cooper et al. | ................ | 209/534 |
| 3,679,314 A | 7/1972 | Mustert | ....................... | 356/71 |
| 3,771,783 A | 11/1973 | McInerny | .................... | 271/125 |
| 3,778,628 A | 12/1973 | Novak et al. | ................. | 250/556 |
| 3,842,281 A | 10/1974 | Goodrich | .................... | 250/461 |
| 3,870,629 A | 3/1975 | Carter et al. | ............. | 209/111.8 |
| 3,906,449 A | 9/1975 | Marchak | ................. | 340/149 R |
| 3,912,255 A | 10/1975 | McInerny | ..................... | 271/80 |
| 3,952,183 A | 4/1976 | Abe | ......................... | 235/92 SB |
| 3,976,198 A | 8/1976 | Carnes et al. | .......... | 209/111.7 T |
| 4,041,456 A | 8/1977 | Ott et al. | ................ | 340/146.3 R |
| 4,096,991 A | 6/1978 | Iguchi | ......................... | 235/419 |
| 4,114,804 A | 9/1978 | Jones et al. | ................. | 235/476 |
| 4,147,430 A | 4/1979 | Gorgone et al. | ................ | 356/51 |
| 4,166,945 A | 9/1979 | Inoyama et al. | ................ | 235/379 |
| 4,179,685 A | 12/1979 | O'Maley | ............ | 340/146.3 H |
| 4,237,378 A | 12/1980 | Jones | ......................... | 250/223 |
| 4,243,216 A | 1/1981 | Mazumder | ................... | 271/122 |
| 4,249,552 A | 2/1981 | Margolin et al. | ................. | 133/1 |
| 4,250,806 A | 2/1981 | Boyson et al. | .................. | 101/2 |
| 4,255,651 A | 3/1981 | Phillips | ........................ | 235/92 |
| 4,275,874 A | 6/1981 | DiBlasio | ........................ | 271/187 |
| 4,277,774 A | 7/1981 | Fujii et al. | ............... | 340/146.3 |
| 4,283,708 A | 8/1981 | Lee | ........................ | 340/146.3 Z |
| 4,288,781 A | 9/1981 | Sellner et al. | ................ | 358/486 |
| 4,296,326 A | 10/1981 | Haslop et al. | ................. | 250/372 |
| 4,302,781 A | 11/1981 | Ikeda et al. | .................. | 358/486 |
| 4,311,914 A | 1/1982 | Huber | ....................... | 250/556 |
| 4,313,598 A | 2/1982 | DiBlasio | ........................ | 271/124 |
| 4,334,619 A | 6/1982 | Horino et al. | ................. | 209/551 |
| 4,348,656 A | 9/1982 | Gorgone et al. | ........ | 340/146.3 R |
| 4,349,111 A | 9/1982 | Shah et al. | ................... | 209/534 |
| 4,352,988 A | 10/1982 | Ishida | ......................... | 250/559 |
| 4,355,300 A | 10/1982 | Webert | ................. | 340/146.3 C |
| 4,356,473 A | 10/1982 | Freudenthal | ......... | 340/146.3 H |
| 4,365,700 A | 12/1982 | Arimoto et al. | ................ | 194/2 |
| 4,381,447 A | 4/1983 | Horvath et al. | ............... | 250/223 |
| 4,386,432 A | 5/1983 | Nakamura et al. | ............. | 382/7 |
| 4,416,449 A | 11/1983 | McInerny | .................... | 271/122 |
| 4,420,153 A | 12/1983 | Winkler et al. | ............... | 271/304 |
| 4,442,541 A | 4/1984 | Finkel et al. | .................... | 382/7 |
| 4,461,028 A | 7/1984 | Okubo | ......................... | 382/15 |
| 4,464,786 A | 8/1984 | Nishito et al. | .................... | 382/7 |
| 4,464,787 A | 8/1984 | Fish et al. | ...................... | 382/7 |
| 4,474,365 A | 10/1984 | DiBlasio | ........................ | 271/3 |
| 4,480,177 A | 10/1984 | Allen | ......................... | 235/379 |
| 4,487,306 A | 12/1984 | Nao et al. | .................... | 382/135 |
| 4,490,846 A | 12/1984 | Ishida et al. | .................... | 382/7 |
| 4,490,847 A | 12/1984 | Aleksander et al. | ............ | 382/10 |
| 4,513,439 A | 4/1985 | Gorgone et al. | .................. | 382/7 |
| 4,532,641 A | 7/1985 | Nishimura | ..................... | 377/14 |
| 4,539,702 A | 9/1985 | Oka | ........................... | 382/7 |
| 4,542,829 A | 9/1985 | Emery et al. | ................ | 209/534 |
| 4,547,896 A | 10/1985 | Ohtombe et al. | ............ | 382/318 |
| 4,553,846 A | 11/1985 | Hilton et al. | ................ | 356/429 |
| 4,556,140 A | 12/1985 | Okada | ......................... | 194/4 |
| 4,557,597 A | 12/1985 | Iwama | ......................... | 356/71 |
| 4,558,224 A | 12/1985 | Gober | .................... | 250/460.1 |
| 4,559,451 A | 12/1985 | Curl | ......................... | 250/560 |
| 4,559,452 A | 12/1985 | Igaki et al. | .................. | 250/560 |
| 4,563,771 A | 1/1986 | Gorgone et al. | ................. | 382/7 |
| 4,567,370 A | 1/1986 | Falls | .................... | 250/461.1 |
| 4,587,412 A | 5/1986 | Apisdorf | ................... | 235/449 |
| 4,587,434 A | 5/1986 | Roes et al. | ................. | 250/556 |
| 4,588,292 A | 5/1986 | Collins | .................. | 250/556 X |
| 4,592,090 A | 5/1986 | Curl et al. | ....................... | 382/7 |
| 4,611,345 A | 9/1986 | Ohnishi et al. | ................. | 382/7 |
| 4,618,257 A | 10/1986 | Bayne et al. | ................... | 356/71 |
| 4,625,870 A | 12/1986 | Nao et al. | .................... | 209/534 |
| 4,628,194 A | 12/1986 | Dobbins et al. | ............. | 235/379 |
| 4,645,936 A | 2/1987 | Gorgone | ..................... | 250/556 |
| 4,650,320 A | 3/1987 | Chapman et al. | ............... | 356/71 |
| 4,653,647 A | 3/1987 | Hashioto | .................... | 209/534 |
| 4,677,682 A | 6/1987 | Miyaqawa et al. | ............. | 382/7 |
| 4,681,229 A | 7/1987 | Uesaka et al. | ................ | 209/534 |
| 4,690,268 A | 9/1987 | Ueshin | ...................... | 198/399 |
| 4,694,963 A | 9/1987 | Takesako | .................... | 209/534 |
| 4,697,071 A | 9/1987 | Hiraoka et al. | ............... | 235/379 |
| 4,700,368 A | 10/1987 | Munn et al. | .................... | 377/8 |
| 4,707,843 A | 11/1987 | McDonald | ....................... | 377/8 |
| 4,723,072 A | 2/1988 | Naruse | ...................... | 235/454 |
| 4,733,308 A | 3/1988 | Nakamura et al. | ........... | 358/496 |
| 4,737,627 A | 4/1988 | Hughes | ....................... | 250/223 |
| 4,747,492 A | 5/1988 | Saito et al. | .................. | 209/534 |
| 4,761,002 A | 8/1988 | Reed et al. | .................... | 271/111 |
| 4,764,725 A | 8/1988 | Bryce | ......................... | 324/234 |
| 4,764,976 A | 8/1988 | Kallin et al. | .................... | 382/65 |
| 4,787,518 A | 11/1988 | Yuge et al. | ................. | 209/534 |
| 4,820,909 A | 4/1989 | Kawauchi et al. | ............ | 235/379 |
| 4,823,393 A | 4/1989 | Kawakami | ..................... | 382/7 |
| 4,827,531 A | 5/1989 | Milford | ......................... | 382/7 |
| 4,830,742 A | 5/1989 | Takesako | .................... | 209/534 |
| 4,875,589 A | 10/1989 | Lacey et al. | ................. | 209/534 |
| 4,881,268 A | 11/1989 | Uchida et al. | ................... | 382/7 |
| 4,905,840 A | 3/1990 | Yuge et al. | ................. | 209/534 |
| 4,908,516 A | 3/1990 | West | ......................... | 250/556 |
| 4,922,109 A | 5/1990 | Bercovitz et al. | ............. | 250/556 |
| 4,973,851 A | 11/1990 | Lee | ........................... | 250/556 |
| 4,984,280 A | 1/1991 | Abe | ............................ | 382/7 |
| 4,992,860 A | 2/1991 | Hamaguchi et al. | ........... | 358/75 |
| 4,996,604 A | 2/1991 | Oqawa et al. | ............... | 358/486 |
| 5,020,787 A | 6/1991 | Arikawa | ........................ | 271/3 |
| 5,027,415 A | 6/1991 | Hara et al. | .................. | 382/135 |
| 5,047,871 A | 9/1991 | Meyer et al. | ................. | 358/486 |
| 5,051,900 A | 9/1991 | Ito et al. | ..................... | 364/408 |
| 5,054,621 A | 10/1991 | Murphy et al. | .............. | 209/534 |
| 5,055,834 A | 10/1991 | Chiba | ......................... | 382/135 |
| 5,068,519 A | 11/1991 | Bryce | ......................... | 235/449 |
| 5,076,441 A | 12/1991 | Gerlier | ...................... | 209/534 |
| 5,122,754 A | 6/1992 | Gotaas | ........................ | 324/676 |
| 5,163,672 A | 11/1992 | Mennie | ....................... | 271/187 |
| 5,167,313 A | 12/1992 | Dobbins et al. | ............. | 194/317 |
| 5,167,411 A | 12/1992 | Isobe | ......................... | 271/273 |
| 5,172,907 A | 12/1992 | Kalisiak | ..................... | 271/227 |
| 5,199,543 A | 4/1993 | Kamagami et al. | ........... | 194/207 |
| 5,201,395 A | 4/1993 | Takizawa et al. | ............. | 194/206 |
| 5,207,788 A | 5/1993 | Geib | ......................... | 271/122 |
| 5,220,395 A | 6/1993 | Yamashita et al. | .......... | 355/313 |
| 5,230,653 A | 7/1993 | Shinozaki et al. | ............... | 453/4 |
| 5,236,072 A | 8/1993 | Cargill | ...................... | 194/207 |
| 5,240,116 A | 8/1993 | Stevens et al. | .............. | 209/534 |
| 5,261,518 A | 11/1993 | Bryce | ......................... | 194/206 |
| 5,295,196 A | 3/1994 | Raterman et al. | ............... | 382/7 |
| 5,304,813 A | 4/1994 | DeMan | ....................... | 250/556 |
| 5,308,992 A | 5/1994 | Crane et al. | ................. | 250/556 |
| 5,309,515 A | 5/1994 | Troung et al. | .................. | 382/7 |
| 5,341,408 A | 8/1994 | Melcher et al. | ................ | 377/8 |
| 5,358,088 A | 10/1994 | Barnes et al. | ................ | 194/206 |
| 5,363,949 A | 11/1994 | Matsubayashi | ............. | 194/206 |
| 5,367,577 A | 11/1994 | Gotaas | ...................... | 382/135 |
| 5,397,003 A | 3/1995 | Stevens et al. | .............. | 209/534 |
| 5,430,664 A | 7/1995 | Cargill et al. | ................ | 364/550 |
| 5,437,357 A | 8/1995 | Ota et al. | .................... | 382/135 |
| 5,465,821 A | 11/1995 | Akioka | ....................... | 194/207 |
| 5,467,405 A | 11/1995 | Raterman et al. | .............. | 382/135 |
| 5,467,406 A | 11/1995 | Graves et al. | ................. | 382/135 |
| 5,478,992 A | 12/1995 | Hamada et al. | ............. | 235/379 |
| D369,984 S | 5/1996 | Larsen | ........................ | D10/97 |

| Patent No. | Date | Inventor | Class |
|---|---|---|---|
| 5,577,589 A | 11/1996 | Garcia Tinoco | 194/204 |
| 5,607,040 A | 3/1997 | Mathurin, Sr. | 194/207 |
| 5,633,949 A | 5/1997 | Graves et al. | 382/135 |
| 5,640,463 A | 6/1997 | Csulits | 382/135 |
| 5,652,802 A | 7/1997 | Graves et al. | 382/135 |
| 5,680,472 A | 10/1997 | Conant | 382/135 |
| 5,687,963 A | 11/1997 | Mennie | 271/119 |
| 5,692,067 A | 11/1997 | Raterman et al. | 382/135 |
| 5,704,491 A | 1/1998 | Graves | 209/534 |
| 5,724,438 A | 3/1998 | Graves | 382/135 |
| 5,751,840 A | 5/1998 | Raterman et al. | 382/135 |
| 5,790,693 A | 8/1998 | Graves et al. | 382/135 |
| 5,790,697 A | 8/1998 | Jones et al. | 382/135 |
| 5,806,650 A | 9/1998 | Mennie et al. | 194/206 |
| 5,815,592 A | 9/1998 | Mennie et al. | 382/135 |
| 5,822,448 A | 10/1998 | Graves et al. | 382/135 |
| 5,832,104 A | 11/1998 | Graves et al. | 382/135 |
| 5,867,589 A | 2/1999 | Graves et al. | 382/135 |
| 5,870,487 A | 2/1999 | Graves et al. | 382/135 |
| 5,875,259 A | 2/1999 | Mennie et al. | 382/135 |
| 5,905,810 A | 5/1999 | Jones et al. | 382/135 |
| 5,909,502 A | 6/1999 | Mazur | 382/135 |
| 5,909,503 A | 6/1999 | Graves et al. | 382/135 |
| 5,912,982 A | 6/1999 | Munro et al. | 382/135 |
| 5,938,044 A | 8/1999 | Weggesser | 209/534 |
| 5,940,623 A | 8/1999 | Watts et al. | 395/712 |
| 5,943,655 A | 8/1999 | Jacobsen | 705/30 |
| 5,960,103 A | 9/1999 | Graves et al. | 382/135 |
| 5,966,456 A | 10/1999 | Jones et al. | 382/135 |
| 5,982,918 A | 11/1999 | Mennie et al. | 382/135 |
| 5,992,601 A | 11/1999 | Mennie et al. | 194/207 |
| 6,012,564 A | 1/2000 | Mukai | 194/206 |
| 6,012,565 A | 1/2000 | Mazur | 194/207 |
| 6,026,175 A | 2/2000 | Munro et al. | 382/135 |
| 6,028,951 A | 2/2000 | Raterman et al. | 382/135 |
| 6,039,645 A | 3/2000 | Mazur | 453/10 |
| 6,068,194 A | 5/2000 | Mazur | 235/492 |
| 6,072,896 A | 6/2000 | Graves et al. | 382/135 |
| 6,073,744 A | 6/2000 | Raterman et al. | 194/207 |
| 6,074,334 A | 6/2000 | Mennie et al. | 493/438 |
| 6,128,402 A | 10/2000 | Jones et al. | 382/135 |
| 6,220,419 B1 | 4/2001 | Mennie | 194/207 |
| 6,234,294 B1 | 5/2001 | Defeo et al. | 194/207 |
| 6,237,739 B1 | 5/2001 | Mazur et al. | 194/207 |
| 6,241,069 B1 | 6/2001 | Mazur et al. | 194/207 |
| 6,256,407 B1 | 7/2001 | Mennie et al. | 382/135 |
| 6,278,795 B1 | 8/2001 | Anderson et al. | 382/135 |
| 6,311,819 B1 | 11/2001 | Stromme et al. | 194/207 |
| 6,318,537 B1 | 11/2001 | Jones et al. | 194/346 |
| 6,351,551 B1 | 2/2002 | Munro et al. | 382/135 |
| 6,363,164 B1 | 3/2002 | Jones et al. | 382/135 |
| 6,371,303 B1 | 4/2002 | Klein et al. | 209/534 |
| 6,378,683 B2 | 4/2002 | Mennie | 194/207 |
| 6,381,354 B1 | 4/2002 | Mennie et al. | 382/135 |
| 6,398,000 B1 | 6/2002 | Jenrick et al. | 194/200 |
| 6,459,806 B1 | 10/2002 | Raterman et al. | 382/135 |
| 6,460,705 B1 | 10/2002 | Hallowell | 209/534 |
| 6,493,461 B1 | 12/2002 | Mennie et al. | 382/135 |
| 6,539,104 B1 | 3/2003 | Raterman et al. | 382/135 |
| 6,560,355 B2 | 5/2003 | Graves et al. | 382/135 |
| 7,536,046 B2 | 5/2009 | Raterman et al. | 382/135 |
| 2001/0019624 A1 | 9/2001 | Raterman et al. | 382/135 |
| 2002/0001393 A1 | 1/2002 | Jones et al. | 382/100 |
| 2002/0020603 A1 | 2/2002 | Jones et al. | 194/346 |
| 2002/0056605 A1 | 5/2002 | Mazur et al. | 194/207 |
| 2002/0085245 A1 | 7/2002 | Mennie et al. | 358/498 |
| 2002/0085745 A1 | 7/2002 | Jones et al. | 382/135 |
| 2002/0103757 A1 | 8/2002 | Jones et al. | 705/45 |
| 2002/0104785 A1 | 8/2002 | Klein et al. | 209/534 |
| 2002/0107801 A1 | 8/2002 | Jones et al. | 705/45 |
| 2002/0118871 A1 | 8/2002 | Jones et al. | 382/13 |
| 2002/0122580 A1 | 9/2002 | Jones et al. | 382/137 |
| 2002/0126885 A1 | 9/2002 | Mennie et al. | 382/135 |
| 2002/0126886 A1 | 9/2002 | Jones et al. | 382/135 |
| 2002/0131630 A1 | 9/2002 | Jones et al. | 382/137 |
| 2002/0136442 A1 | 9/2002 | Jones et al. | 382/135 |
| 2002/0145035 A1 | 10/2002 | Jones | 235/379 |
| 2002/0154804 A1 | 10/2002 | Jones et al. | 382/135 |
| 2002/0154805 A1 | 10/2002 | Jones et al. | 382/135 |
| 2002/0154806 A1 | 10/2002 | Jones et al. | 382/135 |
| 2002/0154807 A1 | 10/2002 | Jones et al. | 382/135 |
| 2002/0154808 A1 | 10/2002 | Jones et al. | 382/135 |
| 2003/0009420 A1 | 1/2003 | Jones | 705/39 |
| 2003/0015395 A1 | 1/2003 | Hallowell et al. | 194/206 |
| 2003/0015396 A1 | 1/2003 | Mennie | 194/206 |
| 2003/0062242 A1 | 4/2003 | Hallowell et al. | 194/302 |

FOREIGN PATENT DOCUMENTS

| | | |
|---|---|---|
| DE | 2760269 C2 | 7/1977 |
| DE | 2659929 | 11/1977 |
| DE | 2856511 A1 | 12/1978 |
| DE | 2935668 | 9/1979 |
| DE | 2935668 C2 | 9/1979 |
| EP | 0078708 B1 | 11/1982 |
| EP | 0 072 237 A2 | 2/1983 |
| EP | 0077464 | 4/1983 |
| EP | 0149699 A1 | 1/1984 |
| EP | 0 109 490 A2 | 5/1984 |
| EP | 0130824 | 6/1984 |
| EP | 0130825 | 6/1984 |
| EP | 0130825 A2 | 6/1984 |
| EP | 0132329 | 6/1984 |
| EP | 0 130 824 A2 | 1/1985 |
| EP | 0 168 202 A1 | 6/1985 |
| EP | 0 178 132 A2 | 4/1986 |
| EP | 0206675 | 6/1986 |
| EP | 0253935 | 10/1986 |
| EP | 0264125 | 10/1987 |
| EP | 0338123 A2 | 11/1988 |
| EP | 0 319 524 A2 | 6/1989 |
| EP | 0 319 525 A2 | 6/1989 |
| EP | 0338123 | 10/1989 |
| EP | 0342647 | 11/1989 |
| EP | 0404287 B1 | 6/1990 |
| EP | 0 389 733 A2 | 10/1990 |
| EP | 0 477 711 A2 | 4/1992 |
| EP | 0487 316 A2 | 5/1992 |
| EP | 0487316 | 5/1992 |
| EP | 0 613 107 A1 | 2/1994 |
| EP | 0613107 | 8/1994 |
| GB | 2038063 | 7/1980 |
| GB | 2061232 | 5/1981 |
| GB | 2062854 A | 5/1981 |
| GB | 2 088 832 | 10/1981 |
| GB | 2075230 A | 11/1981 |
| GB | 2078368 A | 1/1982 |
| GB | 2119138 | 11/1983 |
| GB | 2140158 A | 11/1984 |
| GB | 2152212 A | 5/1985 |
| GB | 2153070 A | 8/1985 |
| GB | 2190996 | 12/1987 |
| GB | 2192275 A | 1/1988 |
| GB | 2199173 A | 6/1988 |
| GB | 2204166 | 11/1988 |
| GB | 2217086 | 10/1989 |
| GB | 2219855 A | 12/1989 |
| GB | 221030 A | 1/1990 |
| GB | 2220264 A | 1/1990 |
| GB | 2270904 | 3/1994 |
| JP | 53-44089 | 4/1978 |
| JP | 54-60999 | 6/1979 |
| JP | 54-71673 | 6/1979 |
| JP | 54-71674 | 6/1979 |
| JP | 55-74680 | 6/1980 |
| JP | 55-52538 | 12/1980 |

| | | |
|---|---|---|
| JP | 56-16287 | 2/1981 |
| JP | 56-136689 | 10/1981 |
| JP | 58-139296 | 8/1983 |
| JP | 59-49682 | 3/1984 |
| JP | 59-186079 | 10/1984 |
| JP | 59-231692 | 12/1984 |
| JP | 60-191379 | 9/1985 |
| JP | S60-215293 | 11/1985 |
| JP | 61-007155 | 1/1986 |
| JP | 61-14557 | 4/1986 |
| JP | 61-82290 | 4/1986 |
| JP | 61-41439 | 9/1986 |
| JP | 62-220843 | 9/1987 |
| JP | 63-91794 | 4/1988 |
| JP | 63-091794 | 4/1988 |
| JP | 63-271687 | 11/1988 |
| JP | 63-276688 | 11/1988 |
| JP | 64-64090 | 3/1989 |
| JP | 2-22786 | 1/1990 |
| JP | 2-12492 | 2/1990 |
| JP | 3-20890 | 1/1991 |
| JP | 4-134584 | 5/1992 |
| JP | 04-093357 | 8/1992 |
| JP | 5-11355 | 7/1993 |
| WO | WO 81/01211 | 4/1981 |
| WO | WO 91/11778 | 8/1991 |
| WO | WO 92/17394 | 10/1992 |
| WO | WO 93/23824 | 11/1993 |
| WO | WO 94/19773 | 9/1994 |
| WO | WO 95/24691 | 9/1995 |
| WO | WO 96/10800 | 4/1996 |
| WO | WO 97/01155 | 1/1997 |
| WO | WO 97/30422 | 2/1997 |

OTHER PUBLICATIONS

'456 $1^{st}$ Reexam, U.S. Appl. No. 90/010,057: IDS filed by Amro-Asian Trade, Inc., 4 pages (Nov. 29, 2007).
'456 $1^{st}$ Reexam, U.S. Appl. No. 90/010,057: *Ex Parte* Reexamination Papers filed by Amro-Asian Trade, Inc. through Hogan & Hartson, LLP, 129 pages (Nov. 29, 2007).
'456 $1^{st}$ Reexam, U.S. Appl. No. 90/010,057: Form PTO/SB/57 Request for *Ex Parte* Reexamination Transmittal Form, 2 pages (Jan. 14, 2008).
'456 $1^{st}$ Reexam, U.S. Appl. No. 90/010,057: IDS filed by Amro-Asian Trade, Inc., 4 pages (Jan. 14, 2008).
'456 $1^{st}$ Reexam, U.S. Appl. No. 90/010,057: *Ex Parte* Reexamination Papers filed by Amro-Asian Trade, Inc. through Hogan & Hartson, LLP, 181 pages (Jan. 4, 2008).
'456 $1^{st}$ Reexam, U.S. Appl. No. 90/010,057: USPTO *Ex Parte* Reexamination Communication, Order Granting/Denying Request for *Ex Parte* Reexamination, 27 pages (Feb. 15, 2008).
'456 $1^{st}$ Reexam, U.S. Appl. No. 90/010,057: USPTO *Ex Parte* Reexamination Communication, Decision Merging Proceedings for *Ex Parte* Reexamination 90/010,057 & 90/010,212,6 pages (Nov. 20, 2008).
'456 $2^{nd}$ Reexam, U.S. Appl. No. 90/010,212: Form PTO/SB/57 Request for *Ex Parte* Reexamination Transmittal Form, 2 pages (Jun. 27, 2008).
'456 $2^{nd}$ Reexam, U.S. Appl. No. 90/010,212: IDS filed by Amro-Asian Trade, Inc., 4 pages (Jun. 27, 2008).
'456 $2^{nd}$ Reexam, U.S. Appl. No. 90/010,212: *Ex Parte* Reexamination Papers filed by Amro-Asian Trade, Inc. through Hogan & Hartson, LLP, 78 pages (Jun. 27, 2008).
'456 $2^{nd}$ Reexam, U.S. Appl. No. 90/010,212: USPTO *Ex Parte* Reexamination Communication, Order Granting/Denying Request for *Ex Parte* Reexamination, 18 pages (Sep. 15, 2008).
'456 $2^{nd}$ Reexam, U.S. Appl. No. 90/010,212: USPTO *Ex Parte* Reexamination Communication, Decision Merging Proceedings for *Ex Parte* Reexamination 90/010,057 & 90/010,212, 6 pages (Nov. 20, 2008).
'354 $1^{st}$ Reexam, Control No. 90/010,060: Form PTO/SB/57 Request for *Ex Parte* Reexamination Transmittal Form, 2 pages (Nov. 29, 2007).
'354 $1^{st}$ Reexam, Control No. 90/010,060: IDS filed by Amro-Asian Trade, Inc., 5 pages (Nov. 29, 2007).
'354 $1^{st}$ Reexam, Control No. 90/010,060: *Ex Parte* Reexamination Papers filed by Amro-Asian Trade, Inc. through Hogan & Hartson, LLP, 221 pages (Nov. 29, 2007).
'354 $1^{st}$ Reexam, Control No. 90/010,060: Form PTO/SB/57 Request for *Ex Parte* Reexamination Transmittal Form, 2 pages (Jan. 16, 2008).
'354 $1^{st}$ Reexam, Control No. 90/010,060: IDS filed by Amro-Asian Trade, Inc., 4 pages (Jan. 16, 2008).
'354 $1^{st}$ Reexam, Control No. 90/010,060: *Ex Parte* Reexamination Papers filed by Amro-Asian Trade, Inc. through Hogan & Hartson, LLP, 304 pages (Jan. 16, 2008).
'354 $1^{st}$ Reexam, Control No. 90/010,060: USPTO *Ex Parte* Reexamination Communication, Order Granting/Denying Request for *Ex Parte* Reexamination, 18 pages (Mar. 7, 2008).
'354 $1^{st}$ Reexam, Control No. 90/010,060: USPTO *Ex Parte* Reexamination Communication, Decision Merging Proceedings for *Ex Parte* Reexamination 90/010,060 & 90/010,217, 5 pages (Nov. 20, 2008).
'354 $2^{nd}$ Reexam, Control No. 90/010,217: Form PTO/SB/57 Request for *Ex Parte* Reexamination Transmittal Form, 2 pages (Jul. 8, 2008).
'354 $2^{nd}$ Reexam, Control No. 90/010,217: IDS filed by Amro-Asian Trade, Inc., 4 pages (Jul. 8, 2008).
'354 $2^{nd}$ Reexam, Control No. 90/010,217: *Ex Parte* Reexamination Papers filed by Amro-Asian Trade, Inc. through Hogan & Hartson, LLP, 218 pages (Jul. 8, 2008).
'354 $2^{nd}$ Reexam, Control No. 90/010,217: USPTO *Ex Parte* Reexamination Communication, Order Granting/Denying Request for *Ex Parte* Reexamination, 19 pages (Sep. 23, 2008).
'354 $2^{nd}$ Reexam, Control No. 90/010,217: USPTO *Ex Parte* Reexamination Communication, Decision Merging Proceedings for *Ex Parte* Reexamination 90/010,060 & 90/010,217, 6 pages (Nov. 20, 2008).
'456 $1^{st}$ and $2^{nd}$ Reexams and $1^{st}$ '354 Reexam Ex. B: Selected Papers from Prosecution History of U.S. Pat. No. 5,966,456, 35 pages [EXH B0001-B0035] (Mar. 2, 1998-Nov. 23, 1998).
'456 $2^{nd}$ Reexam Ex. C: De La Rue Detector Manuals for 3700 Used Banknote Sorting Machine, 210 pages (Sep. 1990) [EXH C0001-C0210].
'456 $2^{nd}$ Reexam Ex. F: Service Manual for 3700 Used Banknote Sorting Machine, 244 pages (Sep. 1990) [EXH F0001-F0244].
'456 $2^{nd}$ Reexam Ex. G: 3700 Range of Banknote Sorters Operators Manual, 107 pages (Mar. 1992) [EXH G0001-G0107].
'456 $2^{nd}$ Reexam Ex. U: Declaration of Paul D. Lacey including Exhibits 1 & 2, 58 pages (Jun. 27, 2008) [U0001-U0058].
'456 $2^{nd}$ and '354 $1^{st}$ Reexams Ex. X: "Size Calculation Spreadsheet" prepared by Stephen Emery, 1 page (no date—Emery declaration dated Jan. 10, 2008) [EXH X0001].
'354 $1^{st}$ Reexam Ex. J: De La Rue Systems Limited; Originator: C. Bassant; Specification No. PS1905-101-09; Title: 3110 MKII & 3120 Software Configuration Procedure, 18 pages (Mar. 11, 1986) [EXH J0001-J0018].
'354 $1^{st}$ Reexam Ex. K: De La Rue 3110 MK2 Technical Manual, 162 pages [EXH K0001-K0162] (some pages undated, many pages dated between Jul. 1989-Aug. 1988).
'354 $2^{nd}$ Reexam Ex. L: JetScan Currency Scanner/Counter Operating Instructions, 61 pages (Mar. 1997) [EXH L0001-L0061].
'354 1st & $2^{nd}$ Reexams Ex. B: Selected papers from the Prosecution History of U.S. Pat. No. 6,381,354, 55 pages [EXH B0001-B0055] (Sep. 9, 1998-May 15, 1999).
'354 $2^{nd}$ Reexam Ex. Y: Declaration of Paul Lacey including Exhibits 1 & 2, 49 pages (Jun. 27, 2008) [EXH Y0001-Y0049].
'354 $2^{nd}$ Reexam Ex. AB: Declaration of Stephen Emery, 24 pages (Jul. 7, 2008) [EXH AB0001-AB0024].
'456 $1^{st}$ and $2^{nd}$ Reexams Ex. K and '354 $1^{st}$ Reexam Ex. Q: Mosler Installation & Service Technical Library, Currency Handling Products, Vehicle vol. 301b, Bulletins, CF-420 CF-400, Billcon, Automatic Cash Dispenser, Mosler CF-420, 240 pages (3rd page bears © 1992, p. K0148 bears © 1995) [EXH K0001-K0240].
'456 1st and 2nd Reexams Ex. L and '354 1st and 2nd Reexams Ex. R: Mosler CF-420 Operator's Manual. 168 pages (© 1989) [L0001-L0168].
'456 1st Reexam and '354 1st Reexam: Declaration of Paul D. Lacey, 12 pages (Nov. 28, 2007).
2007 Texas case: Cummins' Answers to Defendants' Counterclaims and Affirmative Defenses, 25 pages (Jul. 18, 2008).
2007 Texas case: Defendant Amro-Asian Trade, Inc.'s Answers and Objections to Plaintiff's First Set of Interrogatories, 23 pages (Oct. 15, 2008).
2007 Texas case: Defendant SBM Co., Ltd.'s Answers and Objections to Plaintiff's First Set of Interrogatories, 23 pages (Oct. 15, 2008).
2007 Texas case: Defendant Amro-Asian Trade, Inc.'s Supplemental Answers and Objections to Plaintiff's First Set of Interrogatories, 19 pages (Dec. 23, 2008).
2007 Texas case: Defendant SBM Co., Ltd.'s Supplemental Answers and Objections to Plaintiff's First Set of Interrogatories, 19 pages (Dec. 23, 2008).
2007 Texas case: Defendants' Motion for Partial Summary Judgment of Invalidity and No Willful Infringement, 37 pages (Jan. 16, 2009).
2007 Texas case: Def. Invalidity SJ Ex. A—Annotated copy of U.S. Pat. No. 5,295,196, 49 pages (issued Mar. 15, 1994).
2007 Texas case: Def. Invalidity SJ Ex. B—Annotated copy of selected portions of U.S. Pat. No. 5,790,697, 9 pages (issued Aug. 4, 1998).
2007 Texas case: Def. Invalidity SJ Ex. C—Annotated copy of selected portions of U.S. Pat. No. 5,358,088, 3 pages (issued Oct. 25, 1994).
2007 Texas case: Def. Invalidity SJ Ex. D—Selected portions of U.S. Appl. No. 60/034,954, filed Jan. 16, 1997.
2007 Texas case: Def. Invalidity SJ Ex. H—Annotated copy of selected portions of U.S. Pat. No. 6,459,806, 12 pages (issued Oct. 1, 2002).
2007 Texas case: Def. Invalidity SJ Ex. I—Annotated copy of selected portions of U.S. Pat. No. 6,381,354, 16 pages (issued Apr. 30, 2002).
2007 Texas case: Def. Invalidity SJ Ex. J—Annotated copy of selected portions of U.S. Pat. No. 5,966,456, 23 pages (issued Oct. 12, 1999).
2007 Texas case: Def. Invalidity SJ Ex. K—Annotated copy of selected portions of U.S. Pat. No. 5,909,503, 10 pages (issued Jun. 1, 1999).
2007 Texas case: Def. Invalidity SJ Ex. L—Annotated copy of selected portions of U.S. Pat. No. 4,179,685, 9 pages (issued Dec. 18, 1979).
2007 Texas case: Def. Invalidity SJ Ex. N—Cummins Jetscan™ Model 4061 Service Manual, 48 pages (p. 39 dated Sep. 20, 1993; pp. 41-42 dated Mar. 23, 1993; pp. 44-48 dated Jul. 6, 1993).
2007 Texas case: Def. Invalidity SJ Ex. O—Selected portions of the file history of U.S. Pat. No. 6,381,354, 7 pages (issued Apr. 30, 2002).
2007 Texas case: Def. Invalidity SJ Ex. Q—Selected portions of the file history of U.S. Pat. No. 6,459,806, 17 pages (issued Oct. 1, 2002).
2007 Texas case: Def. Invalidity SJ Ex. R—Annotated copy of selected portions of Cummins' Disclosure Pursuant to Patent Rule 3-1, 3 pages (Mar. 24, 2008).
2007 Texas case: Def. Invalidity SJ Ex. S—Annotated copy of selected portions of Cummins' Supplement Disclosure Pursuant to Patent Rule 3-1, 5 pages (Jun. 10, 2008).
2007 Texas case: Def. Invalidity SJ Ex. T: '456 1st Reexam, Control No. 90/010,057, Selected portions of Order Granting/Denying Request for Ex Parte Reexamination, 14 pages (Feb. 15, 2008).
2007 Texas case: Def. Invalidity SJ Ex. U: Selected portions of Reexamintion Control No. 90/010,059 related to U.S. Pat. No. 5,909,503, 6 pages (Mar. 7, 2008).
2007 Texas case: Def. Invalidity SJ Ex. V: '354 1st Reexam, Control No. 90/010,060, Selected portions of Order Granting/Denying Request for Ex Parte Reexamination, 13 pages (Jan. 16, 2008).
2007 Texas case: Def. Invalidity SJ Ex. W: '456 2nd Reexam, Control No. 90/010,212, Selected portions of Order Granting/Denying Request for Ex Parte Reexamination, 7 pages (Sep. 15, 2008).
2007 Texas case: Def. Invalidity SJ Ex. X: '354 2nd Reexam, Control No. 90/010,217, Selected portions of Order Granting/Denying Request for Ex Parte Reexamination, 14 pages (Sep. 23, 2008).
2007 Texas case: Def. Invalidity SJ Ex. Y: Miscellaneous correspondences, 4 pages (Oct. 31, 2008-Nov. 16, 2008).
2007 Texas case: Def. Invalidity SJ Ex. Z: Annotated IDS pages from U.S. Appl. No. 08/287,882, 2 pages (Apr. 19, 1996).
2007 Texas case: Def. Invalidity SJ Ex. AA: Annotated IDS pages from U.S. Appl. No. 08/339,337, 3 pages (Jun. 28, 1996).
2007 Texas case: Def. Invalidity SJ Ex. BB: Annotated IDS pages from U.S. Appl. No. 08/340,031, 2 pages (Apr. 17, 1997).
2007 Texas case: Def. Invalidity SJ Ex. CC: Annotated IDS pages from U.S. Appl. No. 08/394,752, 3 pages (Apr. 12, 1996).
2007 Texas case: Def. Invalidity SJ Ex. DD: Annotated copy of selected pages of Expert Report of Douglas U. Mennie regarding U.S. Pat. Nos. 6,459,806; 6,381,354; and 5,966,456, 7 pages (Dec. 2, 2008).
2007 Texas case: Def. Invalidity SJ Ex. EE: Annotated redacted copy of selected pages of Declaration of William J. Jones (dated Oct. 1, 2002) and Mosler Toshiba Currency Sorter CF-400 Series brochure [CG 0049073-76](undated—appears to be similar to Ref. C145 submitted with 1st IDS which bore © 1983), 9 pages total.
2007 Texas case: Def. Invalidity SJ Ex. FF: Annotated copy of selected portions of Declaration of Stephen G. Emery, 22 pages (Jul. 7, 2008).
2007 Texas case: Def. Invalidity SJ Ex. JJ: Selected portions of SBM's and AMRO's Invalidity Contentions Under P.R. 3-3, 12 pages (Apr. 14, 2008).
2007 Texas case: Def. Invalidity SJ Ex. LL—Annotated copy of selected portions of U.S. Pat. No. 4,628,194, 4 pages (issued Dec. 9, 1986).
2007 Texas case: Def. Invalidity SJ Ex. MM—"Patent Priority Summary" of patents related to the patents-in-suit, 1 page (undated—submitted with Defendants' Motion for Partial Summary Judgment dated Jan. 16, 2009).
2007 Texas case: Def. Invalidity SJ Ex. NN—Selected portions of the file history of U.S. Pat. No. 5,875,259, 25 pages (issued Feb. 23, 1999).
2007 Texas case: Def. Invalidity SJ Ex. OO—Annotated copy of selected portions of U.S. Pat. No. 4,114,804, 8 pages (issued Sep. 19, 1978).
2007 Texas case: Def. Invalidity SJ Ex. RR—Declaration of Stephen G. Emery, 91 pages (Jan. 16, 2009).
2007 Texas case: Redacted version of Cummins' Memorandum in Opposition to Defendants' Motion for Summary Judgment, 37 pages (Feb. 2, 2009).
2007 Texas case: Defendants' Reply in support of their Motion for Partial Summary Judgment of Invalidity and No Willful Infringement, 14 pages (Feb. 12, 2009).
2007 Texas case: Def. Invalidity SJ Reply Ex. 1: Annotated copy of selected portions of the file history of U.S. Pat. No. 6,459,806, 4 pages (issued Oct. 1, 2002).
2007 Texas case: Def. Invalidity SJ Reply Ex. 2: '806 2nd Reexam—Annotated copy of selection portions, 6 pages (May 20, 2008).
2007 Texas case: Def. Invalidity SJ Reply Ex. 3: Annotated copy of selected portions of Expert Report of Aaron M. Bauch, 6 pages (Dec. 3, 2008).
2007 Texas case: Def. Invalidity SJ Reply Ex. 6: Office Action from file history of U.S. Pat. No. 5,966,456, 5 pages (Mar. 2, 1998).
2007 Texas case: Def. Invalidity SJ Reply Ex. 7: Annotated copy of selected portions of 2002 Illinois case—'806 SJ Decision: Memorandum Opinion and Order regarding Glory's Motion for Partial Summary Judgment of Non-infringement re: '806, 13 pages (Mar. 28, 2005).
2007 Texas case: Def. Invalidity SJ Reply Ex. 8: Annotated copy of selected portions of 2003 Texas case—Markman: Order: Memorandum Opinion and Order re: Markman Ruling, 7 pages Apr. 7, 2005).
2007 Texas case: Amended 30(b)(6) Notice of Deposition of Amro-Asian Trade, Inc., 5 pages (May 5, 2008).
2007 Texas case: Defendants' Initial Disclosures, 6 pages (Mar. 17, 2008).

2007 Texas case: Second Amended 30(b)(6) Notice of Deposition of SBM Co., Ltd., 5 pages (May 5, 2008).
2007 Texas case: Redacted version of Cummins' Sur-Reply Brief in Opposition to Defendants' Motion for Partial Summary Judgment of Invalidity and No Willful Infringement including Exhibit 40 (Declaration of Douglas U. Mennie), 19 pages (Feb. 20, 2009).
'806 Reexam, Control No. 95/001,029: Patent Owner's Response to Office Action in Inter Partes Reexamination Dated Mar. 23, 2009; 90 pages (Jun. 29, 2009).
'806 $2^{nd}$ Reexam, Control No. 95/001,029: Form PTO/SB/57 Request for *Inter Parte* Reexamination Transmittal Form, 2 pages (Feb. 7, 2008).
'806 $2^{nd}$ Reexam, Control No. 95/001,029: *Inter Partes* Reexamination Papers filed by Amro-Asian Trade, Inc. through Hogan & Hartson, LLP, 341 pages (Feb. 7, 2008).
'806 $2^{nd}$ Reexam, Control No. 95/001,029: Response to Notice of Failure to Comply with *Inter Partes* Reexamination Request Filing Requirements, 4 pages (Feb. 28, 2008).
'806 $2^{nd}$ Reexam, Control No. 95/001,029: USPTO *Inter Partes* Reexamination Communication, Order Granting/Denying Request for *Inter Partes* Reexamination, 33 pages (May 22, 2008).
2007 Texas case: Defendants' Answer and Counterclaims, 19 pages (Nov. 19, 2007).
2007 Texas case: Cummins' Reply to Counterclaims, 21 pages (Dec. 11, 2007).
2007 Texas case: Cummins' Second Amended Complaint, 13 pages (Jun. 9, 2008).
2007 Texas case: Defendants' Answer to Second Amended Complaint, 34 pages (Jun. 26, 2008).
2007 Texas case: Cummins' Initial Disclosure Statement, 8 pages (Mar. 17, 2008).
2007 Texas case: Defendants' Initial Disclosures, 6 pages (Mar. 17, 2008).
2007 Texas case: Cummins' Disclosure Pursuant to Patent Rule 3-1, 36 pages (Mar. 24, 2008).
2007 Texas case: Cummins' Supplement Disclosure Pursuant to Patent Rule 3-1, 24 pages (Jun. 10, 2008).
2007 Texas case: Defendants' Invalidity Contentions under P.R. 3-3, 131 pages (Apr. 14, 2008).
2007 Texas case: Cummins' Preliminary Claim Constructions and Extrinsic Evidence Pursuant to P.R. 4-2, 11 pages (May 8, 2008).
2007 Texas case: Cummins' Report of John DiBlasio Regarding Claims in U.S. Patent 6,459,806; 12 pages (May 7, 2008).
2007 Texas case: Cummins' Report of Aaron Bauch Regarding Claims in U.S. Patent 6,459,806; 7 pages (May 8, 2008).
2007 Texas case: Cummins' Claim Construction: Opinions of Bradford T. Graves, 10 pages (May 8, 2008).
2007 Texas case: Joint Claim Construction and Prehearing Statement, 16 pages (Jul. 1, 2008).
2007 Texas case: Cummins' Amended Notice of Deposition pursuant to Rule 30(b)(6) of Defendant, SBM Co. Ltd., 5 pages (Apr. 28, 2008).
2007 Texas case: Cummins' Notice of Deposition pursuant to Rule 30(b)(6) of Defendant, Amro-Asian Trade, Inc., 5 pages (Apr. 28, 2008).
2007 Texas case: Order on Agreed Claim Terms of United States Patent Nos. 6,459,806, 5,966,456, 6,381,354, and 5,909,503, 3 pages (Jul. 28, 2008).
Mosler Inc. Brochure "The Mosler/Toshiba CF-420" (1989).
Description of Toshiba-Mosler CF-420 Device (est. 1989).
Toshiba-Mosler Operator's Manual for CF-420 Cash Settlement System; pp. 1 to C-3 (© 1989).
Chp. 7 of MosLer CF-420 Cash Management System, Operator's Manual (© 1989).
Revised Drawings of portions of Mosler CF-420 Cash Management System (FIGs. A-C) and description of the same (1989).
Toshiba Fitness Sorter CF-400 Series, 6 pages, est. 1989 or earlier.
Mosler Toshiba Currency Sorter CF-400 Series, 4 pages, copyr. 1983.
Brochure "Let Mosler Help You Cut Costs Four Ways"; Mosler/Toshiba Model CS-6600 Currency Handler; 4 pages, copyr. 1993.
Brochure of Mosler Model CS-6600 Optical Currency Counter/Sorter, 4 pages, copyr. 1985.
Brochure of Mosler Model CS-6600 Optical Currency Counter/Sorter, 4 pages, copyr. 1992.
JetScan Currency Scanner/Counter, Model 4060, Operator's Manual by Cummins-Allison (Aug. 1991).
Sale of JetScan Currency Scanner/Counter, Model 4060 (Aug. 1991).
JetScan Currency Scanner/Counter, Model 4061, Operating Instructions by Cummins-Allison (Apr. 20, 1993).
Sale of JetScan Currency Scanner/Counter, Model 4061 (Apr. 20, 1993).
AFB Currency Recognition System (1982).
Currency Systems International, Medium Speed Currency Sorting Family, CPS 600 and CPS 900; 4 pages (© 1994).
Currency System International, Mr. W. Kranister in Conversation with Richard Haycock; pp. 1- 5; (est. 1994).
Description of Currency Systems International's CPS 600 and CPS 900 devices (est. 1994).
Currency Systems International/Currency Processing Systems, CPS 300, 4 pages (© 1992).
Currency Systems International, CPS 1200; 4 pages, copyr. 1992.
Glory UF-1D Brochure; 2 pages (est. before Aug. 9, 1994).
Glory GFB-200/210/220/230 Desk-Top Bank Note Counter; 2 pages (est. before Aug. 9, 1994).
GFR-X Banknote Counter with Denomination Recognition Brochure, 3 pages (Dec. 1994).
Glory Instruction for Model GFR-100 Currency Reader Counter, 26 pages (Aug. 15, 1995).
Glory Brochure "Tank Tough Currency Discriminators" GFR-110 & GFB 700, 2 pages (Aug. 6, 1998).
Glory Bank Note Counting Machine, Model GFB-700, Operating Instructions, 32 pages (Sep. 1998).
Glory GSA-500 Sortmaster brochure; 2 pages, est. Jan. 14, 1994.
Glory GSA-500 Sortmaster brochure; 4 pages, est. Jan. 14, 1994.
Sale of Glory GSA-500 Sortmaster, 1986.
Glory GFB-500/520, Desk-Top Bank Note Counters; 2 pages, est. before Aug. 9, 1994.
Glory GFB-500/520/600, Bank Note Counting Machine, Operating Instructions; 4 pages, 1996.
Glory Cash Handling Systems Brochure, 11 pages, Apr. 25, 1994.
Declaration of Per Torling, 6 pages (Mar. 18, 1999).
Billcon D-202/204 Service Manual (cover marked 630229) (Japanese).
Translation of Billcon D-202/204 Service Manual.
Billcon D-202, D204 Operator's Manual (cover marked 611215)(Japanese).
First Translation of Billcon D-202, D204 Operator's Manual.
Second Translation of Billcon D-202, D204 Operator's Manual (Glory).
Banking Machine Digest No. 31 (Dec. 5, 1988)(Japanese).
First Translation of Banking Machine Digest No. 31.
Second Translation of Banking Machine Digest No. 31 (Glory).
Third Translation of Banking Machine Digest No. 31.
G&D CHP 50 User's Guide, 61 pages, (Mar. 1998).
De La Rue, 2700 VB Brochure, 1 page (Dec. 9, 1996).
De La Rue, 2700 User Guide, 52 pages (Aug. 1999).
De La Rue Systems 2300 Series, Making Technology Count; 4 pages; 1997.
De La Rue Systems, The Processing of Money and Documents; 4 pages; copyr. 1987.
De La Rue Systems 3100 Serie, l'internationale des Machines a trier les Billets, 2 pages, copyr. 1989 (French).
De La Rue Systems Limited, 2100 Banknote Counting Machine; Operator Instruction and Maintenance Sheet; 4 pages; copyr. 1980.
De La Rue Systems Limited, 9000 Series High Speed Document Reader/Sorters; 8 pages; copyr. 1980.
Bedienungsanleitung for Glory Bank-Note Counting Machine, Models GFB-200, 210, 220 & 230 (Operator's Manual); 24 pages; estimated before Aug. 9, 1994.
Japanese Reference X—10 pages.
Translation of JP 54-71673.
Translation of JP 54-71674.
Translation of JP 56-16287.
First Translation of JP 56-136689.
Second Translation of JP 56-136689 (Glory).

First Translation of JP 61-14557.
Second Translation of JP 61-14557 (Glory).
Translation of JP 61-41439.
Translation of JP 62-220843.
Translation of JP 63-271687.
Translation of JP 63-276688.
Translation of JP 2-12492.
Translation of EP 0077464.
Translation of EP 0342647.
Translation of DE 2659929.
Translation of DE 2935668.
Declaration of Toshio Numata.
Billcon: 38$^{th}$ Banking Uniform Show (1 page) and translation (2 pages ) (1998).
Billcon: D212 Note Counter, 4 pages—Japanese and Translation.
Billcon: D212—Odd Bill Detecting Bill Counter—Instruction Manual, 17 pages, Japanese and translation (p. 17 dated 1994).
Cummins-Allison Corp. v. Glory U.S.A., Inc., N.D. III. 1998.
De La Rue Systems: 2300—Operating Instruction Manual, 3 pages (© 1986).
Glory: GSA-500—Instruction Manual, 40 pages (prior to Jul. 1998).
Glory: GSA-500—Operating Procedures, 9 pages (prior to Jul. 1998).
JCM: BC-30 Bill Counter, 2 pages (date unknown, prior to Aug. 2002).
JCM: DBC-3 U.S. Dollar Bank Note Checker, 2 pages (date unknown, prior to Aug. 2002).
Musashi Co.: New Generation-tellac-5 Series Compact Currency Counter, 2 pages (1988).
Musashi Co.: Operation Manual for Maintenance and Learning Modes for Tellac-5, 5DD, SD, DDA, A & SSD, 13 pages (prior to Aug. 2002).
Translation of DE 27 60 269 C2.
Translation of JP 54-60999.
Translation of JP 55-52538.
Geldinstitute—3 , 2 pages (1983).
Translation for Geldinstitute—3, 5 pages (1983).
De La Rue Systems, 3110/3120 Machines, Diagnostics Function, 10 pages (Oct. 1986).
De La Rue Systems, 3110 MK II, International Currency Sorting Machine, 2 pages (1987).
De La Rue Systems, 3120 Currency Sorting Machines with pattern Recognition, 2 pages (1987).
De La Rue Systems, 3100 Series Operation Instructions, 52 pages (Oct. 1986).
Brochure by Toyocom, "New Currency Counter with Denomination Recognition, Toyocom NS" (Sep. 26, 1994) (1 page).
News Product News by Toyocom, "Toyocom Currency Counter Now Reads Denominations" (Sep. 26, 1994) (1 page).
JetScan Currency Scanner/Counter, Model 4062, Operating Instructions by Cummins-Allison (Nov. 28, 1994).
Sale of JetScan Currency Scanner/Counter, Model 4062 (Nov. 28, 1994).
Toyocom Currency Counter, Model NS-100, "Operation Guide (Preliminary)" (Jun. 13, 1995).
De La Rue—Autodeposit—Users Manual TCD9210—8 pages (1992).
NCL (Nakabayashi Co, Ltd.): NRF-551/NRF-5514 Brochure, 2 pages (date unknown) (Japanese) with translation (2 pages).
NCL (Nakabayashi Co., Ltd.): NRF—551/5514 manual, 11 pages (date unknown)(Japanese) .
Declaration of Masaharu Hirooka regarding Billcon D202/204 and NRF-551/NRF-5514, 1 page (Feb. 28, 2001).
Billcon D-202/204—Nikkin Newspaper Ad, (Apr. 17, 1987) (Japanese) and two alternate translations pages total)—Better copies of Japanese documents previously cited. See also tabs C-D 18 and C-D 19 of Cummins-Allison Library for other translations.
Billcon D-202/204 Operator's Manual—Third Translation, 10 pages. See also previously cited references at tabs C-D96, 97, 98 of Cummins-Allison Library.
Billcon D-202/204 Service Manual—Second Translation, 27 pages. See also previously cited references at tabs C-D99, 100 of Cummins-Allison Library.
Banking Machine Digest No. 31, 3 pages (Japanese)(date uncertain)—Better copy than previously cited at tab C-D 101 of Cummins-Allison Library.
Banking Machine Digest No. 31, Fourth translation. See also previously cited references at tabs C-D102, 103, & 104 of Cummins-Allison Library.
Selected portions of prosecution history of PCT Appl. No. US91/00283 (published as WO 91/11778) (application specification corresponds to U.S. Appl. No. 07/474,111).
Selected portions of prosecution history of Australian App. No. 71806/91 (published as AU 645523) (application specification corresponds to U.S. Appl. No. 07/474,111).
Selected portions of prosecution history of Australian App. No. 64282/96 (published as AU 688688) (application specification corresponds to U.S. Appl. No. 07/474,111).
Selected portions of prosecution history of Canadian App. No. 2156998 (published as CA 2156998) (application specification corresponds to U.S. Appl. No. 07/474,111).
Selected portions of prosecution history of European App. No. 91903057.7 (published as EP 0 466 869) (application specification corresponds to U.S. Appl. No. 07/474,111).
Selected portions of prosecution history of European App. No. 95 116 745.1 (published as EP 0 706 156) (application specification corresponds to U.S. Appl. No. 07/474,111).
Selected portions of prosecution history of European App. No. 98 115 458.6 (published as EP 0 883 094) (application specification corresponds to U.S. Appl. No. 07/474,111).
Selected portions of prosecution history of Japanese App. No. 08-64820 (published as JP 11-053603 and JP 11-2995156) (application specification corresponds to U.S. Appl. No. 07/474,111).
Selected portions of prosecution history of Japanese App. No. 03-503405 (published as JP 2994461) (application specification corresponds to U.S. Appl. No. 07/474,111).
Selected portions of prosecution history of PCT App. No. US93/04691 (published as WO 93/23824) (application specification corresponds to U.S. Appl. No. 07/885,648 issued as US 5,295,196).
Selected portions of prosecution history of Australian App. No. 43799/93 (published as AU 670297) (application specification corresponds to U.S. Appl. No. 07/885,648).
Selected portions of prosecution history of Canadian App. No. 2136194 (published as CA 2136194) (application specification corresponds to U.S. Appl. No. 07/885,648).
Selected portions of prosecution history of Canadian App. No. 2358854 (published as CA 2358854) (application specification corresponds to U.S. Appl. No. 07/885,648).
Selected portions of prosecution history of European App. No. 93913952.3 (published as EP 0 641 468) (application specification corresponds to U.S. Appl. No. 07/885,648).
Selected portions of prosecution history of Japanese App. No. 8-64914 (published as JP 8-249516 & JP 12-3098420) (application specification corresponds to U.S. Appl. No. 07/885,648).
Selected portions of prosecution history of Japanese App. No. 503812/94 (published as JP 7-508366 and JP 3253964) (application specification corresponds to U.S. Appl. No. 07/885,648).
Additional Translation of JP 54-71674, 11 pages (Glory) (GL009911.1-.11) (translation dated Jun. 2005; app. publ. Jun. 1979).
Additional Translation of JP 61-14557, 12 pages (Glory) (GL 011280.121-.132) (translation dated Jul. 2005; app. publ. Apr. 1986).
Additional Translation of JP 61-41439, 13 pages (Glory) (GL 011280.108-.120) (translation dated Jul. 2005; app. publ. Sep. 1986).
Billcon: D-Series Currency Discrimination Counter brochure, 4 pages (GL016250-53) (© 2002).
Billcon: D202/204 Service Manual (excerpts and corresponding translation thereof, 6 pages (GL025429-30) (date unknown—before Feb. 9, 2004).
Cummins: JetScan Model 4060: Advertisement in Bank Systems+Technology, 2 pages (Oct. 1991).
Cummins: JetScan Model 4060 Currency Scanner/Counter brochure, 2 pages, Form 023-1401 Rev. A (1$^{st}$ printing Jul. 1991).
Cummins: JetScan Model 4060: "The next generation in currency processing," 2 pages, Form 023-1402 (Sep. 1991).

Cummins: JetScan Model 4060: "Special Offer to U.S. Postal Service," 3 pages, Form 023-1409 (Dec. 1991).

Cummins: JetScan Model 4060: brochure "Specially Designed for The Banking Industry," 1 page (GL028829) (date: unknown, top of page marked 92.4).

Cummins: JetScan Model 4060: "The next generation in currency processing," 2 pages, Form 023-1425 (Oct. 1992).

Cummins: JetScan Model 4061: Brochure "Another Banking Innovation from Cummins," 1 page. (GL028828) (1994).

Cummins JetScan brochure: "Currency Scanners: far more useful than currency counters," 4 pages, Form 023-1595 (GL002754-57) (Feb. 2002)

Glory GFB-200, 210, 220 & 230 Bank-Note Counting Machine: Instruction Manual, 17 pages, (GL011280.140-.155) (Last page says Printed in Japan 1/'87).

Glory UF-1: Glory 21 System brochure, 3 pages (GL002778-80) (Japanese—Produced by Glory in litigation) (date unknown, $2^{nd}$ page shows receipt with apparent 1984 date).

Glory UF-1: Accommodates New Notes—Glory Teller's Deposit Machine, 4 pages (GL054473-76) (date unknown, $1^{st}$ page handwritten "2002").

Industrial Research and Development, "Currency Inspected at Rates of 192,000 Notes/Hr," pp. 122-126, 6 pages (GL 010707-712) (Nov. 1981).

Pennsylvania Research Associates (PRA): Countess 854, 8 pages (GL011280.51-.58) (1975).

Polymer Symposium, Sydney—Processing: Issues in Central Banks: The Reserve Bank of Australia's Experience (mentioning REI CVCS system), 5 pages (GL010722-26) (Oct. 1999).

Proceedings, SPIE—International Society for Optical Engineer, Optical Security and Anticounterfeiting Systems (vol. 1210), "High Speed Print Quality Inspection and Verification,", 9 pages (GL 010713-21) (Jan. 1990).

REI: Currency Verification Counting and Sorting (CVCS) System brochure, 5 pages (GL024733-37) (1981).

REI: Currency Recognition Unit 4 pages (GL1003664-67) (© 1986).

REI: Currency Verification, Counting, and Sorting (CVCS) Service Manual (GL1006569-663) (© 1986).

Intel 80C196KB User's Guide (Exhibit C to the Subpoena for Intel Corporation) (GL054028-125) (Nov. 1990).

2002 Illinois case—Pleading: Glory U.S.A.'s Answer, Affirmative Defenses, and Counterclaims (Nov. 1, 2002).

2002 Illinois case—Pleading: Cummins' Reply to Defendant Glory (U.S.A.), Inc.'s Counterclaim (Nov. 25, 2002).

2002 Illinois case—Pleading: Glory U.S.A.'s Amended Answer, Affirmative Defenses and Counterclaims (Jan. 13, 2003).

2002 Illinois case—Pleading: Answer, Affirmative Defenses and Counterclaims of Defendants Glory Shoji Co., Ltd, and Glory Ltd. (Nov. 13, 2003).

2002 Illinois case—Pleading: Amended Answer, Affirmative Defenses and Counterclaims of Glory Ltd. and Glory Shoji Co. Ltd. (Jan. 27, 2003).

2002 Illinois case—Pleading: Cummins' Reply to Amended Counterclaims (Feb. 6, 2003).

2002 Illinois case—Pleading: Cummins' First Amended Complaint (Jun. 18, 2003).

2002 Illinois case—Pleading: Glory's Answer, Affirmative Defenses and Counterclaims (Jul. 11, 2003).

2002 Illinois case—Pleading: Cummins' Reply to Jul. 11, 2003 Counterclaims of Glory (Aug. 3, 2003).

2002 Illinois case—Pleading: Cummins' Infringement Claims Charts (Oct. 10, 2003).

2002 Illinois case—Pleading: Glory's Non-Infringement Claims Charts (Oct. 31, 2003).

2002 Illinois case—Pleading: Cummins' Amended Supplemental Infringement Claim Charts (Dec. 31, 2003).

2002 Illinois case—Pleading: Defendants' Prior Art Charts from Glory Ltd., Glory Shoji Co., Ltd, and Glory (U.S.A.) Inc. (Nov. 24, 2003).

2002 Illinois case—Pleading: Cummins' Prior Art Statement (Dec. 18, 2003).

2002 Illinois case—Pleading: Glory's Amended Prior Art Charts and Statement (Feb. 17, 2004).

2002 Illinois case—Discovery: Discovery Order (Aug. 28, 2003).

2002 Illinois case—Discovery: Glory U.S.A.'s First Set of Interrogatories to Cummins (Oct. 24, 2002).

2002 Illinois case—Discovery: Glory U.S.A.'s Second Set of Interrogatories to Cummins (Oct. 2, 2003).

2002 Illinois case—Discovery: Cummins' Answers to Defendant Glory USA Inc.'s Second Set of Interrogatories (Nov. 6, 2003).

2002 Illinois case—Discovery: Cummins' Second Supplemental Answers to Glory U.S.A., Inc.'s Second Set of Interrogatories (Mar. 18, 2004).

2002 Illinois case—Discovery: Glory Ltd.'s First Set of Interrogatories to Cummins (Oct. 17, 2003).

2002 Illinois case—Discovery: Cummins' First Set of Interrogatories to Glory (U.S.A.), Inc. (Oct. 17, 2002).

2002 Illinois case—Discovery: Glory U.S.A.'s Responses to Cummins' First Set of Interrogatories 1-7 (Nov. 1, 2002).

2002 Illinois case—Discovery: Cummins' Second Set of Interrogatories to Glory (U.S.A.), Inc. (Dec. 29, 2003).

2002 Illinois case—Discovery: Glory's Responses to Cummins' Second Set of Interrogatories 8-9 (Jan. 27, 2004).

2002 Illinois case—Discovery: Cummins' Third Set of Interrogatories to Glory (Jan. 12, 2004).

2002 Illinois case—Discovery: Glory's Responses to Cummins' Third Set of Interrogatories 10-16 (Feb. 11, 2004).

2002 Illinois case—Discovery: Glory's Supplemental Response to Cummins' Interrogatory 15 (Apr. 14, 2004).

2002 Illinois case—Discovery: Definitions to Glory (U.S.A.) Inc.'s First Set of Requests for Admissions (Oct. 16, 2003).

2002 Illinois case—Discovery: Cummins' Response to Glory (U.S.A.) Inc.'s First Set of Requests for Admissions (Dec. 10, 2003).

2002 Illinois case—Discovery: Definitions to Cummins' First Set of Requests for Admissions (Jan. 16, 2004).

2002 Illinois case—Discovery: Glory's Reponses to Cummins' First Set of Requests for Admissions (Mar. 3, 2004).

2002 Illinois case—Discovery-Deposition: Glory's Amended Notice of Videotape 30(b)(6) Deposition of Cummins (topics 1-17) (Nov. 18, 2002).

2002 Illinois case—Discovery-Deposition: Glory's Amended Notice of Videotape 30(b)(6) Deposition of Cummins (topics 1-9) (Mar. 10, 2004).

2002 Illinois case—Discovery-Deposition: Cummins' Amended Notice of 30(b)(6) Deposition of Glory (U.S.A.) Inc. (topics 1-7) (Oct. 29, 2002).

2002 Illinois case—Discovery-Deposition: Cummins' Notice of Videotape 30(b)(6) Deposition of Glory (topics 1-16) (May 24, 2004).

2003 Texas case—Discovery-Deposition: Cummins' Notice of Videotape 30(b)(6) Deposition of Glory (U.S.A.) Inc. (topics 1-21) (Jun. 9, 2004).

2002 Illinois case—PI Motion: Cummins' Redacted Memorandum in Support of Motion for Preliminary Injunction ("CA PI motion") (Oct. 16, 2002).

2002 Illinois case—PI Motion: Glory's Redacted Memorandum in Opposition to Plaintiff's Motion for Preliminary Injunction (Nov. 25, 2002).

2002 Illinois case—PI Motion: Cummins' Redacted Reply Memorandum in Support of Motion for Preliminary Injunction (Dec. 9, 2002).

2002 Illinois case—PI Motion: Demonstrative Exhibits used by Glory at the Preliminary Injunction Hearing (GL 006925-30, 32-33, 36-37) (Jan. 2003).

2002 Illinois case—PI Motion: Report and Recommendation: The Court Recommends that Cummins' Motion for Preliminary Injunction be Denied (Feb. 10, 2003).

2002 Illinois case—PI Motion: Memorandum Opinion and Order: Adopting the recommendation of the Magistrate and denying Cummins' Motion for Preliminary Injunction (Sep. 23, 2003).

2002 Illinois case—'806 SJ: Redacted Cummins' Memorandum in Opposition to Glory's Motion for Partial Summary Judgment of Non-infringement of U.S. Patent No. 6,459,806 (Jan. 14, 2005).

2002 Illinois case—'806 SJ: Glory's Reply to Cummins' Opposition to Glory's Motion for Partial Summary Judgment of Non-infringement of U.S. Patent No. 6,459,806 (Feb. 10, 2005).

2002 Illinois case—'806 SJ Decision: Memorandum Opinion and Order regarding Glory's Motion for Partial Summary Judgment of Non-infringement re: '806 (Mar. 28, 2005).
2002 Illinois case—'196 SJ: Redacted Cummins' Memorandum In Opposition to Glory's Motion for Partial Summary Judgment of Non-infringement of U.S. Patent No. 5,295,196 (Jan. 14, 2005).
2002 Illinois case—'196 SJ: Glory's Reply to Cummins' Opposition to Glory's Motion for Partial Summary Judgment of Non-infringement of U.S. Patent No. 5,295,196 (Feb. 10, 2005).
2002 Illinois case—'196 SJ Decision: Memorandum Opinion and Order Granting Glory's Motion for Partial Summary Judgment of Non-infringement of U.S. Patent No. 5,295,196 (Mar. 28, 2005).
2002 Illinois case—Markman: Cummins' Memorandum in Support of Its Motion Requesting a Markman Hearing or a Determination by the Court of Disputed or Ambiguous Claim Terms in the '196 Patent (Mar. 7, 2005).
2002 Illinois case—Markman: Cummins' Memorandum in Support of Its Motion Requesting a Markman Hearing or a Determination by the Court of Disputed or Ambiguous Claim Terms in the '806 Patent (Mar. 7, 2005).
2003 Texas case—Pleading: Cummins' Complaint (Oct. 20, 2003).
2003 Texas case—Pleading: Redacted Glory (USA), Inc.'s Answer, Affirmative Defenses, and Counterclaims (Jan. 12, 2004).
2003 Texas case—Pleading: Cummins Reply and Affirmative Defenses to Glory USA's Counterclaims (Feb. 9, 2004).
2003 Texas case—Pleading: Cummins Reply and Affirmative Defenses to Glory LTD. and Glory Shoji's Counterclaims (Feb. 26, 2004).
2003 Texas case—Pleading: Cummins's Amended Complaint for Patent Infringement (Mar. 4, 2005).
2003 Texas case—Pleading: Cummins Disclosure of Asserted Claims and Preliminary Infringement Contentions related to the '067 and '354 patents (without attachments) (Jun. 7, 2004).
2003 Texas case—Pleading: Cummins' Amended Disclosure of Asserted Claims and Preliminary Infringement Contentions related to the '067 and '354 patents (without attachments) (May 26, 2005).
2003 Texas case—Pleading: Cummins-Allison Corp.'s Amended Disclosure of Asserted Claims and Final Infringement Contentions Pursuant to Rules 3-6 and 3-7 (Jul. 18, 2005).
2003 Texas case—Pleading: Glory's Preliminary Invalidity Contentions (Jul. 22, 2004).
2003 Texas case—Pleading: Glory's Final Invalidity Contentions (Jun. 13, 2005).
2003 Texas case—Pleading: Glory's Invalidity Contentions (Aug. 5, 2005).
2003 Texas case—Pleading: Glory's Prior Art Notice Pursuant to 35 USC 282 (Nov. 4, 2005).
2003 Texas case—Discovery: Glory's Responses to Cummins' First Set of Interrogatories 1.20—Redacted (Jul. 26, 2004).
2003 Texas case—Discovery: Glory's Supplemental Responses to Cummins' First Set of Interrogatories 1-20 (supplementing answer to Interrogatory No. 1) (Jun. 14, 2005).
2003 Texas case—Discovery: Glory's Supplemental Responses to Cummins' First Set of Interrogatories 1-20—Redacted (Nov. 4, 2005).
2003 Texas case—Discovery: Cummins' Supplemental Responses to Glory USA's First Set of Interrogatories Nos. 16-17 (Jun. 28, 2005).
2003 Texas case—Discovery: Glory's Second Set of Interrogatories to Cummins Nos. 20-43 (Feb. 9, 2005).
2003 Texas case—Discovery: Glory's Responses to Cummins' First Set of Requests for Admissions (Nos. 1-9) (Jul. 26, 2004).
2003 Texas case—Discovery: Cummins Rule 30(b)(6) Notice of Videotape Deposition of Glory Ltd. (Jun. 9, 2004).
2003 Texas case—Discovery: Cummins Rule 30(b)(6) Notice of Videotape Deposition of Glory Shoji Co., Ltd. (Jun. 9, 2004).
2003 Texas case—Discovery: Cummins Rule 30(b)(6) Notice of Videotape Deposition of Glory (U.S.A.), Inc. (Jun. 9, 2004).
2003 Texas case—Discovery: Glory's Subpoena for Intel Corporation (Mar. 3, 2005).
2003 Texas case—Markman: Glory's List of Proposed Claim Terms and Limitations for Construction Pursuant to Patent Rule 4-1 (Aug. 4, 2004).
2003 Texas case—Markman: Glory's Preliminary Claim Construction and Identification of Extrinsic Evidence Pursuant to Patent Rule 4-2 (Sep. 15, 2004).
2003 Texas case—Markman: Joint Claim Construction and Prehearing Statement Pursuant to Rule 4-3 (Oct. 4, 2004).
2003 Texas case—Markman: Cummins' Claim Construction Chart for USP 5,692,067 with Exhibit A (J. DiBlasio) and Exhibit B (R. Stevenson) (Oct. 4, 2004).
2003 Texas case—Markman: Glory's Review of Claim Construction Issues for USP 5,692,067 (Oct. 4, 2004).
2003 Texas case—Markman: Glory's Review of Claim Construction Issues for USP 6,381,354 (Oct. 4, 2004).
2003 Texas case—Markman: Glory's Review of Claim Construction Issues for USP 5,815,592 (Oct. 4, 2004).
2003 Texas case—Markman: Amended Joint Claim Construction and Prehearing Statement for '067, '354 and '592 Pursuant to Local Patent Rule 4-3 with exhibits A and B (Nov. 12, 2004).
2003 Texas case—Markman: Glory's Claim Construction Brief, Declaration of D. Munson, Declaration of M. Nelson (without Nelson exhibits A-O) (Dec. 20, 2004).
2003 Texas case—Markman: Glory's Sur-Reply Claim Construction Brief and Nelson Declaration (without Exhibits 5-6 of Nelson Declaration) (Jan. 26, 2005).
2003 Texas case—Markman: Minute entry for proceedings on Claim Construction Hearing [Summary of proceedings] (Feb. 2, 2005).
2003 Texas case—Markman: Order: Memorandum Opinion and Order re: Markman Ruling (Apr. 7, 2005).
2003 Texas case—Markman: Cummins' Motion for Reconsideration re: Claim Construction of '067 patent (Apr. 15, 2005).
2003 Texas case—Markman: Glory's Opposition to Cummins' Motion for Reconsideration re: claim construction (May 2, 2005).
2003 Texas case—Markman: Cummins' Reply to Glory's Opposition to Cummins' Motion for Reconsideration on Claim Construction (May 17, 2005).
2003 Texas case—Markman: Glory's Sur-Reply to Plaintiff's Motion for Reconsideration (May 23, 2005).
2003 Texas case—Markman: Cummins' Motion for Leave to File a Supplement to Its Motion for Reconsideration of the Court's Construction of the term "Evaluate" and Supplement to Motion for Reconsideration (Aug. 24, 2005).
2003 Texas case—Markman: Glory's Opposition and Response to Plaintiff's Motion for Leave to Supplement Its Motion for Reconsideration of the Court's Construction of the Term "Evaluate".
2003 Texas case—Markman: Order: Plaintiff's Motion for Reconsideration is Denied; Plaintiff's Motion for Leave to File a Supplement to Its Motion for Reconsideration is denied as moot (Sep. 6, 2005).
2003 Texas case—Markman: Glory's Supplemental Preliminary Claim Construction and Identification of Extrinsic Evidence Pursuant to Patent Rule 4-2 (Sep. 9, 2005).
2003 Texas case—Markman: Cummins' Compliance with Rule 4-2 (Sep. 9, 2005).
2003 Texas case—SJ Public Use: Memorandum Opinion and Order: Defendants' Motion for Summary Judgment of Invalidity for Public Use re: '067 is Denied (Aug. 22, 2005).
2003 Texas case—SJ '067 Invalidity: Glory's Motion for Summary Judgment of Invalidity of Claims 35 and 36 of USP '067 (Sep. 16, 2005).
2003 Texas case—SJ '067 Invalidity: Order: Glory's Motion for Summary Judgment of Invalidity of claims 35 and 36 of U.S. Patent No. 5,692,067 is Denied (Nov. 9, 2005).
2003 Texas case—SJ '354: Order Denying Glory's Motion for Summary Judgment of Non-Infringement and Invalidity re: U.S. Patent No. 6,381,354 (Nov. 9, 2005).
2003 Texas case—Report of K. Kuffner (Glory's patent law expert—alleging inequitable conduct) (Jun. 24, 2005).
2003 Illinois case—Pleading: Glory's Complaint—Redacted (Nov. 25, 2003).
2003 Illinois case—Pleading: Cummins' Answer, Affirmative Defenses, and Counterclaim (Jan. 21, 2004).
2003 Illinois case—Pleading: Glory's Answer to Cummins' Counterclaim (Feb. 10, 2004).

2003 Illinois case—Discovery: Glory's Answers to Cummins First Set of Interrogatories—Redacted (Apr. 26, 2004).
2003 Illinois case—Discovery: Cummins Answers to Glory's First Set of Interrogatories—(Apr. 26, 2004).
2003 Texas Case—Pleading: Defendants' Motion for Partial Summary Judgment on Invalidity for Public Use (Mar. 18, 2005) (Contains materials subject to a Protective Order).
2003 Texas Case—Pleading: Plaintiff Cummins-Allison Corp.'s Opposition to Defendants' Motion for Partial Summary Judgment of Invalidity for Public Use (Apr. 1, 2005) (Contains materials subject to a Protective Order).
2003 Texas Case—Pleading: Defendants' Reply to Plaintiff's Opposition to Defendants' Motion for Partial Summary Judgment of Invalidity for Public Use (Apr. 11, 2005) (Contains materials subject to a Protective Order).
2003 Texas Case—Pleading: Plaintiff Cummins-Allison's Sur-Reply to Defendants' Motion for Partial Summary Judgment of Invalidity for Public Use (Jul. 11, 2005) (Contains materials subject to a Protective Order).
2003 Texas Case—Pleading: Plaintiff Cummins-Allison Corp.'s Unopposed Motion for Leave to File a Supplement to Its Opposition to Defendants' Motion for Partial Summary Judgment of Invalidity of Public Use (Aug. 18, 2005) (Contains materials subject to a Protective Order).
2003 Texas Case—Pleading: Defendants' Updated Initial Disclosures Pursuant to Rule 26(a) of the Federal Rule of Civil Procedure and Paragraphs 1 and 8 of the Court's Amended Discovery Order (Mar. 11, 2005) (Contains materials subject to a Protective Order).
2003 Texas Case—Pleading: Cummins' Opposition to Defendants' Motion for Summary Judgment of Invalidity of Claims 35 and 36 of U.S. Patent No. 5,692,067 (Oct. 20, 2005) (Contains materials subject to a Protective Order) Redacted.
2003 Texas Case—Pleading: Defendants' Motion for Partial Summary Judgment of Non-Infringement of U.S. Patent No. 5,962,067 (Sep. 16, 2005) (Contains materials subject to a Protective Order) Redacted.
2003 Texas Case—Pleading: Cummins' Memorandum in Opposition to Glory's Motion for Partial Summary Judgment of Non-Infringement of U.S. Patent No. 5,692,067 (Oct. 20, 2005) (Contains materials subject to a Protective Order) Redacted.
2003 Texas Case—Pleading: Defendants' Reply to Cummins Opposition to Glory's Motion for Summary Judgment of Non-Infringement of U.S. Patent No. 5,692,067 (Nov. 11, 2005) (Contains materials subject to a Protective Order) Redacted.
2003 Texas Case—Pleading: Cummins' Surreply Memorandum in Opposition to Glory's Motion for Partial Summary Judgment of Non-Infringement of U.S. Patent No. 5,692,067 (Nov. 29, 2005) (Contains materials subject to a Protective Order) Redacted.
2003 Texas Case—Pleading: Cummins' Opposition to Defendants' Motion for Summary Judgment of Non-Infringement and Invalidity of Non-Infringement of U.S. Patent No. 6,381,354 (Oct. 20, 2005) (Contains materials subject to a Protective Order) Redacted.
2003 Texas Case—Exhibit 1: Declaration of John DiBlasio in Support of Cummins' Opposition to Defendants' Motion for Summary Judgment of Non-Infringement and Invalidity of U.S. Patent No. 6,381,354 (Oct. 17, 2005) (Contains materials subject to a Protective Order) Redacted.
2003 Texas Case—Exhibit 2: Declaration of Robert L. Stevenson in Support of Cummins' Opposition to Defendants' Motion for Summary Judgment of Non-Infringement and Invalidity of U.S. Patent No. 6,381,354 (Oct. 17, 2005) (Contains materials subject to a Protective Order) Redacted.
2003 Texas Case—Exhibit 3: Declaration of Douglas U. Mennie in Support of Cummins' Opposition to Defendants' Motion for Summary Judgment of Non-Infringement and Invalidity of U.S. Patent No. 6,381,354 (Oct. 17, 2005) (Contains materials subject to a Protective Order) Redacted.
2003 Texas Case—Exhibit 4: Declaration of Brad Graves in Support of Cummins' Opposition to Defendants' Motion for Summary Judgment of Non-Infringement and Invalidity of U.S. Patent No. 6,381,354 (Oct. 17, 2005) (Contains materials subject to a Protective Order).

2003 Texas Case—Appendix A: To Cummins' Opposition to Defendants' Motion for Summary Judgment of Non-Infringement and Invalidity of U.S. Patent No. 6,381,354 (Contains materials subject to a Protective Order) Redacted.
2003 Texas Case—Rebuttal Expert Report of the Honorable Gerald J. Mossinghoff (Sep. 15, 2005) (Contains materials subject to a Protective Order).
2002 Illinois case—'196 and '806 Public Use SJ Decision: Memorandum Opinion and Order Denying Glory's Motion for Summary Judgment for Prior Public Use (Feb. 12, 2007).
2002 Illinois case—'806 Anticipation SJ: Glory's Memorandum in Support of Defendants' Motion for Summary Judgment Declaring U.S. Pat. No. 6,459,806 Invalid under 35 U.S.C. § 102(b) on Grounds of Anticipation (Oct. 27, 2006).
2002 Illinois case—'806 Anticipation SJ: Glory's Statement of Undisputed Facts (Oct. 27, 2006).
2002 Illinois case—'806 Anticipation SJ: Declaration of Stephen G. Emery in Support of Glory's Motion (Oct. 27, 2006).
2002 Illinois case—'806 Anticipation SJ: Ex. 1 of Emery Decl.—Claim Chart Applying the De La Rue 3000 Series to the Asserted Claims of the '806 Patent (Oct. 27, 2006).
2002 Illinois case—'806 Anticipation SJ: Ex. 3 of Emery Decl.—De La Rue 3000 User Guide (GL 093175-GL 093259) (date unknown).
2002 Illinois case—'806 Anticipation SJ: Ex. 4 of Emery Decl.—De La Rue Systems 3000 Series, "Used banknote sorting machines" brochure (GL 092931-GL 092942) (date unknown).
2002 Illinois case—'806 Anticipation SJ: Ex. 5 of Emery Decl.—De La Rue Systems Ltd., Hong Kong & Shanghai Banking Corpn., Operations Manual for 3530 System Machine No. 4. (GL 056360-GL 056410) (pages dated Jan. 1986).
2002 Illinois case—'806 Anticipation SJ: Ex. 6 of Emery Decl.—De La Rue Systems Ltd., Banco Central Costa Rica, Operations Manual for 3530 System (GL 056411-GL 056466) (pages contain various dates in 1987).
2002 Illinois case—'806 Anticipation SJ: Ex. 7 of Emery Decl.—De La Rue Systems Ltd., Confidential System Specification 3530 Used Note Sorting System (GL 056467-GL 056493) (p. 2 contains date Mar. 20, 1986).
2002 Illinois case—'806 Anticipation SJ: Ex. 8 of Emery Decl.—De La Rue Systems 3400/3500 Series, "High Speed Currency Sorting Systems" (GL 093588-GL 093599) (p. GL 093591 contains illegible copyright date).
2002 Illinois case—'806 Anticipation SJ: Declaration of John G. Stoides in Support of Glory's Motion (Oct. 24, 2006) and De La Rue Systems 3400/3500 Series, "High Speed Currency Sorting Systems" (GL 093588-GL 093599) (p. GL 093591 contains illegible copyright date).
2002 Illinois case—'806 Anticipation SJ: Declaration of Paul D. Lacey in Support of Glory's Motion (Oct. 20, 2006) and De La Rue Systems 3000 Series, "Used banknote sorting machines" brochure (GL 092931-GL 092942) (date unknown).
2002 Illinois case—'806 Anticipation SJ: Cummins' Opposition to Defendants' Motion for Summary Judgment Declaring U.S. Pat. No. 6,459,806 Invalid under 35 U.S.C. § 102(b) on Grounds of Anticipation (Dec. 22, 2006).
2002 Illinois case—'806 Anticipation SJ: Cummins' Statement of Additional Material Facts That Require Denial of Glory's Anticipation Motion (Dec. 22, 2006).
2002 Illinois case—'806 Anticipation SJ: Cummins' Response to Glory's Statement of Material Facts for Glory's Anticipation Motion (Dec. 22, 2006).
2002 Illinois case—'806 Anticipation SJ: Ex. 3 to Ex. A to Declaration of Russell Genet in Support of Cummins Opposition to Glory's Anticipation Motion—Selected pages from "Brief History of the CVCS" by John Stoides (ST 0109-ST 0110; ST 0165-ST 0180) (dated Sep. 1, 1994).
2002 Illinois case—'806 Anticipation SJ: Declaration of Julian Albericci in Support of Cummins Opposition to Glory's Anticipation Motion (Dec. 19, 2006).
2002 Illinois case—'806 Anticipation SJ: Declaration of John DeBlasio in Support of Cummins Opposition to Glory's Anticipation Motion (Dec. 21, 2006).

2002 Illinois case—'806 Anticipation SJ: Declaration of Adrian Baxter in Support of Cummins Opposition to Glory's Anticipation Motion (Dec. 6, 2006).
2002 Illinois case—'806 Anticipation SJ: Declaration of Nick Cockram in Support of Cummins Opposition to Glory's Anticipation Motion (Dec. 19, 2006).
2002 Illinois case—'806 Anticipation SJ: Declaration of James J. Florin, III in Support of Cummins Opposition to Glory's Anticipation Motion (Dec. 18, 2006).
2002 Illinois case—'806 Anticipation SJ: Declaration of Richard Haycock in Support of Cummins Opposition to Glory's Anticipation Motion (Dec. 17, 2006).
2002 Illinois case—'806 Anticipation SJ: Declaration of Sohail Kayani in Support of Cummins Opposition to Glory's Anticipation Motion (Dec. 10, 2006).
2002 Illinois case—'806 Anticipation SJ: Declaration of Raymond A. Lombard in Support of Cummins Opposition to Glory's Anticipation Motion (Nov. 30, 2006).
2002 Illinois case—'806 Anticipation SJ: Declaration of Francisco Lopez in Support of Cummins Opposition to Glory's Anticipation Motion (Nov. 27, 2006).
2002 Illinois case—'806 Anticipation SJ: Declaration of James R. Murrill in Support of Cummins Opposition to Glory's Anticipation Motion (Dec. 14, 2006).
2002 Illinois case—'806 Anticipation SJ: Declaration of Christopher N. Phillips in Support of Cummins Opposition to Glory's Anticipation Motion (Nov. 27, 2006).
2002 Illinois case—'806 Anticipation SJ: Declaration of Edward Wilkins in Support of Cummins Opposition to Glory's Anticipation Motion (Nov. 20, 2006).
2002 Illinois case—'806 Anticipation SJ: Declaration of Geoffrey William Young in Support of Cummins Opposition to Glory's Anticipation Motion (Dec. 12, 2006).
2002 Illinois case—'806 Anticipation SJ: Glory's Reply Brief in Support of Defendants' Motion for Summary Judgment of Anticipation and Exhibits A-S (Jan. 29, 2007).
2002 Illinois case—'806 Anticipation SJ: Glory's Response to Cummins' Statement of Additional Material Facts (Jan. 29, 2007).
2002 Illinois case—'806 Anticipation SJ Decision: Glory's Motion of Anticipation of the '806 Patent Denied (Mar. 1, 2007).
2002 Illinois case—'196 Non-Infringement SJ: Glory's Memorandum in Support of Their Motion for Partial Summary Judgment of Noninfringement of US Patent No. 5,295,196 [Redacted version] (Aug. 14, 2004 re-filed Nov. 22, 2006).
2002 Illinois case—'196 Non-Infringement SJ: Glory's Statement of Undisputed Facts in Support of Motion for Partial Summary Judgment of Noninfringement of US Patent No. 5,295,196 [Redacted Version] (Aug. 17, 2004 re-filed Nov. 22, 2006).
2002 Illinois case—'196 Non-Infringement SJ: Declaration of Shoji Tomiya in Support of Glory's Motion for Partial Summary Judgment of Noninfringement of US Patent No. 5,295,196 [Redacted Version] (Aug. 17, 2004 re-filed Nov. 22, 2006).
2002 Illinois case—'196 Non-Infringement SJ: Ex. 2 to Declaration of Manuel Nelson in Support of Glory's Motion for Partial Summary Judgment of Noninfringement of U.S. Patent No. 5,295,196—Webster's Ninth Collegiate Dictionary, pp. 221, 917, & 1063 (1990).
2002 Illinois case—'196 Non-Infringement SJ Decision: Order Granting Glory's Motion for Partial Summary Judgment of Non-Infringement of USP 5,295,196 (Mar. 9, 2007).
2002 Illinois case—Joint Claim Construction Chart for U.S. Patent 5,295,196 and U.S. Patent 6,459,806 (May 26, 2006).
2002 Illinois case—Cummins' Opening Claim Construction Brief (Jun. 9, 2006).
2002 Illinois case—Glory's Claim Construction Brief (Jun. 30, 2006).
2002 Illinois case—Declaration of L. McClure (Glory's attorney) and Exhibit D in Support of Glory's Claim Construction Brief (Jun. 30, 2006).
2002 Illinois case—Cummins' Reply Claim Construction Brief and Index of Exhibits 1-5 (Jul. 7, 2006).
2002 Illinois case—Cummins' Supplemental Set of Interrogatories to Glory Regarding Newly Found De La Rue Machines (Dec. 26, 2006).
2002 Illinois case—Glory's Status Report re: De La Rue Machines (Jan. 29, 2007).
2002 Illinois case—Cummins' Amended Reply to Glory's Counterclaims (Jan. 24, 2007).
2002 Illinois case—Cummins' Addendum to Exhibit C of Pretrial Order: Joint Exhibit List (Feb. 13, 2007).
2002 Illinois case—Glory's Addendum to Attachment C of Pretrial Order (Feb. 14, 2007).
2002 Illinois case—Cummins' Three Page Memorandum Pursuant to the Order of Feb. 23, 2007 Asking the Court to Consider or Reconsider Three Issues (Feb. 28, 2007).
2002 Illinois case—Glory's Submission of Three Matters for Which It Requests Reconsideration (Feb. 28, 2007).
2002 Illinois case—Court's docket for the 2002 Illinois case (Jun. 29, 2007).
2003 Illinois case—Court's docket for the 2003 Illinois case (Jun. 29, 2007).
2003 Texas case—Court's docket for the 2003 Texas case (Jun. 29, 2007).
'806 Reexam, U.S. Appl. No. 95/001,004: USPTO Decision *Sua Sponte* Vacacting *Inter Partes* Reexamination Filing Date, 15 pages (Dec. 11, 2007).
'806 Reexam, U.S. Appl. No. 95/001,004: IDS filed by Amro-Asian Trade, Inc., 4 pages (Jan. 10, 2008).
'806 Reexam, U.S. Appl. No. 95/001,004: Replacement Request for Inter Parte Reexamination of U.S. Pat. No. 6,459,806, 323 pages (Jan. 10, 2008).
'806 Reexam, U.S. Appl. No. 95/001,004: Declaration of Paul D. Lacey (Jan. 10, 2008).
'806 Reexam, U.S. Appl. No. 95/001,004: Declaration of Stehpen G. Emery (Jan. 10, 2008).
'806 Reexam, U.S. Appl. No. 95/001,004, Ex. O: De La Rue Systems 3100 brochure, "At 8 p.m. tonight this bill could put your ATM down," 6 pages (undated).
*Complaint Cummins-Allison Corp. v. Glory Ltd., Glory Shoji Co. Ltd., and Glory (U.S.A.), Inc.*, Civil Action No. 02C-7008, N.D. Ill.
Redacted Declaration of Hiroya Mouri (12 pages) (Nov. 19, 2002).
Glory Model UF-1, Instruction Manual (30 pages) (date uncertain, prior to Nov. 20, 2002)(Japanese)[Nov. 19, 2002 Mouri Ex. 1].
Glory Model UF-1, Translation of Instruction Manual—(29 pages) (date uncertain, prior to Nov. 20, 2002) (Glory's translation) [Nov. 19, 2002 Mouri Ex. 1a].
Glory UF-1 brochure (2 page)(date unknown, prior to Nov. 20, 2002) (Japanese) [Nov. 19, 2002 Mouri Ex. 2].
Glory GFB-30 brochure (2 page) (date unknown, prior to Nov. 20, 2002) (Japanese) [Nov. 19, 2002 Mouri Ex. 3].
Glory GFB-30 operation manual (16 pages) (date unknown, prior to Nov. 20, 2002) (Japanese) [Nov. 19, 2002 Mouri Ex. 6].
Glory GSA-500 Service Manual (119 pages) (May 1989) [Nov. 19, 2002 Mouri Ex. 5].
Glory GFU-200 operator manual (26 pages) (date unknown, first page marked 92-3-2) (Japanese) [Nov. 19, 2002 Mouri Ex. 8].
Glory GFR-110 Instruction Manual—Currency Reader Counter (26 pages) (dated Aug. 23, 1999) [Nov. 19, 2002 Mouri Ex. 10].
Glory GFR-S Series Currency Counters/Discriminators GFR-S60; GFR-S80; GFR-S80V (4 pages) (date © 2002) [Nov. 19, 2002 Mouri Ex. 12].
Declaration of Sadaaki Uesaka (7 pages) (Nov. 19, 2002).
Glory's Monthly Newsletter, Jun. 1985 (38 pages) (Japanese) [Nov. 19, 2002 Uesaka Ex. 2].
Glory's Monthly Newsletter, Jun. 1985—partial translation (4 pages) [Nov. 19, 2002 Uesaka Ex. 3].
Glory Money O.A. Catalog, Jun. 1989 (44 pages) (Japanese) [Nov. 19, 2002 Uesaka Ex. 5].
Declaration of Akira Hoyo (5 pages) (Nov. 15, 2002).
Billcon D-202/204 Service Manual—Second Translation (Glory) (cover marked 630229) (25 pages) [Nov. 15, 2002 Hoyo Ex. 2a].
Billcon D-202/204—Nikkin Newspaper ad, Apr. 17, 1987 (2 pages) (Japanese) [Nov. 15, 2002 Hoyo Ex. 3].

Billcon D-202/204—Nikkin Newspaper ad, Apr. 17, 1987 (2 pages) (English translation) [Nov. 15, 2002 Hoyo Ex. 3a].
Billcon D-202/204 brochure (2 pages) (date uncertain, prior to Nov. 20, 2002) (Japanese) [Nov. 15, 2002 Hoyo Ex. 5].
Billcon D-202/204 brochure (2 pages) (date uncertain, prior to Nov. 20, 2002) (English translation) [Nov. 15, 2002 Hoyo Ex. 5a].
Billcon D-202/204 videotape of Japanese television show entitled "Small and Worldwide Companies" (allegedly aired Jan. 10, 1988) (Japanese) [Nov. 15, 2002 Hoyo Ex. 6].
Declaration of Philip C. Dolsen (6 pages)(Nov. 20, 2002).
Dolsen, Philip C. Cirriculum (4 pages) (Oct. 29, 2002) [Nov. 20, 2002 Dolsen Ex. 1].
OKI Semiconductor data book, MSM80C85A-2RS/GS/JS—8 Bit CMOS Microprocessor (10 pages) (alleged Mar. 1989) [Nov. 20, 2002 Dolsen Ex. 3A].
OKI Semiconductor data book, MSM80C88A-2RS/GS/JS—8 Bit CMOS Microprocessor (27 pages) (alleged Mar. 1989) [Nov. 20, 2002 Dolsen Ex. 3B].
Intel 80286, Intel data sheet, High Performance Microprocessor with Memory Management and Protection (28 pages; pp. 3-1 to 3-55) (alleged 1988) [Nov. 20, 2002 Dolsen Ex. 4].
NEC uPD780C-1 Microprocessor, NEC data book (23 pages; pp. 4-3 to 4-25) (alleged 1987) [Nov. 20, 2002 Dolsen Ex. 5].
NEC PD70216 processor, NEC data book (34 pages; pp. 3-161 to 3-227) (alleged 1987) [Nov. 20, 2002 Dolsen Ex. 6].
Dolsen claim chart for claims 40-43, 46-48, 76-78, 81, 101, 105, 108, 110-111 U.S. Pat. No. 6,459,806 [Nov. 20, 2002 Dolsen Ex. 7].
Glory GFR-S80V Operation Keys, pp. 1-11 (May 17, 2002) English (GL000106-116).
Glory Catalog pp. 4-11 listing various Glory machines including GFU-100, GFF-8CF, GFF-8, GFB-500/520, GFF-8E, and GSA-500 and maintenance policy and fees, English (GL001916-1923) (date uncertain, last page dated Aug. 15, 1990).
De La Rue 3000 Series Used banknote sorting machines, 10 legal size pages, English (GL001924-33) (date uncertain, prior to Nov. 4, 2002).
De La Rue 3400/3500 Series High Speed Currency Sorting Systems brochure, 4 pages, English (GL001934-37)(© 1989).
The New Billcon K-300 Series brochure, 2 pages, English (GL002389-90) (Dec. 1999).
The New Billcon N-Series Compact Note Counter brochure, 2 pages, English (GL002391-92) (© 2000).
The New Billcon K-300 Series Brochure, 2 pages, (© 1999) English (GL002396-97).
Billcon D-202/204 brochure, 2 pages, Japanese (date uncertain, prior to Nov. 17, 2002) (GL002398-99).
De La Rue Teller Cash Dispatch™ Applications brochure, 8 pages, (© 1999) English (GL002475-2482).
De La Rue Cash Systems, Coin Processing Banknote Counting brochure, 4 legal pages, (date uncertain, prior to Nov. 17, 2002) English (G1002485-88).
De La Rue Cash Systems, 2650 Currency Counting Machine brochure, 2 pages, (date uncertain, prior to Nov. 17, 2002) English (GL002489-90).
De La Rue Cash Systems, The Euro Range for Note and Coin Handling brochure, 4 pages, (date uncertain, prior to Nov. 17, 2002) English (GL002491-94).
Currency Systems International Cobra™ Banknote Sorter brochure, 3 pages (middle page legal), (© 2001) English (GL002495-97).
De La Rue Cash Systems Cobra™ 4004 Banknote Sorter brochure, 2 legal pages, (© 2001) English (GL002498-99).
De La Rue Cash Systems TCR Twin Safe™ Teller Cash Recycler, 2 pages, (© 2001) English (GL002500-01).
De La Rue's WestLB Panmure Marketing Pamphlet regarding Cash Systems Division, 16 pages, (Apr. 29, 2002) English (GL002502-17).
De La Rue Cash Systems 2800 VB Value Balancing currency counter brochure, 2 pages (Sep. 1999) English (GL002518-19).
De La Rue Cash Systems 8672 Máquina contadora de billetes brochure, 2 pages (date uncertain, handwritten date Nov. 1999) (Spanish) (GL002520-21).
Sprintquip Quicksort™ 2800 brochure, 2 pages, (hand dated Sep. 1999) English (GL002523-24).
Brandt® Model 8643 Currency/Document Counter brochure, 2 pages, (© 1995) English (GL002527-28).
De La Rue Cash Systems 2700VB Currency Counting Machine brochure, 2 pages (hand dated Sep. 1999) English (GL002529-30).
De La Rue Cash Systems Brandt 8625 Currency Counting Machine, 2 pages (hand dated Nov. 1999) English (GL002531-32).
De La Rue Cash Systems Branch Cash Automation Applications (Powerpoint), 28 pages, (date uncertain, prior to Nov. 7, 2002) English (GL002539-66).
De La Rue Commercial Self Service (Powerpoint), 24 pages, (date uncertain, prior to Nov. 7, 2002) English (GL002567-90).
De La Rue Automated Depositories (Powerpont), 2 pages, (date uncertain, prior to 11/7/02) English (GL002591-92).
De La Rue Systems 2800VB Value Balancing Sorter/Counter brochure, 2 pages, (date uncertain, prior to Nov. 7, 2002) English (GL002593-94).
De La Rue Systems 2700VB Specification page of brochure, 1 page, (date uncertain, prior to Nov. 7, 2002) English (GL002595).
Magner® 15 Desktop banknote counter brochure, 2 pages, (date uncertain, prior to Nov. 7, 2002) English (GI002596-97).
Mag II Model 20 Currency Counter brochure, 2 pages, (date uncertain, prior to Nov. 7, 2002) English (GL002605-06).
Banc Equip Magner Products Product Price List, 2 pages, (date uncertain, prior to Nov. 7, 2002) English (GL002613-14).
Magner Model 35 Currency Counting Machines brochure, 2 pages, (date uncertain, prior to Nov. 7, 2002) English (GL002625-26).
Magner 75 Series Currency Counting Machines brochure, 2 pages, (date uncertain, prior to Nov. 7, 2002) English (GL002627-28).
G&D BPS 200 Desktop Banknote Processing System brochure, 10 pages, (date uncertain, prior to Nov. 7, 2002) English (GL002629-38).
G&D BPS 200 Desktop Banknote Processing System brochure, 2 pages, (date uncertain, prior to Nov. 7, 2002) English (GL002643-44).
G&D One Size Does Not Fit All! Brochure, I page, (date uncertain, prior to Nov. 7, 2002) English (GL002645).
G&D BPS 500 Banknote Processing System brochure, 4 pages, (date uncertain, prior to Nov. 7, 2002) English (GL002646-49).
G&D Numeron webpage picture of sorting machine and Design Award for Numeron, 2 page, (Mar. 29, 2002) (GL002650-51).
G&D BPS 200 Banknote Processing System brochure, 2 pages, (date uncertain, prior to Nov. 7, 2002) English (GL002652-53).
G&D BPS 500 Banknote Processing System brochure, 1 page (hand dated Sep. 1999) English (GL002654).
G&D Company Magazine, 36 pages, (Mar. 1998) English (GL002655-90).
G&D Cards and Card Systems brochure, 15 pages, (© 1998) English (GL002691-2705).
G&D Portrait of a Company Group brochure, 19 pages, (© 1997?) English (GL002706-24).
Mosier TouchSort™ *Plus* Currency Processing System brochure, 2 pages (© 1999) English (GL002727-28).
Mosler Satellite Branch Facilities—Riddell National Bank, Brazil, Indiana brochure, 1 page, (date uncertain, prior to Nov. 7, 2002) English (GL002729).
Mosler TouchSort™ Currency Processing System brochure, 2 pages, (date uncertain, prior to Nov. 7, 2002) English (GL002730-31).
Mosler marketing brochure, 4 pages, (© 1999) English, (GL002732-35).
Glory UC-10-10A Brochure, 2 pages, (date uncertain, prior to Nov. 7, 2002) Japanese (GL002777-78).
Glory UC-10A pamphlet, 1 legal page, (date uncertain, prior to Nov. 7, 2002) Japanese (GL002779).
Glory pamphlet of various machines, 1 legal page, (date uncertain, prior to Nov. 7, 2002) Japanese (GL002780).
Glory UF-1 brochure, 2 pages, (date uncertain, prior to Nov. 7, 2002) Japanese (GL002781-82).
Glory GFU-200 Desk-top Currency Fitness Sorter/Counter brochure, 2 pages, (date uncertain, prior to Nov. 7, 2002) English (GL002839-40).
Glory GFR-100 Currency Reader Counter brochure, 4 pages, (© 1995, English (GL002860-63).

Glory GFR-100 Currency Reader Counter Instruction Manual, 31 pages (Jan. 8, 1996) English (GL002864-94).
Glory Tank Currency Discriminators GFR-110 & GFR-S80 brochure, 2 pages, (© 2000) English (GL002959-60).
Glory Currency Reader Counter GFR-S80, S60 Instruction Manual, 33 pages (Nov. 1, 2000) English (GL002961-93).
Glory UW-100 Compact Currency Fitness Sorter brochure, 2 pages (© 1999) English (GL003027-28).
Glory Currency Fitness Sorter UW-100 Instruction Manual, 38 pages (Feb. 19, 2002) English (GL003029-66).
Glory UW-200 Multi-Purpose Company Currency Sorter brochure, 2 legal pages (© 1999) English (GL003067).
Glory Currency Sorter UW-200 With Fitness sorting mode (FIT) Instruction Manual, 44 pages (Oct. 23, 2001) English (GL003068-111).
Billcon D-202-204 brochures, 6 pages, (date uncertain, prior to Nov. 7, 2002) Japanese (G1003112-17).
Billcon® R-900 E-DS Note Counter with Dual Speed and Denomination Sorting Function brochure, 2 pages, (date uncertain, prior to Nov. 7, 2002) English (GL003167-68).
Billcon R-900DS Currency Counter Operating Manual, 6 pages, (date uncertain, prior to Nov. 7, 2002) English (GL003169-74).
Billcon R-900 Currency Counter Service Manual (601221), 31 pages, (date uncertain, prior to Nov. 7, 2002) English (GL003175-3205).
Translation of JP S60-215293 (E2 above).
'046 Reexam, Control No. 95/001,220: USPTO, Order Granting/Denying Request for Inter Partes Reexamination, 36 pages (Oct. 26, 2009).
'046 Reexam, Control No. 95/001,220: Office Action, 15 pages (Oct . 26, 2009).
2007 Texas case: Order denying Defendant's Motion for Summary Judgment of Invalidity and No Willful Infringement, 10 pages (Apr. 14, 2009).
2007 Texas case: Defendants' Motion for Leave to Amend Their Answer, 13 pages (Sep. 18, 2009.
2007 Texas case: Defendants' Supplemental Tenth Affirmative Defense, 12 pages (Sep. 18, 2009).
2007 Texas case: J. Albericci Deposition minuscript cited in Defendants' Supplemental Tenth Affirmative Defense, 106 pages (Jan. 4, 2007).
2007 Texas case: S. Emery Deposition minuscript cited in Defendants' Supplemental Tenth Affirmative Defense, 82 pages (Nov. 9, 2006).
2007 Texas case: P. Lacey Deposition minuscript cited in Defendants' Supplemental Tenth Affirmative Defense, 84 pages (Nov. 10, 2006).
2007 Texas case: S. Emery Deposition minuscript, 86 pages (Feb. 11, 2006).
2007 Texas case: S. Emery Deposition minuscript, 26 pages (Jan 16, 2007).
2007 Texas case: Cummins' Opposition to Defendants' Motion to Amend Their Answer and Exhibits 1-3, 95 pages (Oct. 1, 2009).
2007 Texas case: Defendants' Reply to Cummins' Opposition to Defendants' Motion for Leave to Amend Their Answer, 8 pages (Sep. 18, 2009).
2007 Texas case: Order Granting Defendants' Motion for Leave to Amend Their Answer, 13 pages (Oct. 21, 2009).
2007 Texas case: Jury Verdict, 9 pages (Oct. 7, 2009).
2007 Texas case: Defendants Brief for the Oct. 22, 2009 Hearing, 27 pages (Oct. 16, 2009).
2007 Texas case: Excerpts of Cummins' Post-Trial Motions, 20 pages (Oct. 16, 2009) [redacted].
2007 Texas case: Cummins' Response to Defendants Post-Trial Brief, 27 pages (Oct. 19, 2009).
2007 Texas case: Excerpts from Defendants' Response to Cummins' Brief for the Oct. 22, 2009 Hearing, 24 pages (Oct. 19, 2009) [redacted].
2007 Texas case: Order re Damages for Post-Verdict Sales of Infringing Products, 12 pages (Oct. 30, 2009).
2007 Texas case: Memorandum and Order re Post-Trial Motions, 15 pages (Oct. 30, 2009).
2007 Texas case: Final Judgment and Permanent Injunction, 2 pages (Oct. 30, 2009).
2007 Texas case: Day 1 Trial Transcript-mini, 83 pages (Sep. 28, 2009).
2007 Texas case: Day 2 Trial Transcript-mini, 95 pages (Sep 29, 2009).
2007 Texas case: Day 3 Trial Transcript-mini, 122 pages (Sep. 30, 2009).
2007 Texas case: Day 4 Trial Transcript-mini, 113 pages (Oct. 1, 2009).
2007 Texas case: Day 5 Trial Transcript-mini, 78 pages (Oct. 2, 2009).
2007 Texas case: Day 6 Trial Transcript-mini, 115 pages (Oct. 5, 2009).
2007 Texas case: Day 7 Trial Transcript-mini, 75 pages (Oct. 6, 2009).
2007 Texas case: Day 8 Trial Transcript-mini, 15 pages (Oct. 7, 2009).
2007 Texas case: Transcript (mini) of hearing on Post-Trial Motions, 81 pages (Oct. 22, 2009).
2007 Texas case: Transcript (mini) of hearing on Post-Trial Motions, 22 pages (Oct. 23, 2009).
'046 Reexam, Control No. 95/001,220: Form PTO/SB/58 Request for Inter Partes Reexamination Transmittal Form, 3 pages (Aug. 12, 2009).
'046 Reexam, Control No. 95/001,220: Request for Inter Partes Reexamination, 63 pages (Aug. 12. 2009).
'046 Reexam, Control No. 95/001,220: Appendix 1 to Request for Inter Partes Reexamination, 199 pages (Aug. 12, 2009).
'046 Reexam, Control No. 95/001,220: Appendix 2 to Request for Inter Partes Reexamination, 10 pages (Aug. 12, 2009).
'046 Reexam, Control No. 95/001,220: Appendix 3 to Request for Inter Partes Reexamination, 134 pages (Aug. 12, 2009).
'046 Reexam, Control No. 95/001,220: Appendix 4 to Request for Inter Partes Reexamination, 39 pages (Aug. 12, 2009).
'046 Reexam, Control No. 95/001,220: Appendix 5 to Request for Inter Partes Reexamination, 189 pages (Aug. 12, 2009).
'046 Reexam, Control No. 95/001,220: Appendix 6 to Request for Inter Partes Reexamination, 4 pages (Aug. 12, 2009).
'046 Reexam, Control No. 95/001,220: Appendix 7 to Request for Inter Partes Reexamination, 41 pages (Aug. 12, 2009).
'046 Reexam, Control No. 95/001,220: Appendix 8 to Request for Inter Partes Reexamination, 119 pages (Aug. 12, 2009).
'046 Reexam, Control No. 95/001,220: Appendix 9 to Request for Inter Partes Reexamination, 135 pages (Aug. 12, 2009).
'046 Reexam Ex. I: Glory: GFR-100 Currency Reader Counter, Instruction Manual, 32 pages [AMRO 01103-AMRO 01133] (p. AMRO 01132 bears date Aug. 31, 1995).
'046 Reexam Ex. J: Glory: GFR-100 Currency Reader Counter, Service Manual, 73 pages [AMRO 01031- AMRO 01102] (p. AMRO 01031 bears date Dec. 1995).
'046 Reexam Ex. K: Declaration of Tom Glesener regarding Glory GFR-100 and Ex. A thereto, 8 pages Jul. 15, 2009).
'046 Reexam Ex. M: Declaration of Stephen G. Emery, 7 pages (Aug. 10, 2009).
'046 Reexam Ex. M-1: De La Rue 3400 brochure, 7 pages (undated, Reexam filed Aug. 2009).
'046 Reexam Ex. M-2: Intel—15 Year History, 15 pages (1984).
'046 Reexam Ex. M-3: Intel 8086 Datasheet, 8086 16-Bit HMOS Microprocessor 8086/8086-2/8086-1, 31 pages (Sep. 1990).
'046 Reexam Ex. M-4: Texas Instrument TMS 9900 Microprocessor Data Manual, 42 pages (Dec. 1976).
'046 Reexam Ex. M-5: Intel—20 Year History, 11 pages (1989).
'046 Reexam Ex. P: Prosecution of U.S. Appl. No. 07/475,111, 101 pages [CG 0038564—CG 0038667] (filed Feb. 5, 1990, notice of abandonment 1992).
'046 Reexam Ex. Q: Prosecution of U.S. Appl. No. 07/885,648 110 pages [CG 0035403—CG 0035526] (filed May 19, 1992, issued as US 5,295,196 Mar. 1994).
'046 Reexam, Control No. 95/001,220: IDS filed by Mr. Siddiqui, 5 pages (Aug. 12, 2009).
'806 $2^{nd}$ Reexam, Control No. 95/001,029: Office Action, 23 pages (Mar. 27, 2009).

'806 2nd Reexam, Control No. 95/001,029: Patent Owner's Response Ex. 1, Deposition of Stephen Emery, 9 pages (Nov. 9, 2006).

'806 2nd Reexam, Control No. 95/001,029: Patent Owner's Response Ex. 2, Deposition of Paul Lacey, 7 pages (Nov. 10, 2006).

'806 2nd Reexam, Control No. 95/001,029: Patent Owner's Response Ex. 3, De La Rue Systems, Provisional Operator Instructions 3100 Series, [p. X0002 entitled De La Rue Systems 3110 Currency Fitness Sorter Operators Manual], 36 pages (some pages bear Jun. 1985).

'806 2nd Reexam, Control No. 95/001,029: Patent Owner's Response Ex. 4, Cummins Inter-Office Correspondence Re: JetScan Application for Bank of America Central Vault—Los Angeles, 15 pages (Jan. 26, 1995).

'806 2nd Reexam, Control No. 95/001,029: Patent Owner's Response Ex. 5, De La Rue 2700 Currency Counting Machine User Guide, 54 pages [CG 0021588—CG 0021620] (some pages bear date Aug. 26, 1999, e.g., CG 0021619).

'806 2nd Reexam, Control No. 95/001,029: Patent Owner's Response, John DiBlasio Declaration submitted with Patent Owner's Response filed Jun. 29, 2009, 16 pages (Jun. 25, 2009).

'806 2nd Reexam, Control No. 95/001,029: Patent Owner's Response, William Jones Declaration submitted with Patent Owner's Response filed Jun. 29, 2009, 9 pages (Jun. 26, 2009).

'806 2nd Reexam, Control No. 95/001,029: Patent Owner's Response, Francisco Lopez Declaration submitted with Patent Owner's Response filed Jun. 29, 2009, 11 pages (Jun. 18, 2009).

'806 2nd Reexam, Control No. 95/001,029: Patent Owner's Response, Douglas Mennie Declaration submitted with Patent Owner's Response filed Jun. 29, 2009, 6 pages (Jun. 25, 2009).

'806 2nd Reexam, Control No. 95/001,029: Third Party Requester Comments to Patent Owner's Response and First Office Action, 55 pages (Jul. 27, 2009).

'806 2nd Reexam, Control No. 95/001,029: Jul. 27, 2009 Third Party Requester Comments, Ex. 1, D. Magee Deposition, 16 pages (Apr. 9, 2009).

'806 2nd Reexam, Control No. 95/001,029: Jul. 27, 2009 Third Party Requester Comments, Ex. 3, P. Zambito Declaration, 2 pages (Jul. 29, 2009).

'806 2nd Reexam, Control No. 95/001,029: Jul. 27, 2009 Third Party Requester Comments, Ex. 5, W. Jones Declaration, 9 pages (Oct. 1, 2002).

'806 2nd Reexam, Control No. 95/001,029: Jul. 27, 2009 Third Party Requester Comments, Ex. 6, D. Mennie expert report, 4 pages (Dec. 2, 2008).

'806 2nd Reexam, Control No. 95/001,029: Jul. 27, 2009 Third Party Requester Comments, Ex. 7, A. Bauch expert report, 6 pages (Dec. 3, 2008).

'806 2nd Reexam, Control No. 95/001,029: Jul, 27, 2009 Third Party Requester Comments, Ex. 9, G. Dolgins Deposition, 97 pages (Jan. 9, 2007).

'806 2nd Reexam, Control No. 95/001,029: Jul. 27, 2009 Third Party Requester Comments, Ex. 11, De La Rue 3100 Operator Instructions, 20 pages [CG 0051591—CG 0051610] (produced in litigation on Nov. 17, 2008).

'806 2nd Reexam, Control No. 95/001,029: Jul. 27, 2009 Third Party Requester Comments, Ex. 12, F. Lopez Deposition, 111 pages (Dec. 29, 2006).

'806 2nd Reexam, Control No. 95/001,029: Jul. 27, 2009 Third Party Requester Comments, Ex. 13, G. Young Deposition, 179 pages (Dec. 13, 2006).

'806 2nd Reexam, Control No. 95/001,029: Jul. 27, 2009 Third Party Requester Comments, Ex. 14, J. DiBlasio Deposition, 27 pages (Dec. 19, 2006).

'806 2nd Reexam, Control No. 95/001,029: Jul. 27, 2009 Third Party Requester Comments, Ex. 15, P. Hildrew Deposition, 77 pages (Dec. 6, 2006).

'806 2nd Reexam, Control No. 95/001,029: Jul. 27, 2009 Third Party Requester Comments, Ex. 16, C. Chapman Deposition, 84 pages (Dec. 5, 2006).

'806 2nd Reexam, Control No. 95/001,029: Jul. 27, 2009 Third Party Requester Comments, Ex. 17, J. Stoides Deposition, 190 pages (Jan. 13, 2007).

'806 2nd Reexam, Control No. 95/001,029: Jul. 27, 2009 Third Party Requester Comments, Ex. 18, Excerpts of expert reports of J. DiBlasio (Dec. 3, 2008), F. Lopez (Dec. 18, 2008), and G. Young (Dec. 2008), 9 pages.

'456 1st Reexam, Control No. 90/010,057 & '456 2nd Reexam, Control No. 90/010,212: Office Action, 11 pages (Mar. 19, 2009).

'456 1st Reexam, Control No. 90/010,057 & '456 2nd Reexam, Control No. 90/010,212: Patent Owner's Response, 122 pages (Jun. 19, 2009).

'456 1st Reexam, Control No. 90/010,057 & '456 2nd Reexam, Control No. 90/010,212: J. DiBlasio Declaration submitted with Patent Owner's Response, 18 pages (Jun. 16, 2009).

'456 1st Reexam, Control No. 90/010,057 & '456 2nd Reexam, Control No. 90/010,212: F. Lopez Declaration submitted with Patent Owner's Response, 11 pages (Jun. 18, 2009).

'456 1st Reexam, Control No. 90/010,057 & '456 2nd Reexam, Control No. 90/010,212: G. Young Declaration submitted with Patent Owner's Response, 8 pages (Jun. 18, 2009).

'456 1st Reexam, Control No. 90/010,057 & '456 2nd Reexam, Control No. 90/010,212: W. Jones Declaration submitted with Patent Owner's Response 10 pages (Jun. 19, 2009).

'456 1st Reexam, Control No. 90/010,057 & '456 2nd Reexam, Control No. 90/010,212: Patent Owner's Response Ex. 1, Expert Report of Stephen G. Emery, 5 pages (Dec. 3, 2008).

'456 1st Reexam, Control No. 90/010,057 & '456 2nd Reexam, Control No. 90/010,212: Patent Owner's Response Ex. 2, De La Rue Systems Limited System, Specification 3530 Used Note Sorting System, 28 pages [CG 0056397—CG 0056423; GL 056467—GL 056493] (Mar. 20, 1986).

'456 1st Reexam, Control No. 90/010,057 & '456 2nd Reexam, Control No. 90/010,212: Patent Owner's Response Ex. 3, De La Rue Systems Limited, Hong Kong & Shanghai Banking Corpn., Operations Manual for 3530 System Machine No. 4, 52 pages [CG 0056290—CG 0056340; GL 056360—GL 056410] (Jan. 1986).

'456 1st Reexam, Control No. 90/010,057 & '456 2nd Reexam, Control No. 90/010,212: Patent Owner's Response Ex. 4, De La Rue Limited Portsmouth Technical Manual 3500 Used Banknote Sorting Machine, 260 pages [DLR 000552—DLR 000810; CG 0058929—CG 0059187] (Apr. 1983).

'456 1st Reexam, Control No. 90/010,057 & '456 2nd Reexam, Control No. 90/010,212: Patent Owner's Response Ex. 5, De La Rue Systems Limited, Banco Central Costa Rica, Operations Manual for 3530 System, 57 pages [CG 0056341—CG 0056396; GL 056411—GL 056466] (Sep. 1987).

'456 1st Reexam, Control No. 90/010,057 & '456 2nd Reexam, Control No. 90/010,212: Patent Owner's Response Ex. 6, De La Rue Systems, Modular Acceptance Test Procedure Banco Central Do Brazil, 36 pages [CG 0056822—CG 0056856; GL 093600—GL 093634] (Oct. 20, 1988).

'456 1st Reexam, Control No. 90/010,057 & '456 2nd Reexam, Control No. 90/010,212: Patent Owner's Response Ex. 7, De La Rue Systems, Modular Acceptance Test Procedure, Banco Central Do Brazil, 34 pages [CG 0056257—CG 0056289; GL 056325—GL 056359] (Oct. 20, 1988).

'456 1st Reexam, Control No. 90/010,057 & '456 2nd Reexam, Control No. 90/010,212: Patent Owner's Response Ex. 8, Deposition of Stephen Emery, 10 pages (Nov. 9, 2006).

'456 1st Reexam, Control No. 90/010,057 & '456 2nd Reexam, Control No. 90/010,212: Patent Owner's Response Ex. 9, Deposition of Paul Lacey, 11 pages (Nov. 10, 2009).

'456 1st Reexam, Control No. 90/010,057 & '456 2nd Reexam, Control No. 90/010,212: USPTO Ex Parte Reexamination Communication, Notice of Intent to Issue Ex Parte Reexamination Certificate, 24 pages (Jul. 28, 2009).

'354 1st Reexam, Control No. 90/010,060 & '354 2nd Reexam, Control No. 90/010,217: Office Action, 15 pages (Mar. 19, 2009).

'354 1st Reexam, Control No. 90/010,060 & '354 2nd Reexam, Control No. 90/010,217: Patent Owner's Response and Ex.1 thereto, 85 pages (Jun. 19, 2009).

'354 1st Reexam, Control No. 90/010,060 & '354 2nd Reexam, Control No. 90/010,217: Patent Owner's Response Ex.2, 4 pages (Jul. 28, 2008).

'354 1st Reexam, Control No. 90/010,060 & '354 2nd Reexam, Control No. 90/010,217: Declaration of D. Mennie filed with Jun. 19. 2009 Response, 10 pages (Jun. 16, 2009).

'354 1st Reexam, Control No. 90/010,060 & '354 2nd Reexam, Control No. 90/010,217: Patent Owner's Supplemental Amended Response, 84 pages (Jun. 23, 2009).

'354 1st Reexam, Control No. 90/010,060 & '354 2nd Reexam, Control No. 90/010,217: USPTO Ex Parte Reexamination Communication, Notice of Intent to Issue Ex Parte Reexamination Certificate, 10 pages (Aug. 27, 2009).

'503 Reexam, Control No. 90/010,059: Form PTO/SB/57 Request for Ex Parte Reexamination Transmittal Form, 4 pages. (Nov. 29, 2007).

'503 Reexam, Control No. 90/010,059: IDS filed by Amro-Asian Trade, Inc., 4 pages (Nov. 29, 2007).

'503 Reexam, Control No. 90/010,059: Ex Parte Reexamination Papers filed by Amro-Asian Trade, Inc. through Hogan & Hartson, LLP, 126 pages (Nov. 29, 2007).

'503 Reexam, Control No. 90/010,059 Ex. B: Selected Papers from Prosecution History of U.S. Pat. No. 5,909,503, 10 pages [EXH B0001—B0010] (1998).

'503 Reexam, Control No. 90/010,059 Ex. I: De La Rue 3110 MK2 Currency Fitness Sorter Operator's Manual, 42 pages [EXH. I0001—I0042] (Aug. 1988).

'503 Reexam, Control No. 90/010,059 Ex. L: Bibliographic Data Sheet for U.S. Pat. No. 4,875,589, 3 pages [EXH L0001—L0003] (Nov. 26, 2007).

'503 Reexam, Control No. 90/010,059: Form PTO/SB/57 Request for Ex Parte Reexamination Transmittal Form, 2 pages (Jan. 16 2008).

'503 Reexam, Control No. 90/010,059: IDS filed by Amro-Asian Trade, Inc., 4 pages (Jan. 14, 2008).

'503 Reexam, Control No. 90/010,059: Ex Parte Reexamination Papers filed by Amro-Asian Trade, Inc. through Hogan & Hartson, LLP, 120 pages (Jan. 16, 2008).

'503 Reexam, Control No. 90/010,059: USPTO Ex Parte Reexamination Communication, Order Granting/Denying Request for Ex Parte Reexamination, 22 pages (Mar. 7, 2008).

'503 Reexam, Control No. 90/010,059: Office Action, 10 pages (Mar. 23, 2009).

'503 Reexam, Control No. 90/010,059: Patent Owner's Response to Office Action, 31 pages (Jun. 23, 2009).

'503 Reexam, Control No. 90/010,059: Patent Owner's Response Ex 1, 2007 Texas case, Defendants' SBM Co., Ltd. and AMRO-ASIAN Trade, Inc.'s Motion for Partial Summary Judgement of Invalidity and No Willfull Infringement, 38 pages (Jan. 16, 2009).

'503 Reexam, Control No. 90/010,059: Patent Owner's Response Ex 2, 2007 Texas case, Plaintiff Cummins' Memorandum in Opposition to Defendant's Motion for Summary Judgment, 38 pages (Feb. 2, 2009).

'503 Reexam, Control No. 90/010,059: Patent Owner's Response Ex 3, 2007 Texas case, Order Denying Defendants' Motion for Summary Judgment, 11 pages (Apr. 14, 2009).

'503 Reexam, Control No. 90/010,059: Patent Owner's Response Ex 4, 2007 Texas case, Order on Agreed Claim Terms of United States Patent Nos. 6,459,806, 5,966,456, 6,381,354 & 5,909,503, 4 pages (Jul. 28, 2008).

'503 Reexam, Control No. 90/010,059: USPTO Ex Parte Reexamination Communication, Notice of Intent to Issue Ex Parte Reexamination Certificate, 22 pages (Aug. 5, 2009).

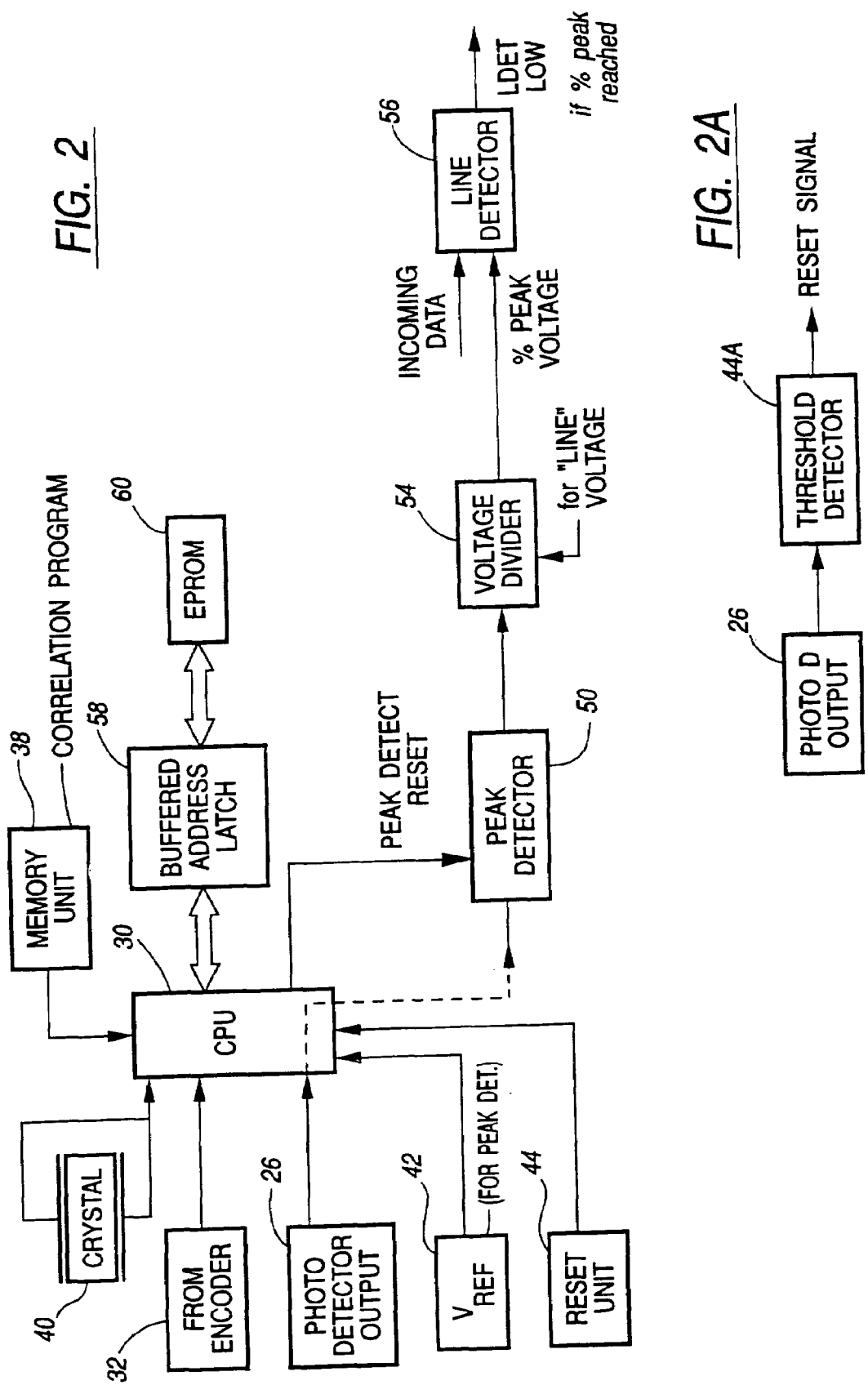

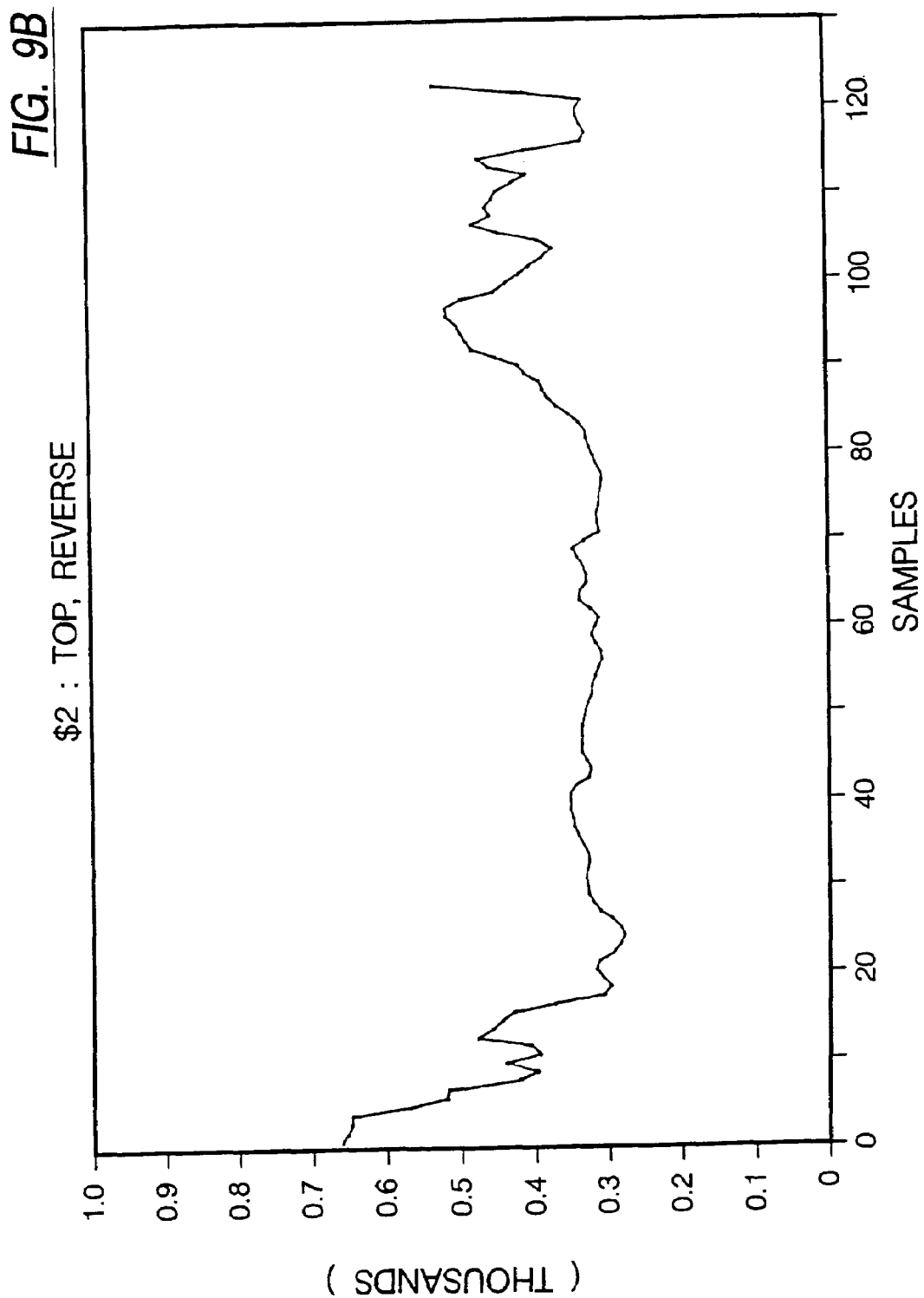

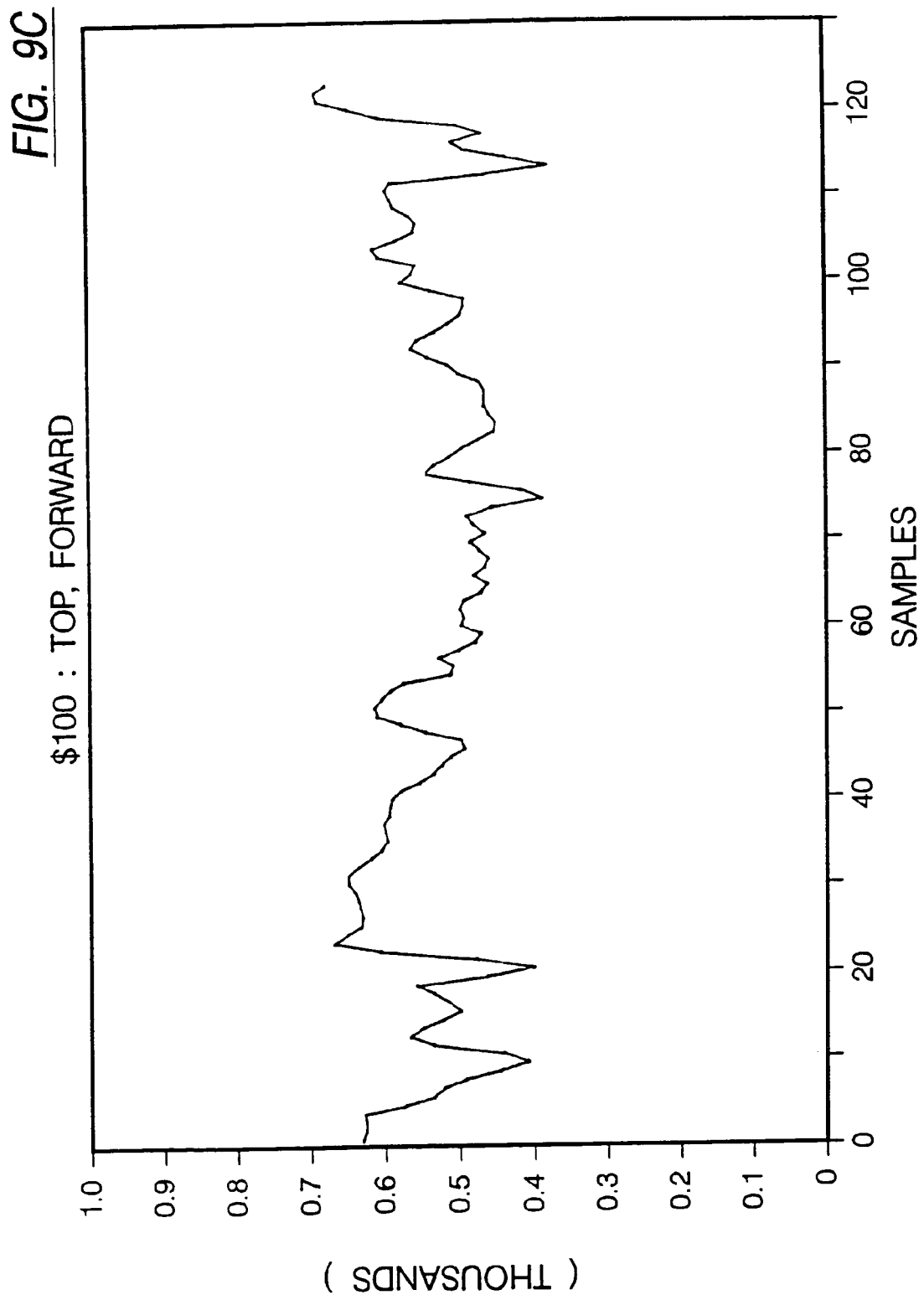

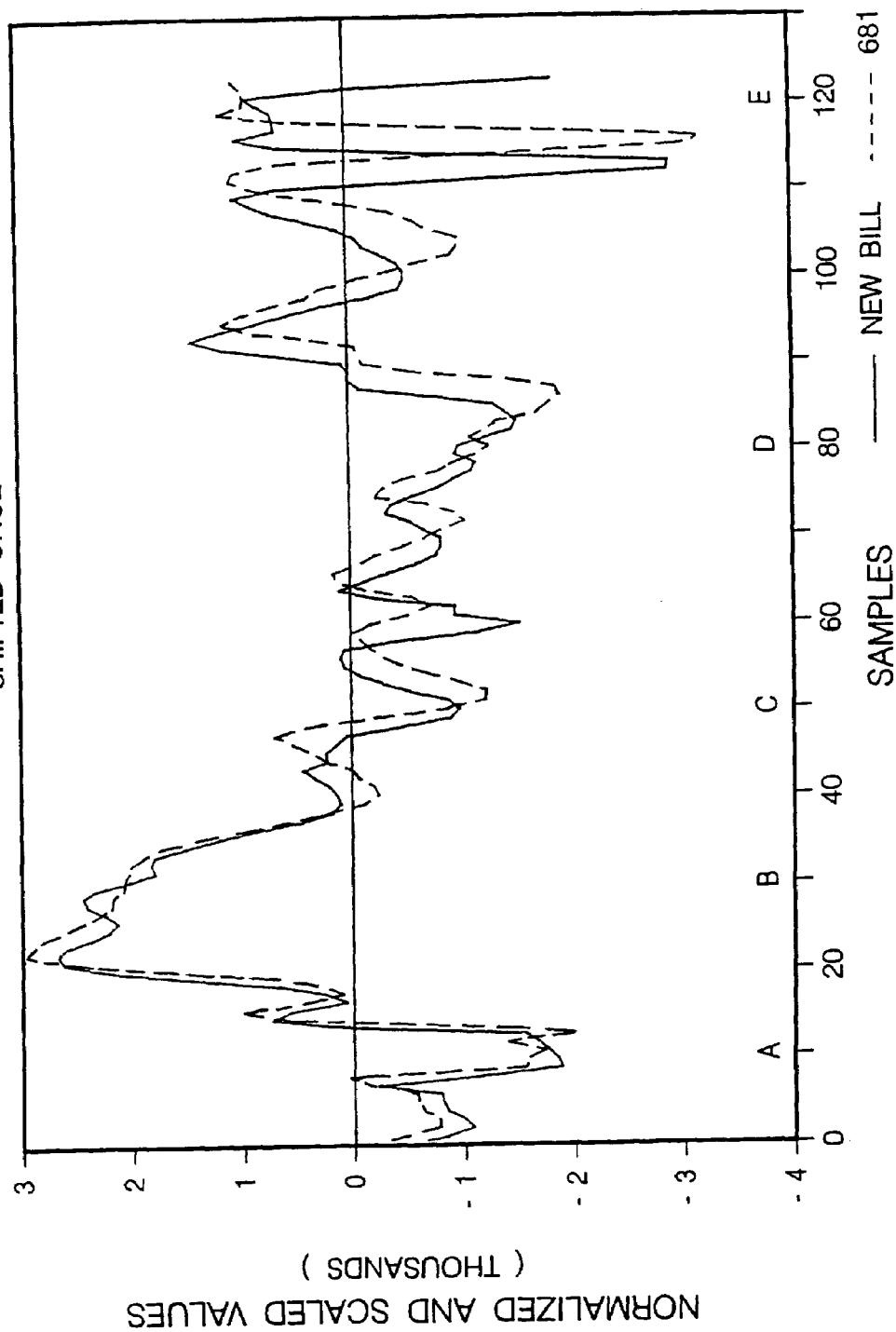

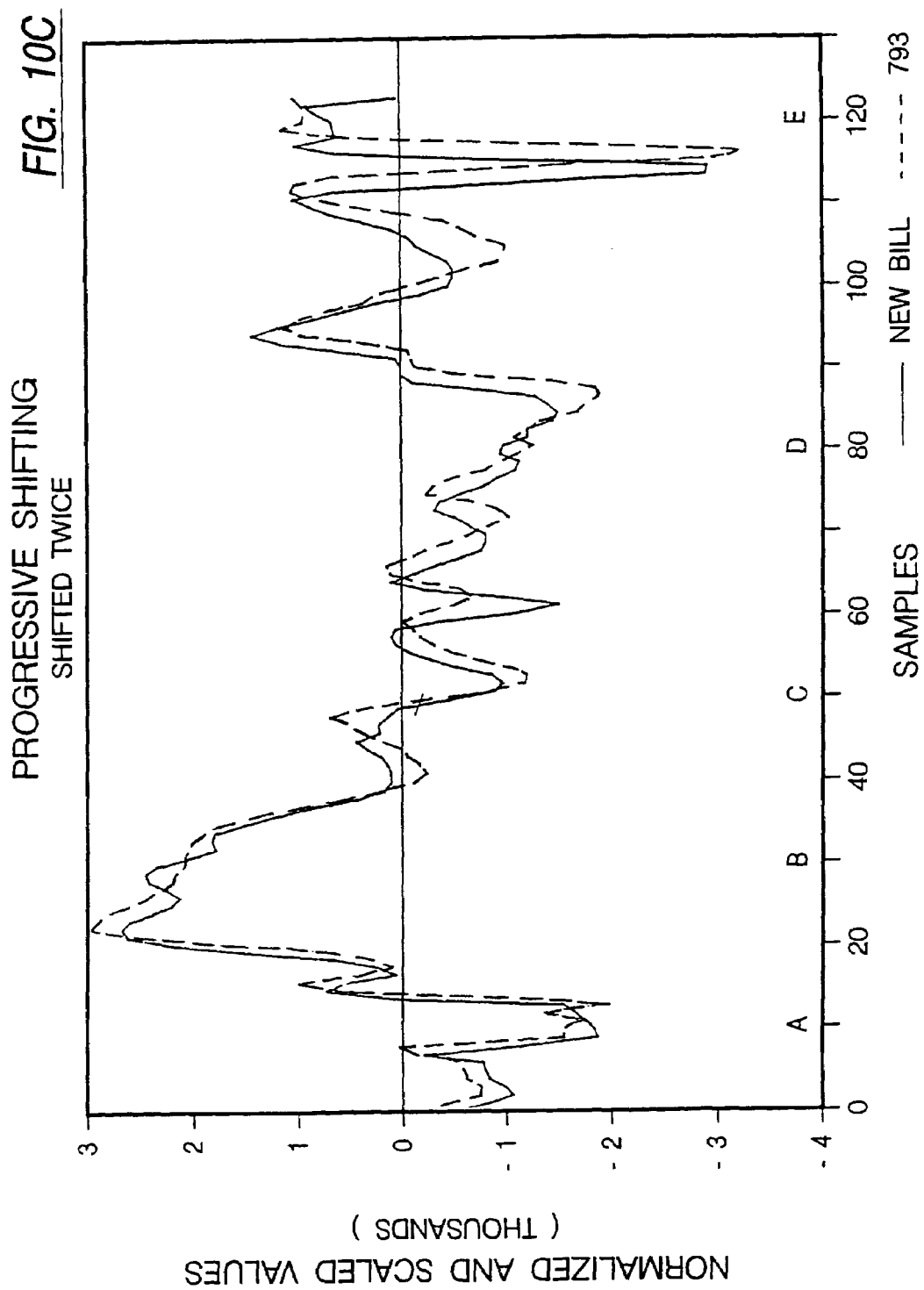

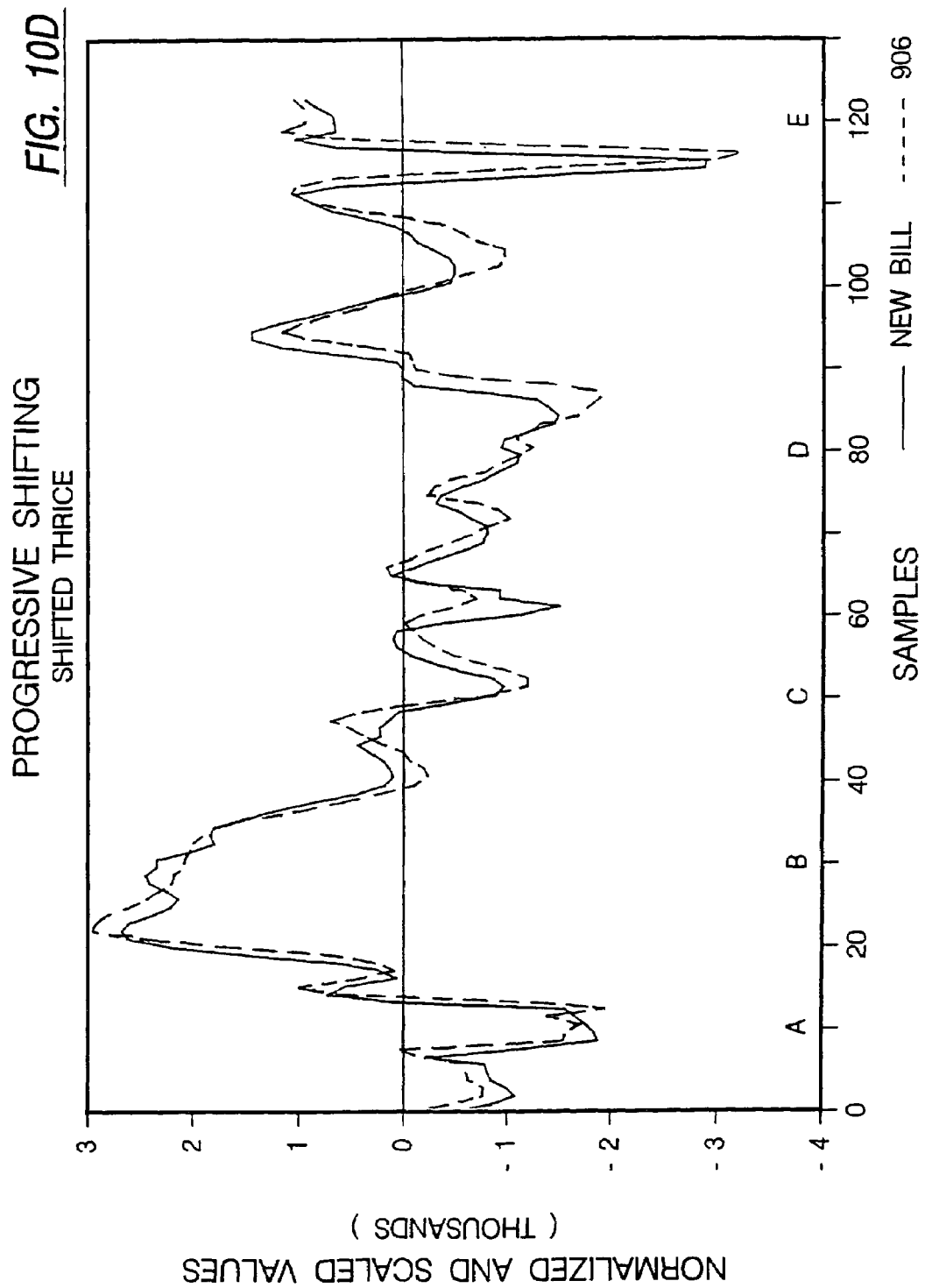

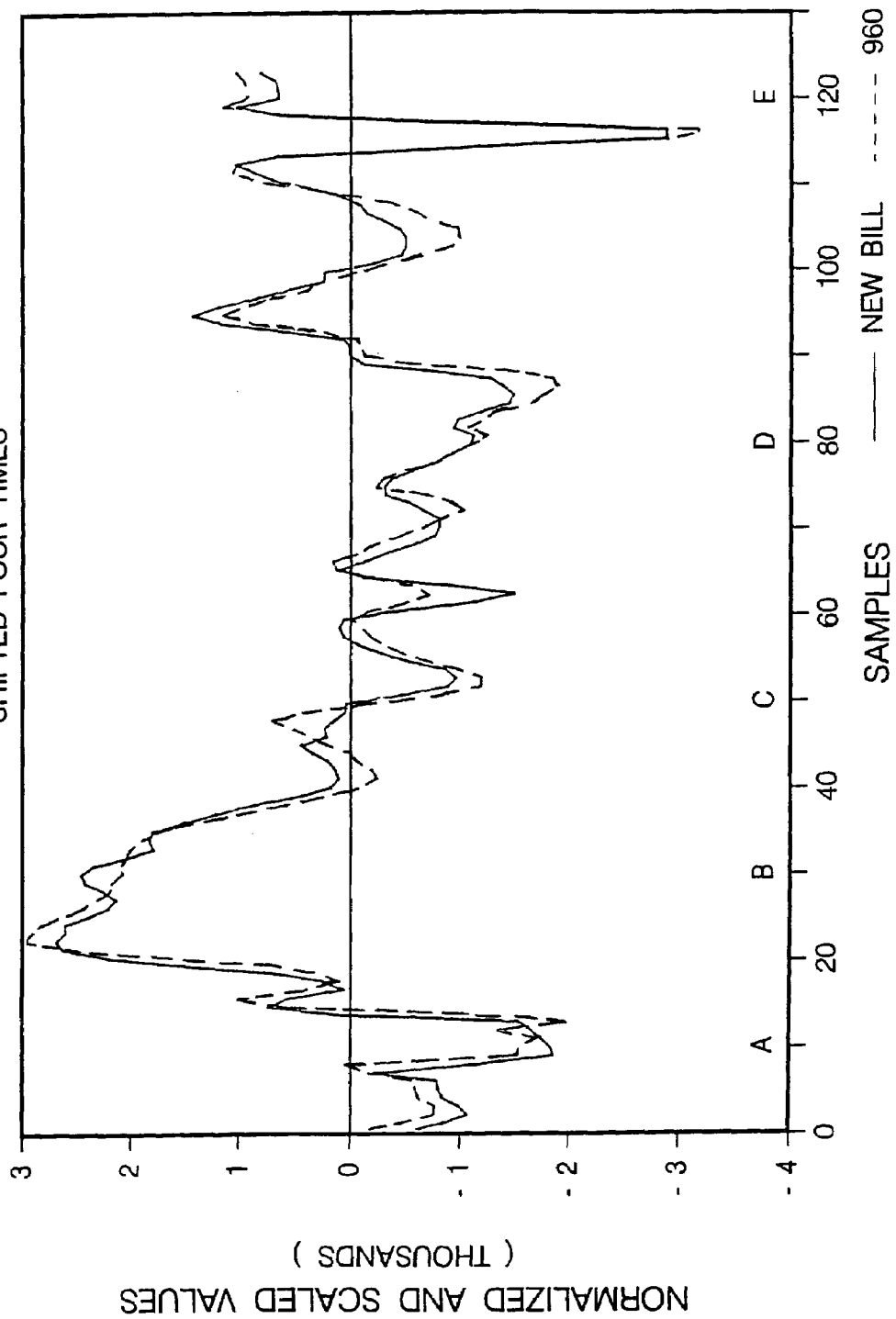

METHOD AND APPARATUS FOR CURRENCY DISCRIMINATION AND COUNTING

CROSS-REFERENCE TO RELATED APPLICATIONS

This application is a continuing application of prior application Ser. No. 09/453,200, filed Dec. 2, 1999 entitled "Method and Apparatus for Currency Discrimination and Counting," issued as U.S. Pat. No. 6,459,806 which is a continuation of pending Ser. No. 08/841,203, filed Apr. 29, 1997 entitled "Method And Apparatus For Currency Discrimination And Counting," issued as U.S. Pat. No. 6,028,951 which is a continuation of Ser. No. 08/339,337, filed on Nov. 14, 1994, and issued as U.S. Pat. No. 5,692,067, which in turn is a continuation of Ser. No. 08/127,334, filed on Sep. 27, 1993, and issued as U.S. Pat. No. 5,467,405, which in turn is a continuation of application Ser. No. 07/885,648, filed May 19, 1992, and issued as U.S. Pat. No. 5,295,196, which in turn is a continuation-in-part of application Ser. No. 07/475,111, filed Feb. 5, 1990, and now abandoned. All of the above applications and patents are incorporated herein by reference in their entirety.

BACKGROUND OF THE INVENTION

1. Field of the Invention

The present invention relates, in general, to currency identification. The invention relates more particularly to a method and apparatus for automatic discrimination and counting of currency bills of different denominations using light reflectivity characteristics of indicia printed upon the currency bills.

2. Description of the Related Art

A variety of techniques and apparatus have been used to satisfy the requirements of automated currency handling systems. At the lower end of sophistication in this area of technology are systems capable of handling only a specific type of currency, such as a specific dollar denomination, while rejecting all other currency types. At the upper end are complex systems which are capable of identifying and discriminating among and automatically counting multiple currency denominations.

Currency discrimination systems typically employ either magnetic sensing or optical sensing for discriminating between different currency denominations. Magnetic sensing is based on detecting the presence or absence of magnetic ink in portions of the printed indicia on the currency by using magnetic sensors, usually ferrite core-based sensors, and using the detected magnetic signals, after undergoing analog or digital processing, as the basis for currency discrimination. The more commonly used optical sensing technique, on the other hand, is based on detecting and analyzing variations in light reflectance or transmissivity characteristics occurring when a currency bill is illuminated and scanned by a strip of focused light. The subsequent currency discrimination is based on the comparison of sensed optical characteristics with prestored parameters for different currency denominations, while accounting for adequate tolerances reflecting differences among individual bills of a given denomination.

A major obstacle in implementing automated currency discrimination systems is obtaining an optimum compromise between the criteria used to adequately define the characteristic pattern for a particular currency denomination, the time required to analyze test data and compare it to predefined parameters in order to identify the currency bill under scrutiny, and the rate at which successive currency bills may be mechanically fed through and scanned. Even with the use of microprocessors for processing the test data resulting from the scanning of a bill, a finite amount of time is required for acquiring samples and for the process of comparing the test data to stored parameters to identify the denomination of the bill.

Most of the optical scanning systems available today utilize complex algorithms for obtaining a large number of reflectance data samples as a currency bill is scanned by an optical scanhead and for subsequently comparing the data to corresponding stored parameters to identify the bill denomination. Conventional systems require a relatively large number of optical samples per bill scan in order to sufficiently discriminate between currency denominations, particularly those denominations for which the reflectance patterns are not markedly distinguishable. The use of the large number of data samples slows down the rate at which incoming bills may be scanned and, more importantly, requires a correspondingly longer period of time to process the data in accordance with the discrimination algorithm.

A major problem associated with conventional systems is that, in order to obtain the required large number of reflectance samples required for accurate currency discrimination, such systems are restricted to scanning bills along the longer dimension of currency bills. Lengthwise scanning, in turn, has several inherent drawbacks including the need for an extended transport path for relaying the bill lengthwise across the scanhead and the added mechanical complexity involved in accommodating the extended path as well as the associated means for ensuring uniform, non-over lapping registration of bills with the sensing surface of the scanhead.

The end result is that systems capable of accurate currency discrimination are costly, mechanically bulky and complex, and generally incapable of both currency discrimination and counting at high speeds with a high degree of accuracy.

SUMMARY OF THE INVENTION

It is a principal object of the present invention to provide an improved method and apparatus for identifying and counting currency bills comprising a plurality of currency denominations.

It is another object of this invention to provide an improved method and apparatus of the above kind which is capable of efficiently discriminating among and counting bills of several currency denominations at a high speed and with a high degree of accuracy.

A related object of the present invention is to provide such an improved currency discrimination and counting apparatus which is compact, economical, and has uncomplicated construction and operation.

Briefly, in accordance with the present invention, the objectives enumerated above are achieved by means of an improved optical sensing and correlation technique adopted to both counting and denomination discrimination of currency bills. The technique is based on the optical sensing of bill reflectance characteristics obtained by illuminating and scanning a bill along its narrow dimension, approximately about the central section of the bill. Light reflected from the bill as it is optically scanned is detected and used as an analog representation of the variation in the dark and light content of the printed pattern or indicia on the bill surface.

A series of such detected reflectance signals are obtained by sampling and digitally processing, under microprocessor control, the reflected light at a plurality of predefined sample points as the bill is moved across the illuminated strip with its narrow dimension parallel to the direction of transport of the bill. Accordingly, a fixed number of reflectance samples is obtained across the narrow dimension of the note. The data samples obtained for a bill scan are subjected to digital processing, including a normalizing process to deaccentuate variations due to "contrast" fluctuations in the printed pattern or indicia existing on the surface of the bill being scanned. The normalized reflectance data represent a characteristic pattern that is fairly unique for a given bill denomination and incorporates sufficient distinguishing features between characteristic patterns for different currency denominations so as to accurately differentiate therebetween.

By using the above approach, a series of master characteristic patterns are generated and stored using standard bills for each denomination of currency that is to be detected. The "standard" bills used to generate the master characteristic patterns are preferably bills that are slightly used bills. According to a preferred embodiment, two characteristic patterns are generated and stored within system memory for each detectable currency denomination. The stored patterns correspond, respectively, to optical scans performed on the green surface of a bill along "forward" and "reverse" directions relative to the pattern printed on the bill. For bills which produce significant pattern changes when shifted slightly to the left or right, such as the $10 bill in U.S. currency, it is preferred to store two patterns for each of the "forward" and "reverse directions, each pair of patterns for the same direction represent two scan areas that are slightly displaced from each other along the long dimension of the bill. Preferably, the currency discrimination and counting method and apparatus of this invention is adapted to identify seven (7) different denominations of U.S. currency, i.e., $1, $2, $5, $10, $20, $50 and $100. Accordingly, a master set of 16 different characteristic patterns is stored within the system memory for subsequent correlation purposes (four patterns for the $10 bill and two patterns for each of the other denominations.

According to the correlation technique of this invention, the pattern generated by scanning a bill under test and processing the sampled data is compared with each of the 16 prestored characteristic patterns to generate, for each comparison, a correlation number representing the extent of similarity between corresponding ones of the plurality of data samples for the compared patterns. Denomination identification is based on designating the scanned bill as belonging to the denomination corresponding to the stored characteristic pattern for which the correlation number resulting from pattern comparison is determined to be the highest. The possibility of a scanned bill having its denomination mischaracterized following the comparison of characteristic patterns, is significantly reduced by defining a hi-level threshold of correlation that must be satisfied for a "positive" call to be made.

In essence, the present invention provides an improved optical sensing and correlation technique for positively identifying any of a plurality of different bill denominations regardless of whether the bill is scanned along the "forward" or "reverse" directions. The invention is particularly adapted to be implemented with a system programmed to track each identified currency denomination so as to conveniently present the aggregate total of bills that have been identified at the end of a scan run. Also in accordance with this invention, currency detecting and counting apparatus is disclosed which is particularly adapted for use with the novel sensing and correlation technique summarized above. The apparatus incorporates an abbreviated curved transport path for accepting currency bills that are to be counted and transporting the bills about their narrow dimension across a scanhead located downstream of the curved path and onto a conventional stacking station where sensed and counted bills are collected. The scanhead operates in conjunction with an optical encoder which is adapted to initiate the rapture of a predefined number of reflectance data samples when a bill (and, thus, the indicia or pattern printed thereupon) moves across a coherent strip of light focused downwardly of the scanhead.

The scanhead uses a pair of light-emitting diodes ("LED"'s) to focus a coherent light strip of predefined dimensions and having a normalized distribution of light intensity across the illuminated area. The LED's are angularly disposed and focus the desired strip of light onto the narrow dimension of a bill positioned flat across the scanning surface of the scanhead. A photo detector detects light reflected from the bill. The photo detector is controlled by the optical encoder to obtain the desired reflectance samples.

Initiation of sampling is based upon detection of the change in reflectance value that occurs when the outer border of the printed pattern on a bill is encountered relative to the reflectance value obtained at the edge of the bill where no printed pattern exists. According to a preferred embodiment of this invention, illuminated strips of at least two different dimensions are used for the scanning process. A narrow strip is used initially to detect the starting point of the printed pattern on a bill and is adapted to distinguish the thin borderline that typically marks the starting point of and encloses the printed pattern on a bill. For the rest of the narrow dimension scanning following detection of the border line of the printed pattern, a substantially wider strip of light is used to collect the predefined number of samples for a bill scan the generation and storage of characteristic patterns using standard notes and the subsequent comparison and correlation procedure for classifying the scanned bill as belonging to one of several predefined currency denominations is based on the above-described sensing and correlation technique.

BRIEF DESCRIPTION OF THE DRAWINGS

Other objects and advantages of the invention will become apparent upon reading the following detailed description in conjunction with the drawings in which:

FIG. 2 is a block diagram illustrating a preferred circuit arrangement for processing and correlating reflectance data according to the optical sensing and counting technique of this invention;

FIG. 2A is a block diagram illustrating a circuit arrangement for producing a reset signal;

FIGS. 9A-C are graphical illustrations of representative characteristic patterns generated by narrow dimension optical scanning of a currency bill;

FIGS. 10A-E are graphical illustrations of the effect produced on correlation pattern by using the progressive shifting technique, according to an embodiment of this invention;

Figure 1:
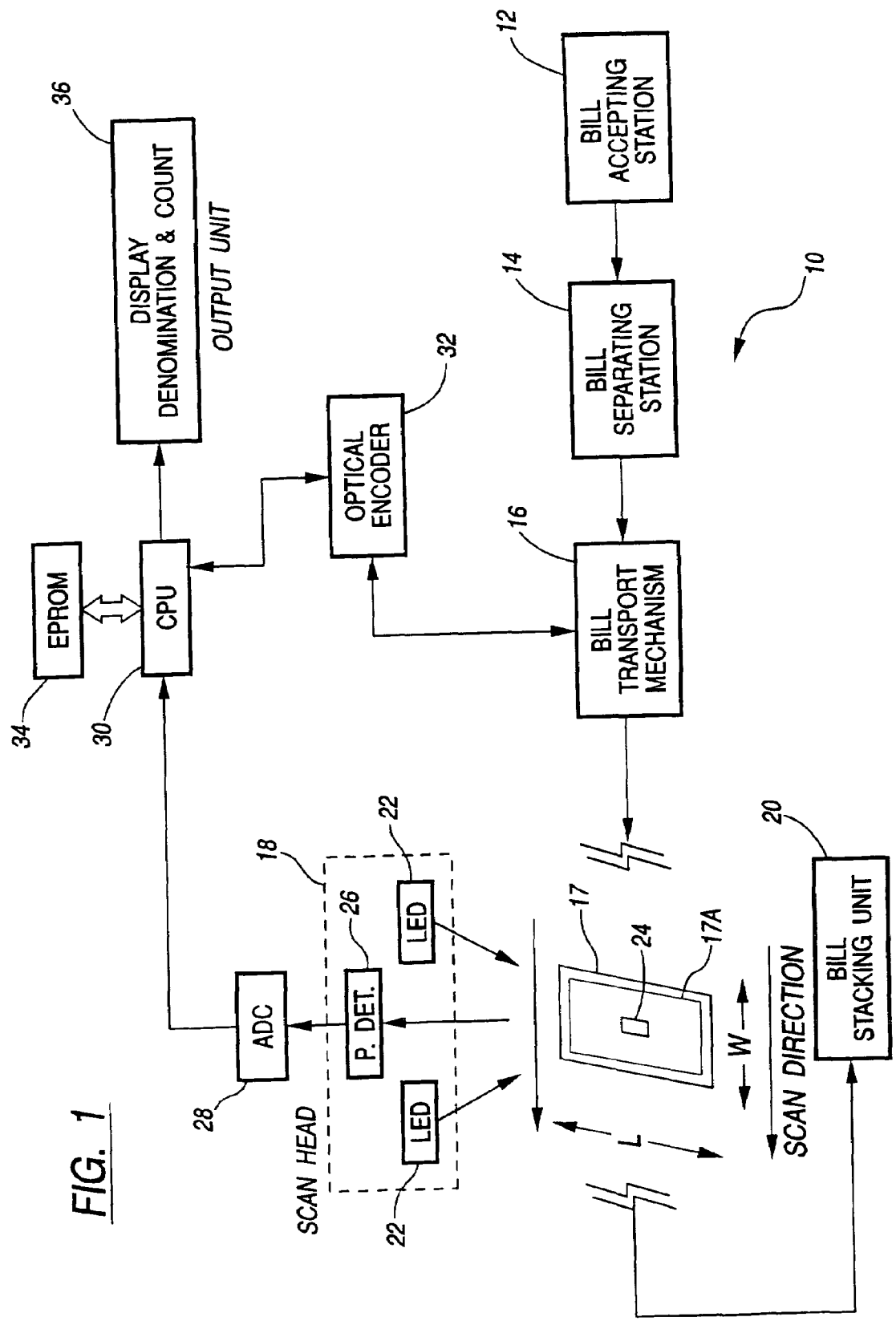
FIG. 1 is a functional block diagram illustrating the conceptual basis for the optical sensing and correlation method and apparatus, according to the system of this invention.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENTS

Referring now to FIG. 1, there is shown a functional block diagram illustrating the optical sensing and correlation system according to this invention. The system 10 includes a bill accepting station 12 where stacks of currency bills that need to be identified and counted are positioned. Accepted bills are acted upon by a bill separating station 14 which functions to pick out or separate one bill at a time for being sequentially relayed by a bill transport mechanism 16, according to a precisely predetermined transport path, across an optical scanhead 18 where the currency denomination of the bill is scanned, identified and counted at a rate in excess of 800 bills per minute. The scanned bill is then transported to a bill stacking station 20 where bills so processed are stacked for subsequent removal.

The optical scanhead 18 comprises at least one light source 22 directing a beam of coherent light downwardly onto the bill transport path so as to illuminate a substantially rectangular light strip 24 upon a currency bill 17 positioned on the transport path below the scanhead 18. Light reflected off the illuminated strip 24 is sensed by a photodetector 26 positioned directly below the strip. The analog output of photodetector 25 is converted into a digital signal by means of an analog-to-digital (ADC) convertor unit 23 whose output is fed as a digital input to a central processing unit (CPU) 30.

According to a feature of this invention, the bill transport path is defined in such a way that the transport mechanism 16 moves currency bills with the narrow dimension "W" of the bills being parallel to the transport path and the scan direction. Thus, as a bill 17 moves on the transport path on the scanhead 18, the coherent light strip 24 effectively scans the bill across the narrow dimension "W" of the bill. Preferably, the transport path is so arranged that a currency bill 17 is scanned approximately about the central section of the bill along its narrow dimension, as best shown in FIG. 1. The scanhead 18 functions to detect light reflected from the bill as it moves across the illuminated light strip 24 and to provide an analog representation of the variation in light so reflected which, in turn, represents the variation in the dark and light content of the printed pattern or indicia on the surface of the bill. This variation in light reflected from the narrow dimension scanning of the bills series as a measure for distinguishing, with a high degree of confidence, among a plurality of currency denominations which the system of this invention is programmed to handle.

A series of such detected reflectance signals are obtained across the narrow dimension of the bill, or across a selected segment thereof, and the resulting analog signals are digitized under control of the CPU 30 to yield a fixed number of digital reflectance data samples. The data samples are then subjected to a digitizing process which includes a normalizing routine for processing the sampled data for improved correlation and for smoothing out variations due to "contrast" fluctuations in the printed pattern existing on the bill surface. The normalized reflectance data so digitized represents a characteristic pattern that is fairly unique for a given bill denomination and provides sufficient distinguishing features between characteristic patterns for different currency denominations, as will be explained in detail below.

In order to ensure strict correspondence between reflectance samples obtained by narrow dimension scanning of successive bills, the initiation of the reflectance sampling process is preferably controlled through the CPU 30 by means of an optical encoder 32 which is linked to the bill transport mechanism 16 and precisely tracks the physical movement of the bill 17 across the scanhead 18. More specifically, the optical encoder 32 is linked to the rotary motion of the drive motor which generates the movement imparted to the bill as it is relayed along the transport path. In addition, it is ensured that positive contact is maintained between the bill and the transport path, particularly when the bill is being scanned by the scanhead 18. Under these conditions, the optical encoder is capable of precisely tracking the movement of the bill relative to the light strip generated by the scanhead by monitoring the rotary motion of the drive motor.

The output of photodetector 26 is monitored by the CPU 30 to initially detect the presence of the bill underneath the scanhead and, subsequently, to detect the starting point of the printed pattern on the bill, as represented by the thin borderline 17B which typically encloses the printed indicia on currency bills. Once the borderline 17B has been detected, the optical encoder is used to control the timing and number of reflectance samples that are obtained from the output of the photodetector 26 as the bill 17 moves across the scanhead 18 and is scanned along its narrow dimension.

The detection of the borderline constitutes an important step and realizes improved discrimination efficiency since the borderline serves as an absolute reference point for initiation of sampling. If the edge of a bill were to be used as a reference point, relative displacement of sampling points can occur because of the random manner in which the distance from the edge to the borderline varies from bill to bill due to the relatively large range of tolerances permitted during printing and cutting of currency bills. As a result, it becomes difficult to establish direct correspondence between sample points in successive bill scans and the discrimination efficiency is adversely affected.

The use of the optical encoder for controlling the sampling process relative to the physical movement of a bill across the scanhead is also advantageous in that the encoder can be used to provide a predetermined delay following detection of the borderline prior to initiation of samples. The encoder delay can be adjusted in such a way that the bill is scanned only across those segments along its narrow dimension which contain the most distinguishable printed indicia relative to the different currency denominations.

In the case of U.S. currency, for instance, it has been determined that the central, approximately two-inch portion of currency bills, as scanned across the central section of the narrow dimension of the bill, provides sufficient data for distinguishing among the various U.S. currency denominations on the basis of the correlation technique used in this invention. Accordingly, the optical encoder can be used to control the scanning process so that reflectance samples are taken for a set period of time and only after a certain period of time has elapsed since the borderline has been detected, thereby restricting the scanning to the desired central portion of the narrow dimension of the bill.

Figure 1A:
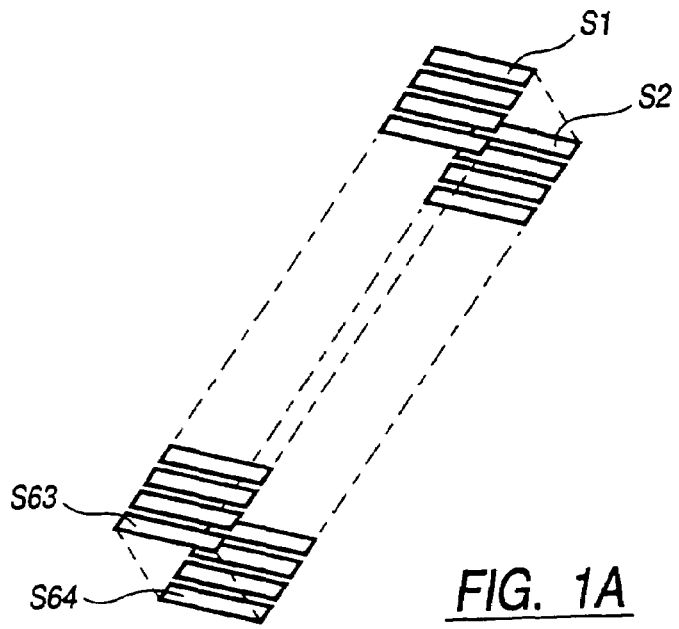
FIG. 1A is a diagrammatic perspective illustration of the successive areas scanned during the traversing movement of a single bill across the scanhead.
Figure 1B:
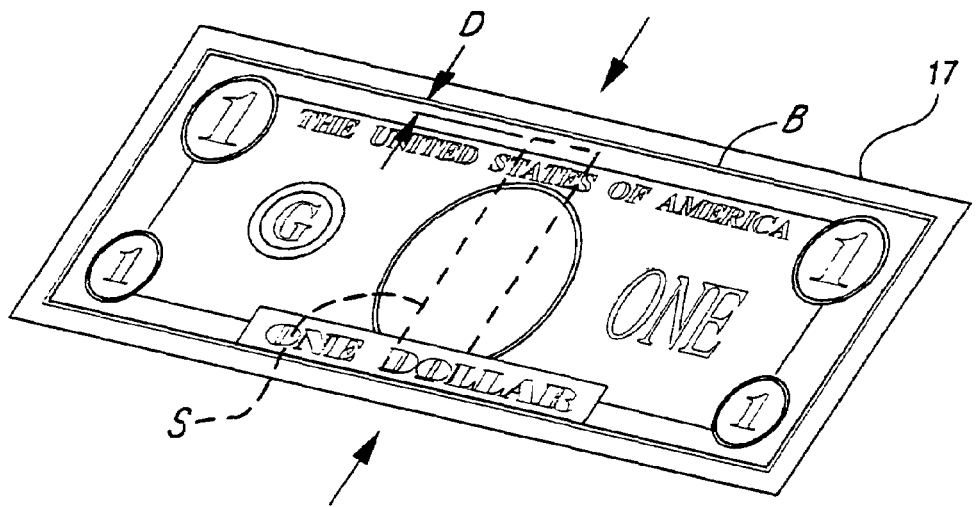
FIG. 1B is a perspective view of a bill and the preferred area to be scanned on the bill.
Figure 1C:
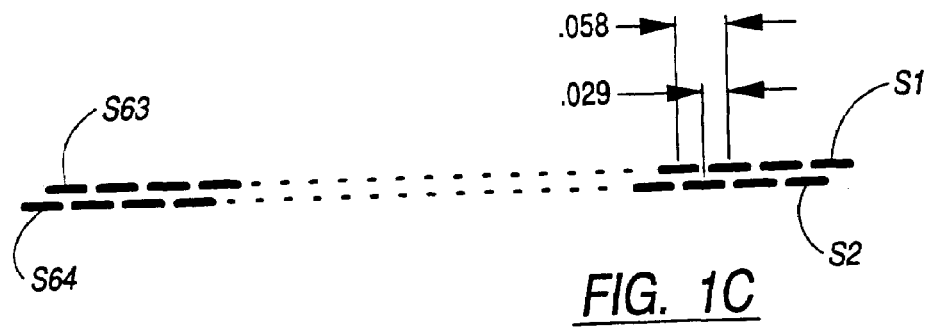
FIG. 1C is a diagrammatic side elevation of the scan areas illustrated in FIG. 1A, to show the overlapping relationship of those areas.

FIGS. 1A-1C illustrate the scanning process in more detail. As a bill is advanced in a direction parallel to the narrow edges of the bill, scanning via the wide slit in the scanhead is effected along a segment S of the central portion of the bill. This segment S begins a fixed distance d inboard of the border line B. As the bill traverses the scan head, a strip s of the segment S is always illuminated, and the photodetector produces a continuous output signal which is proportional to the intensity of the light reflected from the illuminated strip s at any given instant. This output is sampled at intervals controlled by the encoder, so that the sampling intervals are precisely synchronized with the movement of the bill across the scanhead.

As illustrated in FIGS. 1A and 1C, it is preferred that the sampling intervals be selected so that the strips s that are illuminated for successive samples overlap one another. The odd-numbered and even-numbered sample strips have been separated in FIGS. 1A and 1C to more clearly illustrate this overlap. For example, the first and second strips s1 and s2 overlap each other, the second and third strips s2 and s3 overlap each other, and so on. Each adjacent pair of strips overlap each other. In the illustrative example, this is accomplished by sampling strips that are 0.050 inch wide at 0.029 inch intervals, along a segment S that is 1.83 inch long (64 samples).

The optical sensing and correlation technique is based upon using the above process to generate a series of master characteristic patterns using standard bills for each denomination of currency that is to be detected. According to a preferred embodiment two or four characteristic patterns are generated and stored within system memory, preferably in the form of an EPROM 34 (see FIG. 1), for each detectable currency denomination. The characteristic patterns for each bill are generated from optical scans, performed on the green surface of the bill and taken along both the "forward" and "reverse" directions relative to the pattern printed on the bill.

In adapting this technique to U.S. currency, for example, characteristic patterns are generated and stored for seven different denominations of U.S. currency, i.e., $1, $2, $5, $10, $20, $50 and $100. As explained previously, four characteristic patterns are generated for the $10 bill, and two characteristic patterns are generated for each of the other denominations. Accordingly, a master set of 16 different characteristic patterns is stored within the system memory for subsequent correlation purposes. Once the master characteristic patterns have been stored, the pattern generated by scanning a bill under test is compared by the CPU 30 with each of the 16 pre-stored master characteristic patterns to generate, for each comparison, a correlation number representing the extent of correlation, i.e., similarity between corresponding ones of the plurality of data samples, for the patterns being compared.

The CPU 30 is programmed to identify the denomination of the scanned bill as corresponding to the stored characteristic pattern for which the correlation number resulting from pattern comparison is found to be the highest. In order to preclude the possibility of mischaracterizing the denomination of a scanned bill, as well as to reduce the possibility of spurious cotes being identified as belonging to a valid denomination, a bi-level threshold of correlation is used as the basis for making a "positive" call, as will be explained in detail below.

Using the above sensing and correlation approach, the CPU 30 is programmed to count the number of bills belonging to a particular currency denomination as part of a given set of bills that have been scanned for a given scan batch, and to determine the aggregate total of the currency amount represented by the bills scanned during a scan batch. The CPU 30 is also linked to an output unit 36 which is adapted to provide a display of the number of bills counted, the breakdown of the bills in terms of currency denomination, and the aggregate total of the currency value represented by counted bills. The output unit 36 can also be adapted to provide a print-out of the displayed information in a desired format.

Referring now to FIG. 2, there is shown a representation, in block diagram form, of a preferred circuit arrangement for processing and correlating reflectance data according to the system of this invention. As shown therein, the CPU 30 accepts and processes a variety of input signals including those from the optical encoder 32, the photodetector 26 and a memory unit 38, which can be an erasable programmable read only memory (EPROM). The memory unit 38 has stored within it the correlation program on the basis of which patterns are generated and test patterns compared with stored master programs in order to identify the denomination of test currency. A crystal 40 serves as the time base for the CPU 30, which is also provided with an external reference voltage $V_{REF}$, on the basis of which peak detection of sensed reflectance data is performed, as explained in detail below.

The CPU 30 also accepts a timer reset signal from a reset unit 44 which, as shown in FIG. 2A, accepts the output voltage from the photodetector 26 and compares it, by means of a threshold detector 44A, relative to a pre-set voltage threshold, typically 5.0 volts, to provide a reset signal which goes "high" when a reflectance value corresponding to the presence of paper is sensed. More specifically, reflectance sampling is based on the premise that no portion of the illuminated light strip (24 in FIG. 1) is reflected to the photodetector in the absence of a bill positioned below the scanhead. Under these conditions, the output of the photodetector represents a "dark" or "zero" level reading. The photodetector output changes to a "white" reading, typically set to have a value of about 5.0 volts, when the edge of a bill first becomes positioned below the scanhead and falls under the light strip 24.

When this occurs, the reset unit 44 provides a "high" signal to the CPU 30 and marks the initiation of the scanning procedure.

In accordance with a feature of this invention, the machine-direction dimension of the illuminated strip of light produced by the light sources within the scanhead is set to be relatively small for the initial stage of the scan when the thin borderline is being detected. The use of the narrow slit increases the sensitivity with which the reflected light is detected and allows minute variations in the "gray" level reflected off the bill surface to be sensed. This is important in ensuring that the thin borderline of the pattern, i.e., the starting point of the printed pattern on the bill, is accurately detected. Once the borderline has been detected, subsequent reflectance sampling is performed on the basis of a relatively wider light strap in order to completely scan across the narrow dimension of the bill and obtain the desired number of samples, at a rapid rate. The use of a wider slit for the actual sampling also smooths out the output characteristics of the photodetector and realizes the relatively large magnitude of analog voltage which is essential for accurate representation and processing of the detected reflectance values.

Returning to FIG. 2, the CPU 30 processes the output of photodetector 25 through a peak detector 50 which essentially functions to sample the photodetector output voltage and hold the highest, i.e., peak voltage value encountered after the detector has been enabled. The peak detector is also adapted to define a scaled voltage on the basis of which the pattern borderline on bills is detected. The output of the peak detector 50 is fed to a voltage divider 54 which lowers the peak voltage down to a scaled voltage $V_S$ representing a predefined percentage of this peak value. The voltage $V_S$ is based upon the percentage drop in output voltage of the peak detector as it reflects the transition from the "high" reflectance value resulting from the scanning of the unprinted edge portions of a currency bill to the relatively lower "gray" reflectance value resulting when the thin borderline is encountered. Preferably, the scaled voltage $V_S$ is set to be about 70-80 percent of the peak voltage.

The scaled voltage $V_S$ is supplied to a line detector 56 which is also provided with the incoming instantaneous output of the photodetector 26. The line detector 56 compares the two voltages at its input side and generates a signal $L_{DET}$ which normally stays "low" and goes "high" when the edge of the bill is scanned. The signal $L_{DET}$ goes "low" when the incoming photodetector output reaches the pre-defined percentage of the peak photodetector output up to that point, as represented by the voltage $V_S$. Thus, when the signal $L_{DET}$ goes "low", it is an indication that the borderline of the bill pattern has been detected. At this point, the CPU 30 initiates the actual reflectance sampling under control of the encoder 32 (see FIG. 2) and the desired fixed number of reflectance samples are obtained as the currency bill moves across the illuminated light strip and is scanned along the central section of its narrow dimension.

When master characteristic patterns are being generated, the reflectance samples resulting from the scanning of a standard bill are loaded into corresponding designated sections within a system memory 60, which is preferably an EPROM. The loading of samples is accomplished through a buffered address latch 58, if necessary. Preferably, master patterns are generated by scanning a standard bill a plurality of times, typically three (3) times, and obtaining the average of corresponding data samples before storing the average as representing a master pattern. During currency discrimination, the reflectance values resulting from the scanning of a test bill are sequentially compared, under control of the correlation program stored within the memory unit 38, with each of the corresponding characteristic patterns stored within the EPROM 60, again through the address latch 58.

Figure 3:
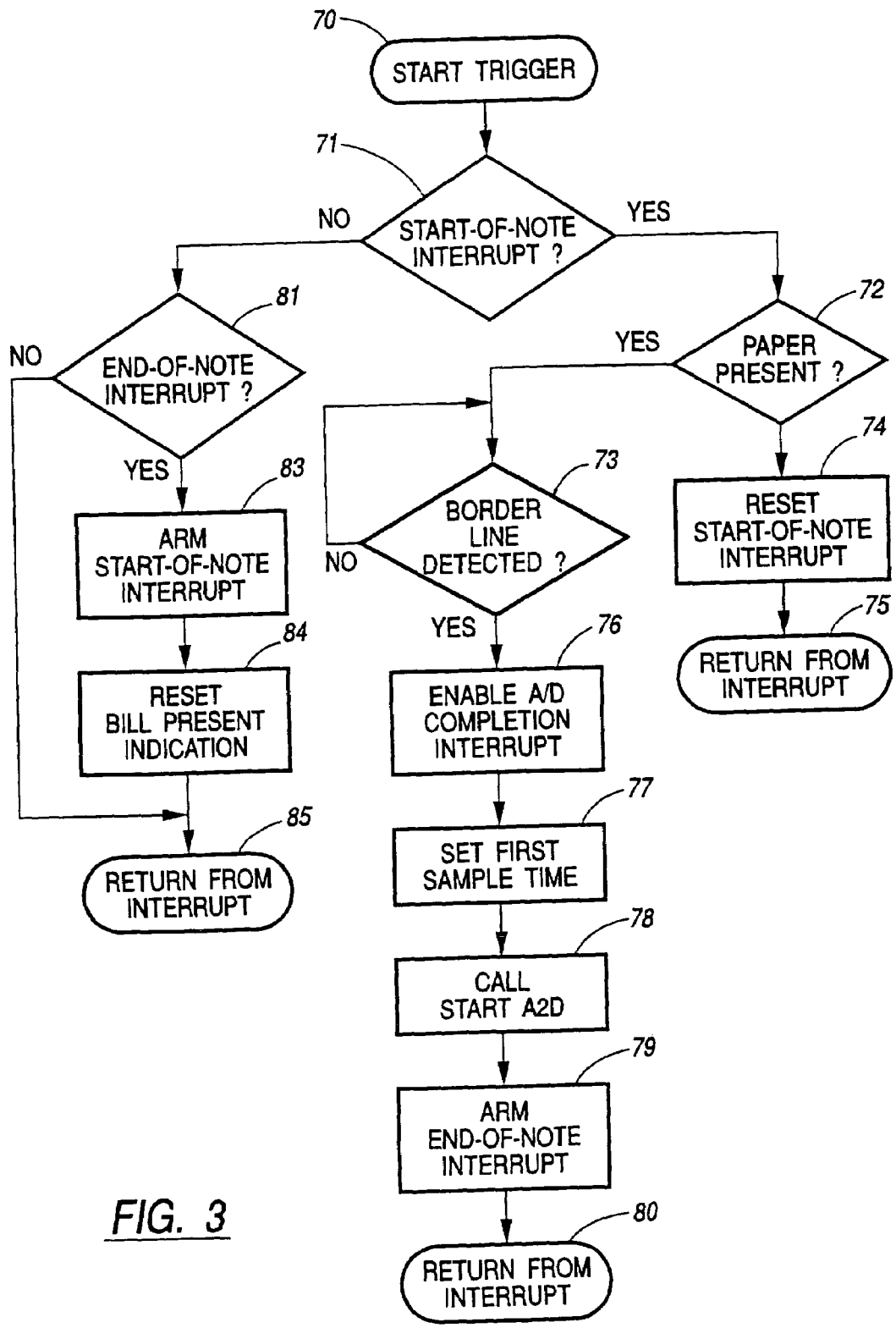
FIGS. 3-8A are flow charts illustrating the sequence of operations involved in implementing the optical sensing and correlation technique.

Referring now to FIGS. 3-7, there are shown flow charts illustrating the sequence of operations involved in implementing the above-described optical sensing and correlation technique of this invention. FIG. 3, in particular, illustrates the sequence involved in detecting the presence of a bill under the scanhead and the borderline on the bill. This section of the system program, designated as "TRIGGER", is initiated at step 70. At step 71 a determination is made as to whether or not a start-of-note interrupt, which signifies that the system is ready to search for the presence of a bill, is set, i.e., has occurred. If the answer at step 71 is found to be positive, step 72 is reached where the presence of the bill adjacent the scanhead is ascertained on the basis of the reset procedure described above in connection with the reset unit 44 of FIG. 2.

If the answer at step 72 is found to be positive, i.e., a bill is found to be present, step 73 is reached where a test is performed to see if the borderline has been detected on the basis of the reduction in peak value to a predefined percentage thereof, which, as described above, is indicated by the signal $L_{DET}$ going "low." If the answer at step 73 is found to be negative, the program continues to loop until the borderline has been detected. If the answer at step 72 is found to be negative, i.e., no bill is found to be present, the start-of-note interrupt is reset at step 74 and the program returns from interrupt at step 75.

If the borderline is found to have been detected at step 73, step 76 is accessed where an A/D completion interrupt is enabled, thereby signifying that the analog-to-digital conversion can subsequently be performed at desired time intervals. Next, at step 77, the time when the first reflectance sample is to be obtained is defined, in conjunction with the output of the optical encoder. At step 78 the capture and digitization of the detected reflectance samples is undertaken by recalling a routine designated as "STARTA2D" which will be described in detail below. At the completion of the digitization process, an end-of-note interrupt must occur, which resets the system for sensing the presence of the following bill to be scanned, which is enabled at step 79. Subsequently, at step 80 the program returns from interrupt.

If the start-of-note interrupt is not found to have occurred at step 71, a determination is made at step 81 to see if the end-of-note interrupt has occurred. If the answer at 81 is negative, the program returns from interrupt at step 85. If a positive answer is obtained at 81, step 83 is accessed where the start-of-note interrupt is activated and, at step 84, the reset unit, which monitors the presence of a bill, is reset to be ready for determining the presence of bills. Subsequently, the program returns from interrupt at step 85.

Figures 4A, 4B:
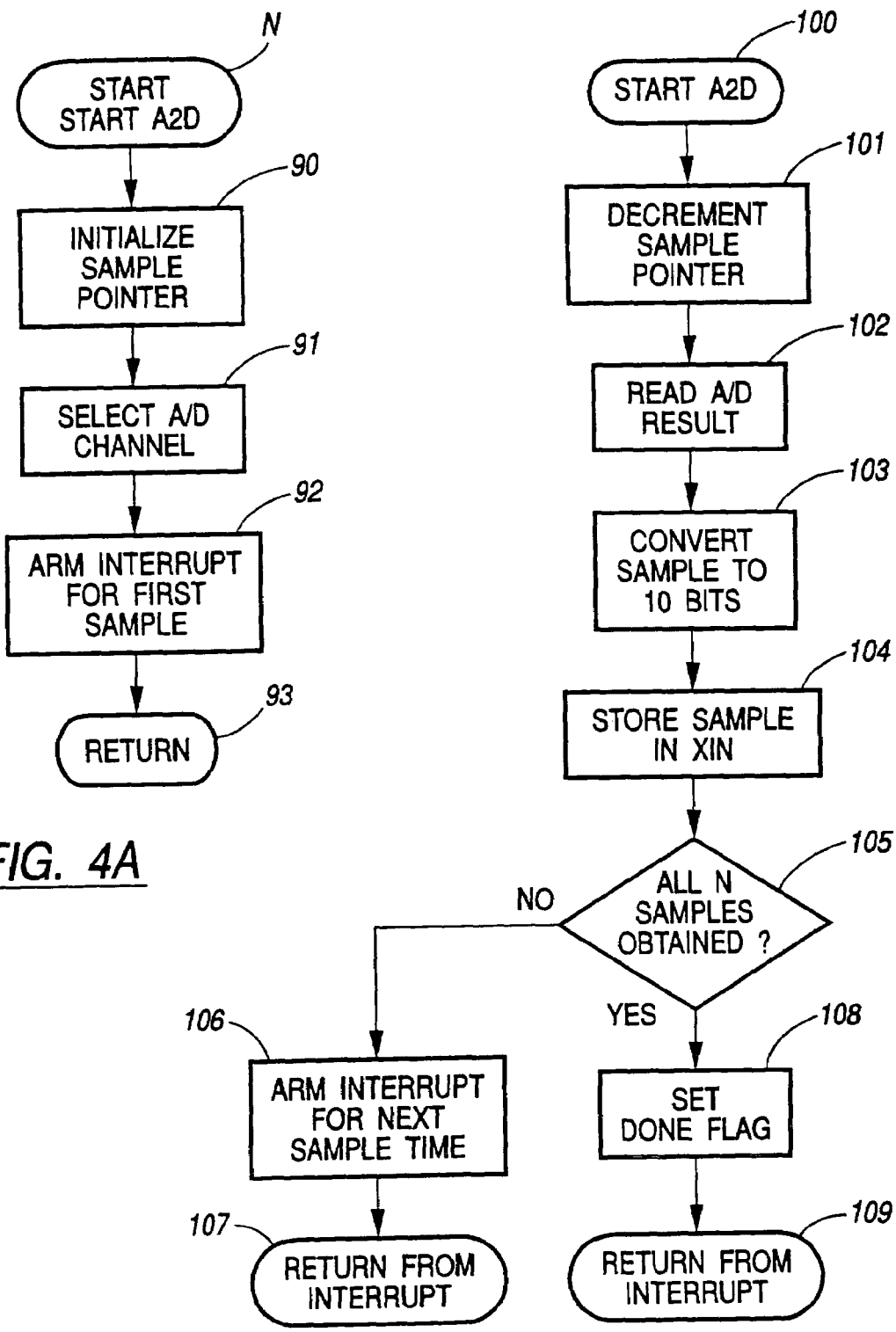

Referring now to FIGS. 4A and 4B there are shown, respectively, routines for starting the STARTA2D routine and the digitizating routine itself. In FIG. 4A, the initiation of the STARTA2D routine at step 90 causes the sample pointer, which provides an indication of the sample being obtained and digitized at a given time, to be initialized. Subsequently, at step 91, the particular channel on which the analog-to-digital conversion is to be performed is enabled. The interrupt authorizing the digitization of the first sample is enabled at step 92 and the main program accessed again at step 93.

FIG. 4B is a flow chart illustrating the sequential procedure involved in the analog-to-digital conversion routine, which is designated as "A2D". The routine is started at step 100. Next, the sample pointer is decremented at step 101 so as to maintain an indication of the number of samples remaining to be obtained. At step 102, the digital data corresponding to the output of the photodetector for the current sample is read. The data is convened to its final form at step 103 and stored within a pre-defined memory segment as $X_{IN}$.

Next, at step 105, a check is made to see if the desired fixed number of samples "N" has been taken. If the answer is found to be negative, step 106 is accessed where the interrupt authorizing the digitization of the succeeding sample is enabled and the program returns from interrupt at step 107 for completing the rest of the digitizing process. However, if the answer at step 105 is found to be positive, i.e., the desired number of samples have already been obtained, a flag indicating the same is set at step 108 and the program returns from interrupt at step 109.

Figure 5:
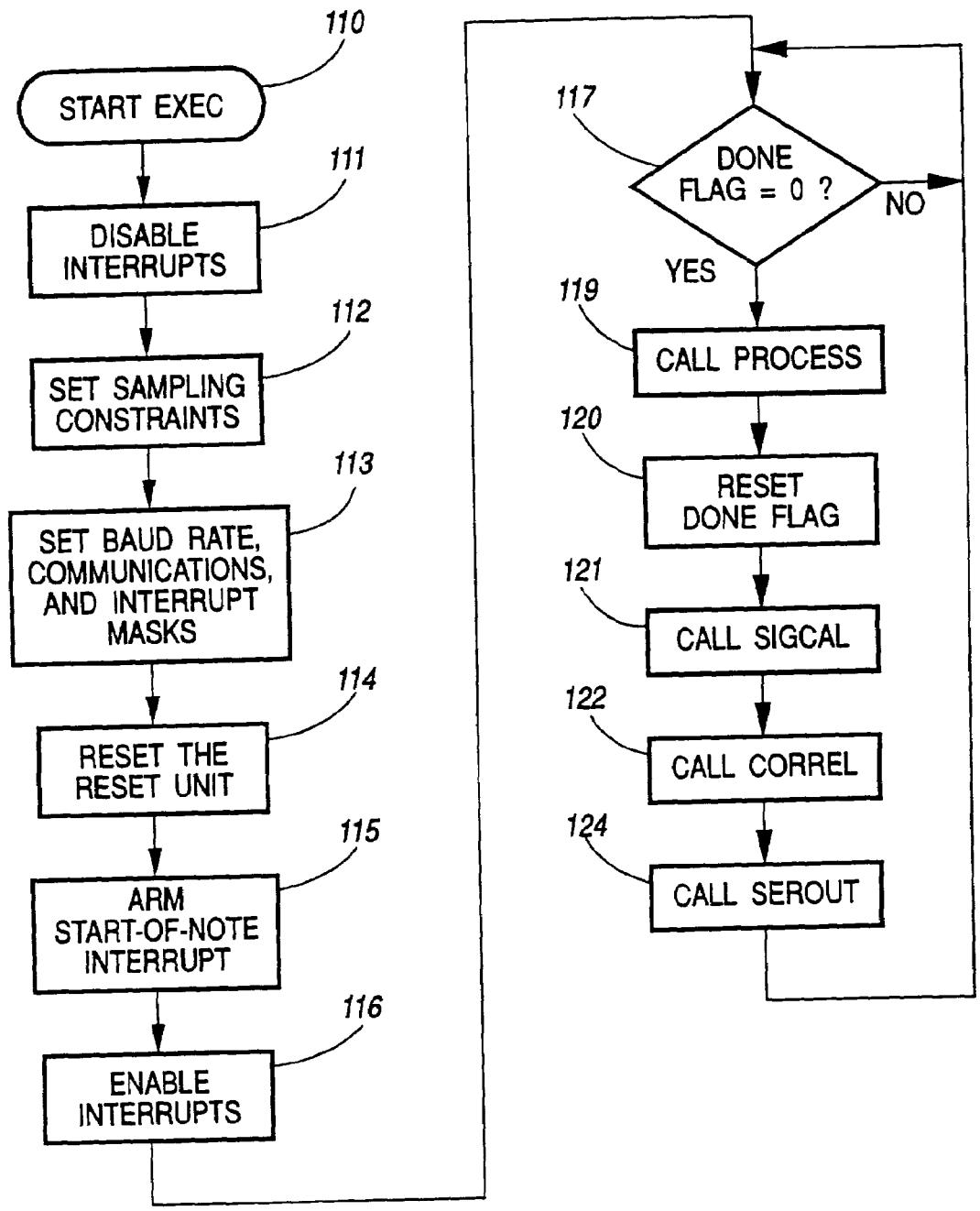

Referring now to FIG. 5, there is shown the sequential procedure involved in executing the routine, designated as "EXEC", which performs the mathematical steps involved in the correlation process. The routine is started at step 110. At step 111, all interrupts are disabled while CPU initialization occurs. At step 112, any constants associated with the sampling process are set and, at step 113, communications protocols, if any, for exchange of processed data and associated results, bad rates, interrupt masks, etc. are defined.

At step 114, the reset unit indicating the presence of a bill is reset for detecting the presence of the first bill to be scanned. At step 115, the start-of-note interrupt is enabled to put the system on the look out for the first incoming bill. Subsequently, at step 116, all other related interrupts are also enabled since, at this point, the initialization process has been completed and the system is ready to begin scanning bills. A check is made at step 117 to see if, in fact, all the desired number of samples have been obtained. If the answer at step 117 is found to be negative the program loops until a positive answer is obtained.

In accordance with this invention, a simple correlation procedure is utilized for processing digitized reflectance values into a form which is conveniently and accurately compared to corresponding values pre-stored in an identical format. More specifically, as a first step, the mean value $\overline{X}$ for the set of digitized reflectance samples (comparing "a" samples) obtained for a bill scan ran is first obtained as below:

$$\overline{X} = \sum_{i=0}^{n} \frac{X_i}{n} \quad (1)$$

Subsequently, a normalizing factor Sigma "σ" is determined as being equivalent to the sum of the square of the difference between each sample and the mean, as normalized by the total number n of samples. More specifically, the normalizing factor is calculated as below:

$$\sigma = \sum_{i=0}^{n} \frac{|X_i - \overline{X}|^2}{n} \quad (2)$$

In the final step, each reflectance sample is normalized by obtaining the difference between the sample and the above-calculated mean value and dividing it by the square root of the normalizing factor Sigma "σ" as defined by the following equation:

$$X_n = \frac{X_i - \overline{X}}{(\sigma)^{1/2}} \quad (3)$$

The result of using the above correlation equations is that, subsequent to the normalizing process, a relationship of correlation exists between a test pattern and a master pattern such that the aggregate sum of the products of corresponding samples in a test pattern and any mister pattern, when divided by the total number of samples, equals unity if the patterns are identical. Otherwise, a value less than unity is obtained. Accordingly, the correlation number or factor resulting from the comparison of normalized samples within a test pattern to those of a stored master pattern provides a clear indication of the degree of similarity or correlation between the two patterns.

According to a preferred embodiment of this invention, the fixed number of reflectance samples which are digitized and normalized for a bill scan is selected to be 64. It has experimentally been found that the use of higher binary orders of samples (such as 128, 256, etc.) does not provide a correspondingly increased discrimination efficiency relative to the increased processing time involved in implementing the above-described correlation procedure. It has also been found that the use of a binary order of samples lower than 64, such as 32, produces a substantial drop in discrimination efficiency.

The correlation factor can be represented conveniently in binary terms for ease of correlation. In a preferred embodiment, for instance, the factor of unity which results when a hundred percent correlation exists is represented in terms of the binary number $2^{10}$, which is equal to a decimal value of 1024. Using the above procedure, the normalized samples within a test pattern are compared to each of the 16 master characteristic patterns stored within the system memory in order to determine the particular stored pattern to which the test pattern corresponds most closely by identifying the comparison which yields a correlation number closest to 1024.

According to a feature of this invention, a bi-level threshold of correlation is required to be satisfied before a particular call is made, for at least certain denominations of bills. More specifically, the correlation procedure is adapted to identify the two highest correlation numbers resulting from the comparison of the test pattern to one of the stored patterns. At that point, a minimum threshold of correlation is required to be satisfied by these two correlation numbers. It has experimentally been found that a correlation number of about 850 serves as a good cut-off threshold above which positive calls may be made with a high degree of confidence and below which the designation of a test pattern as corresponding to any of the stored patterns is uncertain. As a second thresholding level, a minimum separation is prescribed between the two highest correlation numbers before making a call. This ensures that a positive call is made only when a test pattern does not correspond, within a given range of correlation, to more than one stored master pattern. Preferably, the minimum separation between correlation numbers is set to be 150 when the highest correlation number is between 800 and 850. When the highest correlation number is below 800, no call is made.

Figures 6A, 6B:
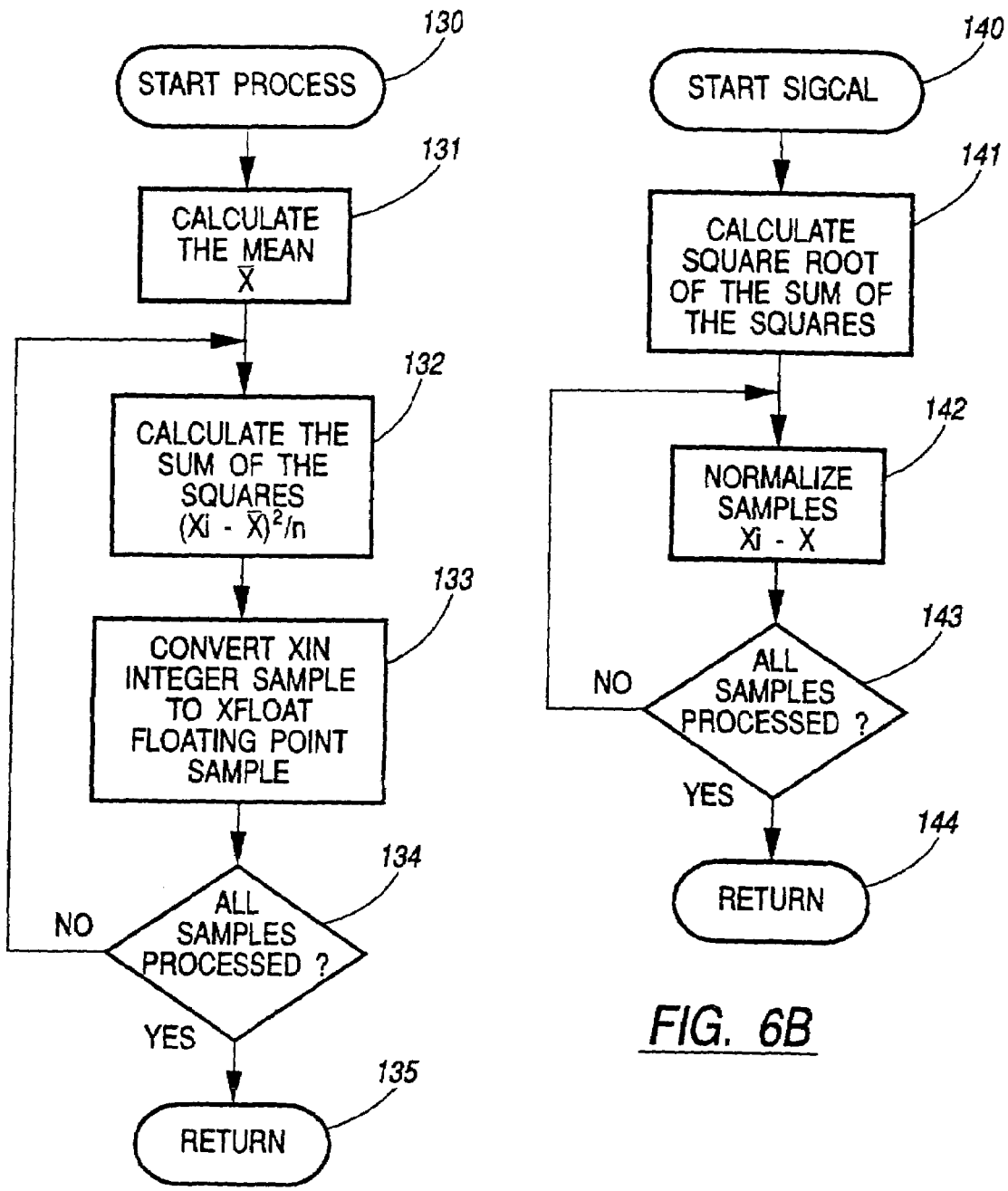

Returning now to FIG. 5, the correlation procedure is initiated at step 119 where a routine designated as "PROCESS" is accessed. The procedure involved in executing this routine is illustrated at FIG. 6A which shows the routine starting at step 130. At step 131, the mean $\overline{X}$ is calculated on the basis of Equation (1). At step 132 the sum of the squares is calculated in accordance with Equation (2). At step 133, the digitized values of the reflectance samples, as represented in integer format XIN, are converted to floating point format XFLOAT for further processing. At step 134, a check is made to see if all samples have been processed and if the answer is found to be positive, the routine ends at step 135 and the main program is accessed again. If the answer at step 134 is found to be negative, the routine returns to step 132 where the above calculations are repeated.

At the end of the routine PROCESS, the program returns to the routine EXEC at step 120 where the flag indicating that all digitized reflectance samples have been processed is reset. Subsequently, at step 121, a routine designated as "SIGCAL" is accessed. The procedure involved in executing this routine is illustrated at FIG. 6B which shows the routine starting at step 140. At step 141, the square root of the sum of the squares, as calculated by the routine PROCESS, is calculated in accordance with Equation (2). At step 142, the floating point values calculated by the routine PROCESS are normalized in accordance with Equation (3) using the calculated values at step 141. At step 143, a check is made to see if all digital samples have been processed. If the answer at step 143 is found to be negative, the program returns to step 142 and the conversion is continued until all samples have been processed. At that point, the answer at step 143 is positive and the routine returns to the main program at step 144.

Figure 7:
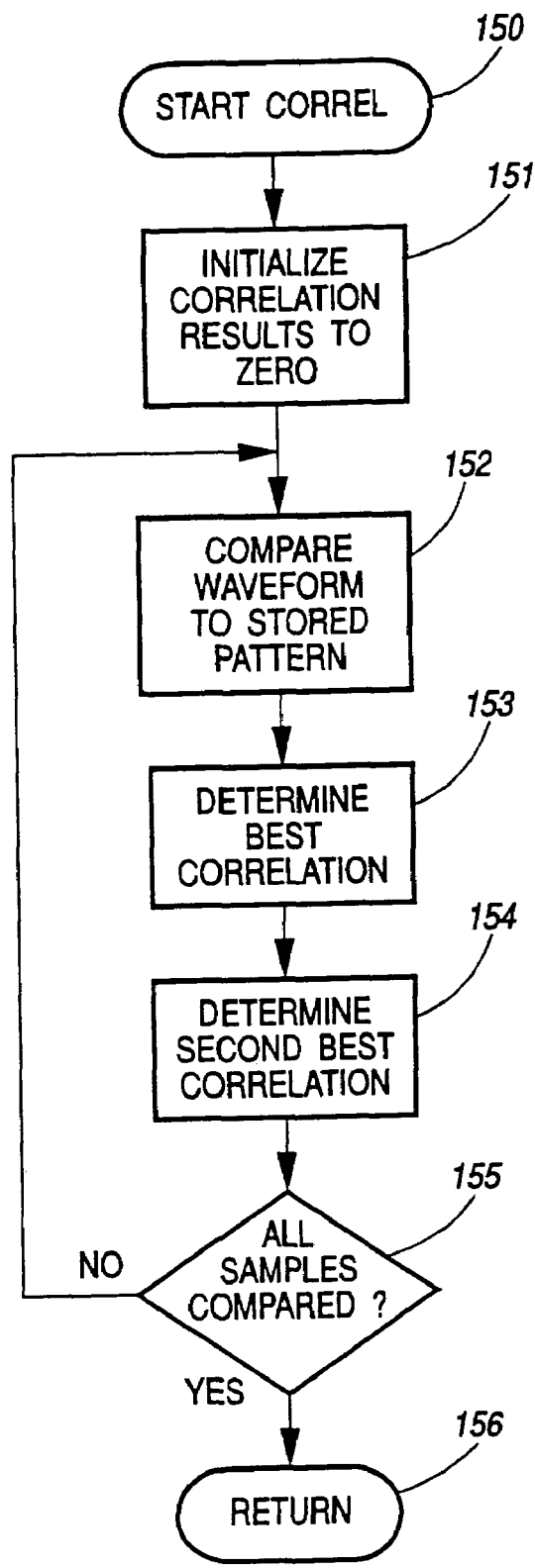

Returning to the flow chart of FIG. 5, the next step to be executed is step 122 where a routine designated as "CORBEL" is accessed. The procedure involved in executing this routine is illustrated at FIG. 7 which shows the routine starting at 150. At step 151, correlation results are initialized to zero and, at step 152, the test pattern is compared to the first one of the stored master patterns. At step 153, the first call corresponding to the highest correlation number obtained up to that point is determined. At step 154, the second call corresponding to the second highest correlation number obtained up to that point is determined. At step 155, a check is made to see if the test pattern has been compared to all master patterns. If the answer is found to be negative, the routine reverts to step 152 where the comparison procedure is reiterated. When all master patterns have been compared to the test pattern, step 155 yields a positive result and the routine returns to the main program at step 156.

Figure 8:
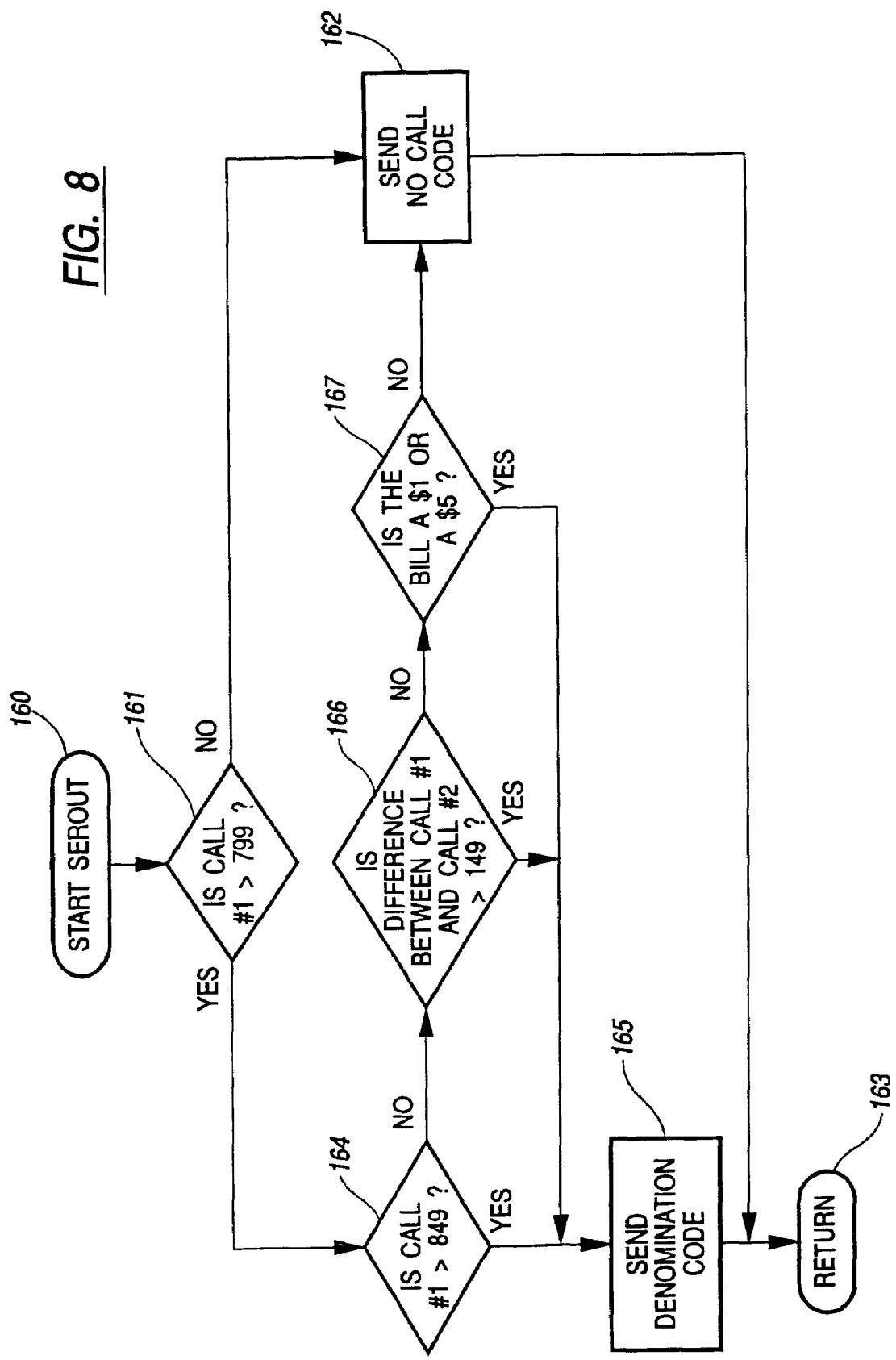

Returning again to FIG. 5, step 124 is accessed where a routine designated as "SEROUT" is initiated. The procedure involved in executing the routine SEROUT is illustrated at FIG. 8 which shows the routine as starting at step 160. Step 161 determines whether the correlation number is greater than 799. If the answer is negative, the correlation number is too low to identify the denomination of the bill with certainty, and thus step 162 generates a "no call" code and returns to the main program at step 163.

An affirmative answer at step 161 advances the system to step 164, which determines whether the correlation number is greater than 849. An affirmative answer at step 164 indicates that the correlation number is sufficiently high that the denomination of the scanned bill can be identified with certainty without any further checking. Consequently, a "denomination" code identifying the denomination represented by the stored pattern resulting in the highest correlation number is generated at step 165, and the system returns to the main program at step 163.

A negative answer at step 164 indicates that the correlation number is between 800 and 850. It has been found that correlation numbers within this range are sufficient to identify $1 and $5 bills, but not other denominations of bills. Accordingly, a negative response at step 164 advances the system to step 166 which determines whether the difference between the two highest correlation numbers is greater than 149. If the answer is affirmative, the denomination identified by the highest correlation number is acceptable, and thus the "denomination" code is generated at step 165.

If the difference between the two highest correlation numbers is less than 150, step 166 produces a negative response which advances the system to step 167 to determine whether the highest correlation number identified the bill as either a $1-bill or a $5-bill. If the answer is affirmative, the highest correlation number is acceptable as identifying the bill denomination, and thus the "denomination" code is generated at step 165. A negative response at step 167 indicates that the bill was not identified as a $1-bill or a $5-bill by the highest correlation number, the difference between the two highest correlation numbers was less than 150, and the highest correlation number was less then 850. This combination of conditions indicates that a positive call cannot be made with a high degree of confidence, and thus the "no call" code is generated at step 162.

One problem encountered in currency recognition and counting systems of the above-described kind is the difficulty involved in interrupting (for a variety of reasons) and resuming the scanning and counting procedure as a stack of bills is being scanned. If a particular currency recognition unit (CRU) has to be halted in operation due to a "major" system error, such as a bill being jammed along the transport path, there is generally no concern about the outstanding transitional status of the overall recognition and counting process. However, where the CRU has to be halted due to a "minor" error, such as the identification of a scanned bill as being a counterfeit (based on a variety of monitored parameters which are not pertinent to the present disclosure) or a "no call" (a bill which is not identifiable as belonging to a specific currency denomination based on the plurality of stored master patterns and/or other criteria), it is desirable that the transitional status of the overall recognition and counting process be retained so that the CRU may be restarted without any effective disruptions of the recognition/counting process.

More specifically, once a scanned bill has been identified as a "no call" bill ($B_1$) based on some set of predefined criteria, it is desirable that this bill $B_1$ be transported directly to the system stacker and the CRU brought to a halt with bill $B_1$ remaining at the top-most stacker position while, at the same time, ensuring that the following bills are maintained in positions along the bill transport path whereby CRU operation can be conveniently resumed without any disruption of the recognition/counting process.

Since the bill processing speeds at which currency recognition systems must operate are substantially high (speeds of the order of about 1000 bills per minute are desirable), it is practically impossible to totally halt the system following a "no call" without the following bill $B_2$ already being transported under the optical scanhead and partially scanned. As a result, it is virtually impossible for the CRU system to retain the transitional status of the recognition/counting process (particularly with respect to bill $B_2$) in order that the process may be resumed once the bad bill $B_1$ has been transported to the stacker, conveniently removed therefrom, and the system restarted. The basic problem is that if the CRC is halted with bill $B_2$ only partially scanned, there is no possibility of referencing the data reflectance samples extracted therefrom in such a way that the scanning may be later continued (when the CRU is restarted) from exactly the same point where the sample extraction process was interrupted when the CRU was stopped.

Even if an attempt were made at immediately halting the CRU system following a "no call," any subsequent scanning of bills would be totally unreliable because of mechanical backlash effects and the resultant disruption of the optical encoder routine used for bill scanning. Consequently, when the CRU is restarted, the call for the following bill is also likely to be bad and the overall recognition/counting process is totally disrupted as a result of an endless loop of "no calls.".

According to an important feature of the present invention, the above problems are solved by an improved currency detecting and counting technique whereby a scanned bill identified as a "no call" is transported directly to the top of the system stacker and the CRU is halted without adversely affecting the data collection and processing steps for a succeeding bill. Accordingly, when the CRU is restarted, the overall bill recognition and counting procedure can be resumed without any disruption as if the CRU had never been halted at all.

According to the improved currency detecting/counting technique, the CRU is operated in the normal fashion described above in detail, whereby an incoming bill is scanned and processed in order to make a call as to the bill denomination. If the bill is identified as a "no call" based on any of a variety of conventionally defined bill criteria (such as the criteria in FIG. 8), the CRU is subjected to a controlled deceleration process whereby the CRU operating speed, i.e., the speed at which test bills are moved across the system scanhead along the bill transport path, is reduced from it normal operating level. During this deceleration process the "no call" bill ($B_1$) is =sported to the top of the stacker and, at the same time, the following bill $B_2$ is subjected to the standard scan and processing procedure in order to identify the denomination thereof.

The rate of deceleration is such that optical scanning of bill $B_2$ is completed by the time the CRU operating speed is reduced to a predefined operating speed. While the exact operating speed at the end of the scanning of bill $B_2$ is not critical, the objective is to permit complete scanning of bill $B_2$ without subjecting it to backlash effects that would result if the ramping were too fast while, at the same time, ensuring that the bill $B_1$ has in fact been transported to the stacker in the meantime.

It has experimentally been determined that at nominal operating speeds of the order of 1000 bills per minute, the deceleration is preferably such that the CRU operating speed is reduced to about one-third of its normal operating speed at the end of the deceleration phase. i.e., by the time optical scanning of bill $B_2$ has been completed. It has been determined that at these speed levels, positive calls can be made as to the denomination of bill $B_2$ based on reflectance samples gathered during the decleration phase with a relatively high degree of certainty (i.e. with a correlation number exceeding about 850.)

Once the optical scanning of bill $B_2$ has been completed, the weed is reduced to an even slower speed until the bill $B_2$ has passed bill-edge sensors S1 and S2 described below whereby it is then brought to a complete stop. At the same time, the results of the processing of scanned data corresponding to bill $B_2$ are stored in system memory. The ultimate result of this stopping procedure is that the CRC is brought to a complete halt following the point where the scanning of bill $B_2$ has been reliably completed since the scan procedure is not subjected to the disruptive effects (backlash, etc.) which would result if a complete halt were attempted immediately after bill $B_1$ is identified as a "no call."

More importantly, the reduced operating speed of the machine at the end of the deceleration phase is such that the CRU can be brought to a total halt before the next following bill $B_3$ has been transported over the optical scanhead. Thus, when the CRU is in fact halted, bill $B_1$ is positioned at the top of the system stacker, bill $B_2$ is maintained in transit between the optical scanhead and the stacker after it has been subjected to scanning, and the following bill $B_3$ is stopped short of the optical scanhead.

Figure 8A:
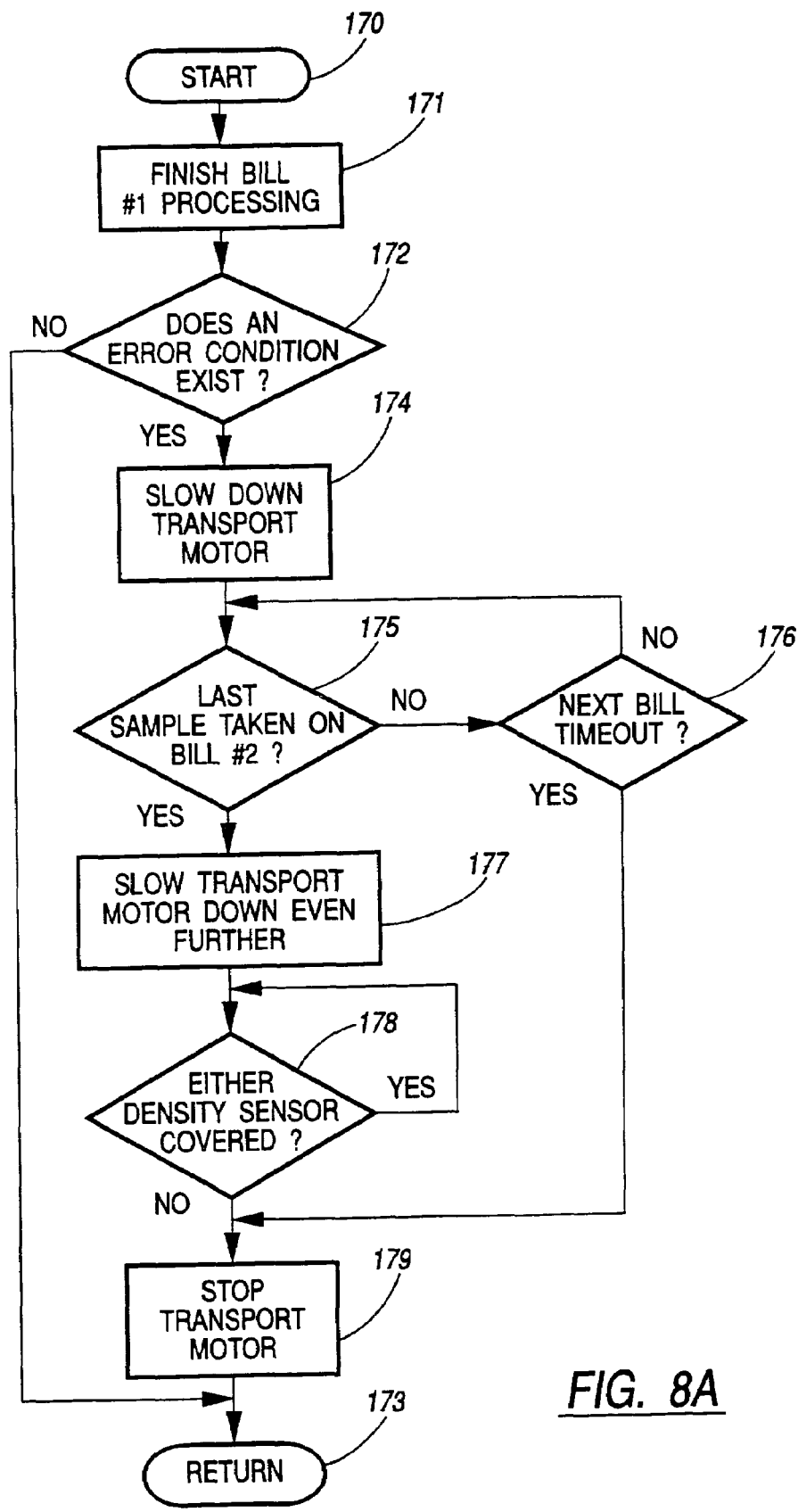

When the CRU is restarted, presumably after corrective action has been taken responsive to the "minor" error which led to the CRU being stopped (such as the removal of the "no call" bill from the top of the stacker), the overall bill recognition/counting operation can be resumed in an uninterrupted fashion by using the stored call results for bill $B_2$ as the basis for updating the system count appropriately, moving bill $B_2$ from its earlier transitional position along the transport path into the stacker, and moving bill $B_3$ along the transport path into the optical scanhead area where it can be subjected to normal scanning and processing. A routine for executing the deceleration/stopping procedure described above is illustrated by the flow chart in FIG. 8A. This routine is initiated at step 170 with the CRU in its normal operating mode. At step 171, a test bill $B_1$ is scanned and the data reflectance samples resulting therefrom are processed. Next, at step 172, a determination is made as to whether or not test bill $B_1$ is a "no call" using predefined criteria in combination with the overall bill recognition procedure, such as the routine of FIG. 5. If the answer at step 172 is negative, i.e., the test bill $B_i$ can be identified, step 173 is accessed where normal bill processing is continued in accordance with the procedures described above. If, however, the test bill $B_1$ is found to be bad at step 172, step 174 is accessed where CRU slowdown is initiated, e.g., the transport drive motor speed is reduced to about one-third its normal speed.

Subsequently, the bad bill $B_1$ is guided to the stacker while, at the same time, the following test bill $B_2$ is brought under the optical scanhead and subjected to the scanning and processing steps. The call resulting from the scanning and processing of bill $B_2$ is stored in system memory at this point. Step 175 determines whether the scanning of bill $B_2$ is complete. When the answer is negative, step 176 determines whether a preselected "bill timeout" period has expired so that the system does not wait for the scanning of a bill that is not present. An affirmative answer at step 176 returns the system to the main program at step 175 while a negative answer at step 176 causes steps 175 and 176 to be reiterated until one of them produces an affirmative response.

An affirmative response at step 175 causes step 177 to further reduce the speed of the =sport drive motor, i.e., to one-sixth the normal speed. Before stooping the transport drive motor, step 178 determines whether either of the sensors S1 or S2 (described below) is covered by a bill. A negative answer at step 173 indicates that the bill has cleared both sensors S1 and S2 and thus the transport drive motor is stopped at step 179. This signifies the end of the deceleration/stopping process. At this point in time, bill $B_2$ remains in transit while the following bill $B_3$ is stopped on the transport path just short of the optical scanhead.

Following step 179, corrective action responsive to the identification of a "no call" bill is conveniently undertaken; the top-most bill in the stacker is easily removed therefrom and the CRU is then in condition for resuming the recognition/counting process. Accordingly, the CRU can be restarted and the stored results corresponding to bill $B_2$ are used to appropriately update the system count. Next, the identified bill $B_2$ is guided along the transport path to the stacker, and the CRU continues with its normal processing routine.

Figure 9A:
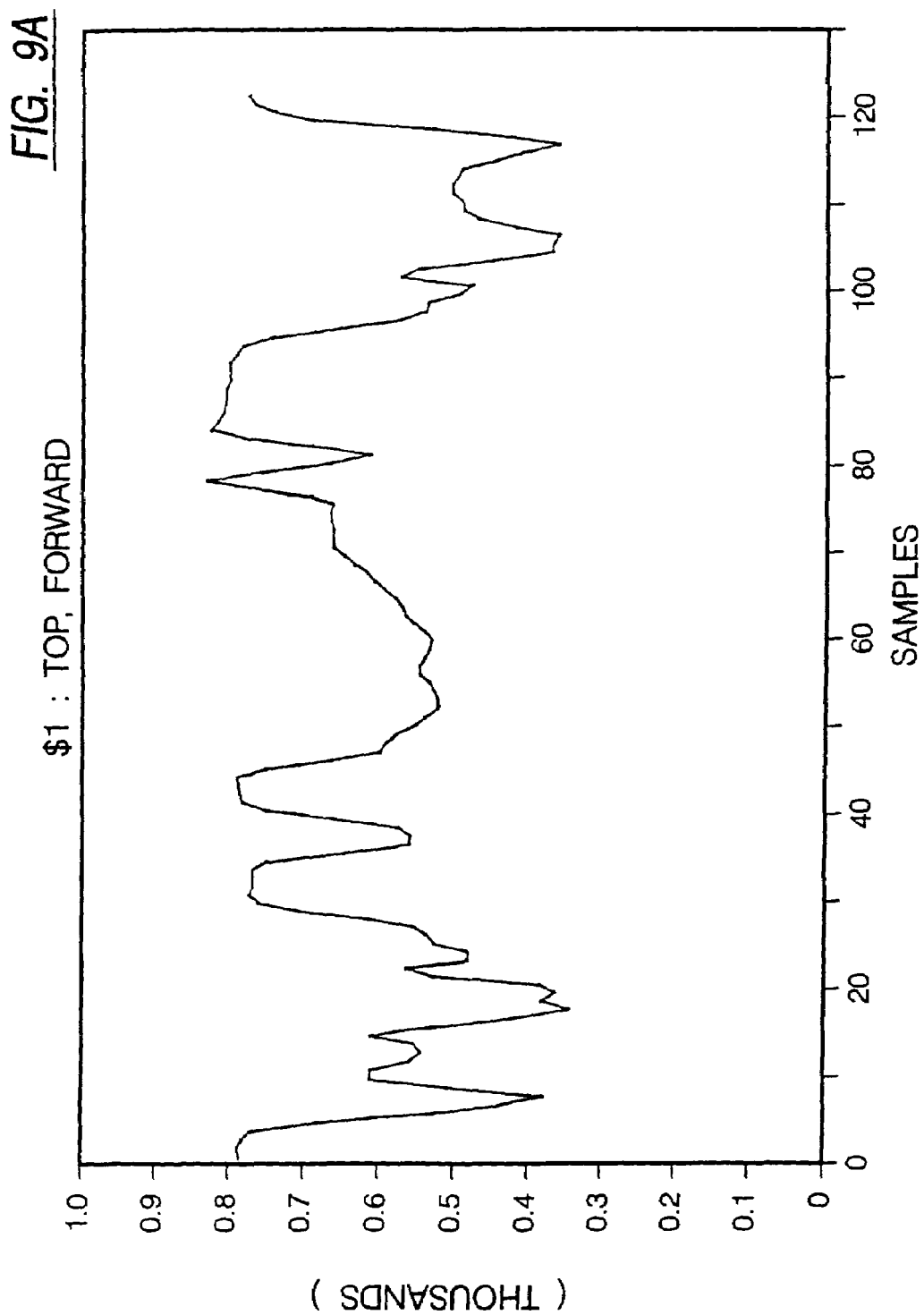

Referring now to FIGS. 9A-C there are shown three test patterns generated, respectively, for the forward scanning of a $1 bill along its green side, the reverse scanning of a $2 bill on its green side, and the forward scanning of a $100 bill on its green side. It should be noted that, for purposes of clarity the test patterns in FIGS. 9A-C were generated by using 128 reflectance samples per bill scan, as opposed to the preferred use of only 64 samples. The marked difference existing between corresponding samples for these three test patterns is indicative of the high degree of confidence with which currency denominations may be called using the foregoing optical sensing and correlation procedure.

The optical sensing and correlation technique described above permits identification of pre-programmed currency denominations with a high degree of accuracy and is based upon a relatively low processing time for digitizing sampled reflectance values and comparing them to the master characteristic patterns. The approach is used to scan currency bills, normalize the scanned data and generate master patterns in such a way that bill scans during operation have a direct correspondence between compared sample points in portions of the bills which possess the most distinguishable printed indicia. A relatively low number of reflectance samples is required in order to be able to adequately distinguish between several currency denominations.

A major advantage with this approach is that it is not required that currency bills be scanned along their wide dimensions. Further, the reduction in the number of samples reduces the processing time to such an extent that additional comparisons can be made during the time available between the scanning of successive bills. More specifically, as described above, it becomes possible to compare a test pattern with two or more stored master characteristic patterns so that the system is made capable of identifying currency which is scanned in the "forward" or "reverse" directions along the green surface of the bill.

Another advantage accruing from the reduction in processing time realized by the present sensing and correlation scheme is that the response time involved in either stopping the transport of a bill that has been identified as "spurious", i.e., not corresponding to any of the stored master characteristic patterns, or diverting such a bill to a separate stacker bin, is correspondingly shortened. Accordingly, the system can conveniently be programmed to set a flag when a scanned pattern does not correspond to any of the master patterns. The identification of such a condition can be used to stop the bill transport drive motor for the mechanism. Since the optical encoder is tied to the rotational movement of the drive motor, synchronism can be maintained between pre- and post-stop conditions. In the dual-processor implementation discussed above, the information concerning the identification of a "spurious" bill would be included in the information relayed to the general processor unit which, in turn, would control the drive motor appropriately.

The correlation procedure and the accuracy with which a denomination is identified directly relates to the degree of correspondence between reflectance samples on the test pattern and corresponding samples on the stored master patterns. Thus, shrinkage of "used" bills which, in turn, causes corresponding reductions in their narrow dimensions, can possibly produce a drop in the degree of correlation between such used bills of a given denomination and the corresponding master patterns. Currency bills which have experienced a high degree of wage exhibit such a reduction in both the narrow and wide dimensions of the bills. While the sensing and correlation technique of this invention remains relatively independent of any changes in the wide dimension of bills, reduction along the narrow dimension can affect correlation factors by realizing a relative displacement of reflectance samples obtained as the "shrunk" bills are transported across the scanhead.

In order to accommodate or nullify the effect of such narrow dimension shrinking, the above-described correlation technique can be modified by use of a progressive shifting approach whereby a test pattern which does not correspond to any of the master patterns is partitioned into predefined sections, and samples in successive sections are progressively shifted and compared again to the stored patterns in order to identify the denomination. It has experimentally been determined that such progressive shifting effectively counteracts any sample displacement resulting from shrinkage of a bill along its narrow dimension.

Figure 10A:
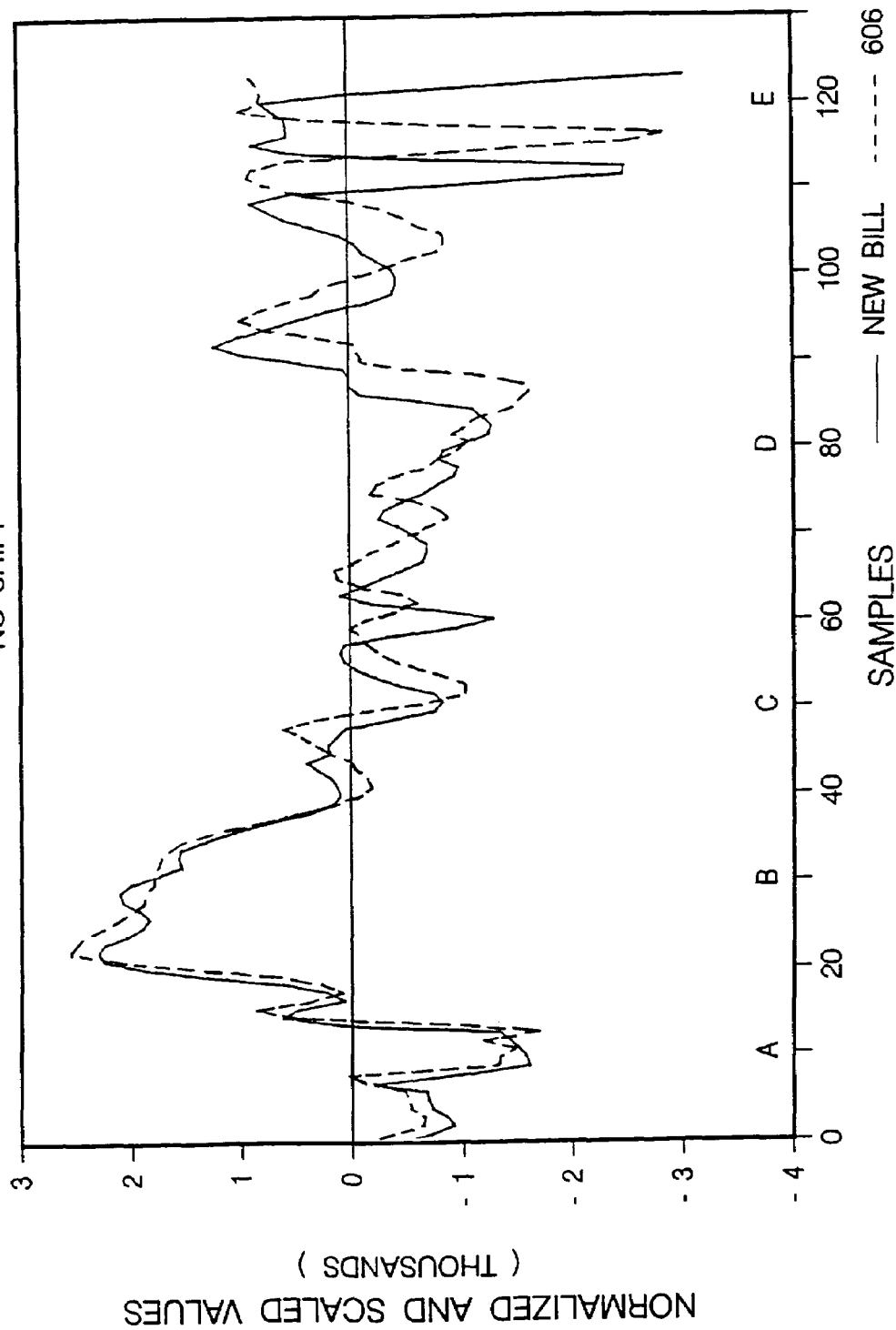

The progressive shifting effect is best illustrated by the correlation patterns shown in FIGS. 10A-D. For purposes of clarity, the illustrated patterns were generated using 128 samples for each bill scan as compared to the preferred use of 64 samples. FIG. 10A shows the correlation between a test pattern (represented by a heavy line) and a corresponding master pattern (represented by a thin line). It is clear from FIG. 10A that the degree of correlation between the two patterns is relatively low and exhibits a correlation factor of 606.

The manner in which the correlation between these patterns is increased by employing progressive shifting is best illustrated by considering the correlation at the reference points designated as A-E along the axis defining the number of samples. The effect on correlation produced by "single" progressive shifting is shown in FIG. 10B which shows "single" shifting of the test pattern of FIG. 10A. This is effected by dividing the test pattern into two equal segments each comprising 64 samples. The first segment is retained without any shift, whereas the second segment is shifted by a factor of one data sample. Under these conditions, it is found that the correlation factor at the reference points located in the shifted section, particularly at point E, is improved.

FIG. 10C shows the effect produced by "double" progressive shifting whereby sections of the test pattern are shifted in three stages. This is accomplished by dividing the overall pattern into three approximately equal sized sections. Section one is not shifted, section two is shifted by one data sample (as in FIG. 10B), and section three is shifted by a factor of two data samples. With "double" shifting, it can be seen that the correlation factor at point E is further increased.

On a similar basis, FIG. 10D shows the effect on correlation produced by "triple" progressive shifting where the overall pattern is first divided into four (4) approximately equal sized sections. Subsequently, section one is retained without any shift, section two is shifted by one data sample, section three is shifted by two data samples, and section four is shifted by three data samples. Under these conditions, the correlation factor at point E is seen to have increased again.

FIG. 10E shows the effect on correlation produced by "quadruple" shifting, where the pattern is first divided into five (5) approximately equal sized sections. The first four (4) sections are shifted in accordance with the "triple" shifting approach of FIG. 10D, whereas the fifth section is shifted by a factor of four (4) data samples. From FIG. 10E it is clear that the correlation at point E is increased almost to the point of superimposition of the compared data samples.

The advantage of using the progressive shifting approach, as opposed to merely shifting by a set amount of data samples across the overall test pattern, is that the improvement in correlation achieved in the initial sections of the pattern as a result of shifting is not neutralized or offset by any subsequent shifts in the test pattern. It is apparent from the above figures that the degree of correlation for sample points falling within the progressively shifted sections increases correspondingly.

More importantly, the progressive shifting realizes substantial increases in the overall correlation factor resulting from pattern comparison. For instance, the original correlation factor of 606 (FIG. 10A) is increased to 681 by the "single" shifting shown in FIG. 10B. The "double" shifting shown in FIG. 10C increases the correlation number to 793, the "triple" shifting of FIG. 10D increases the correlation number to 906, and, finally, the "quadruple" shifting shown in FIG. 10E increases the overall correlation number to 960. Using the above approach, it has been determined that used currency bills which exhibit a high degree of narrow dimension shrinkage and which cannot be accurately identified as belonging to the correct currency denomination when the correlation is performed without any shifting, can be identified with a high degree of certainty by using progressive shifting approach, preferably by adopting "triple" or "quadruple" shifting.

Figure 11:
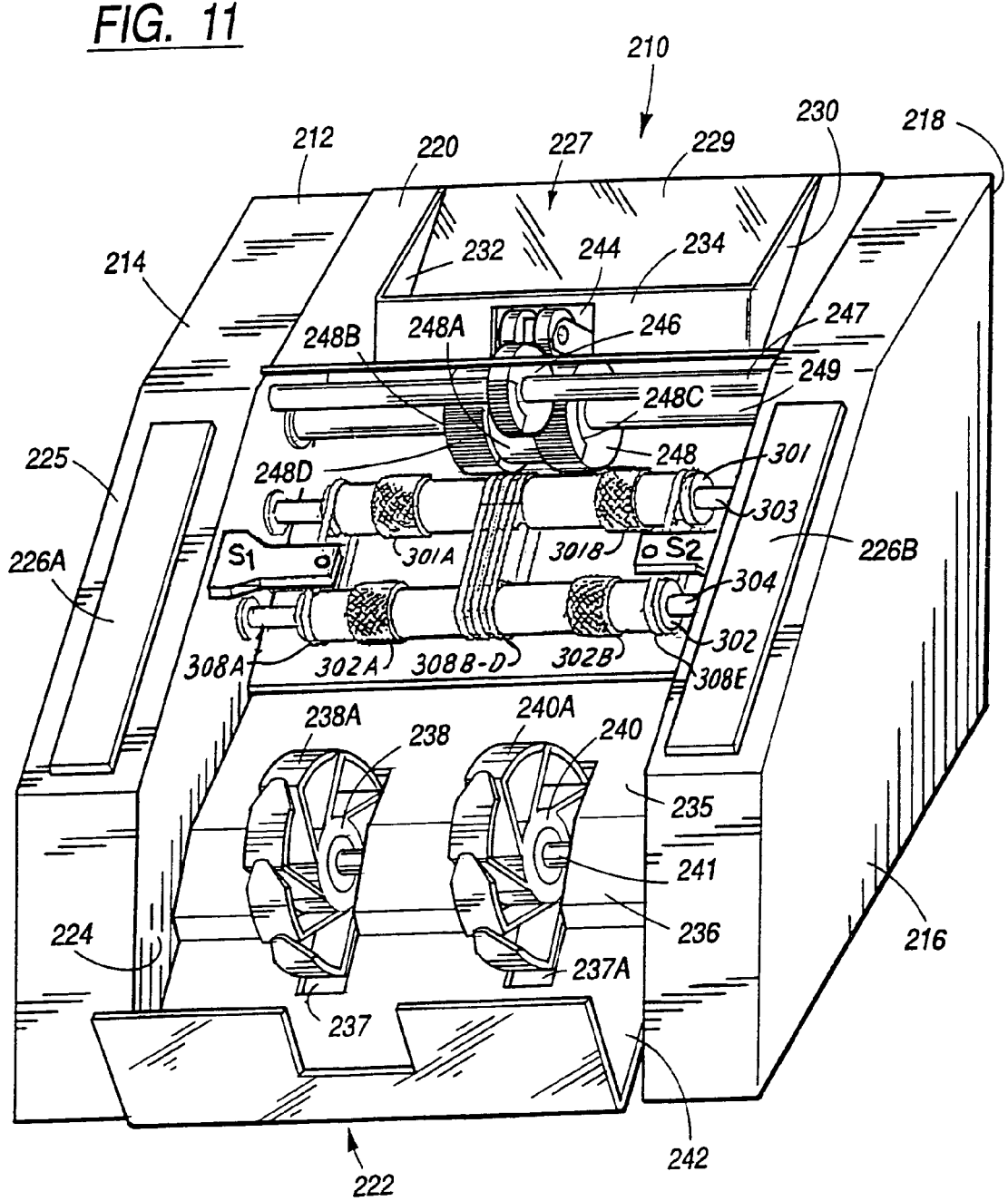
FIG. 11 is a perspective view showing currency discrimination and counting apparatus particularly adapted to and embodying the optical sensing and correlation technique of this invention.

Referring now to FIG. 11, there is shown apparatus 210 for currency discrimination and counting which embodies the principles of the present invention. The apparatus comprises a homing 212 which includes left and right hand sidewalls 214 and 216, respectively, a rear wall 218, and a top surface generally designated as 220. The apparatus has a front section 222 which comprises a generally vertical forward section 224 and a forward sloping section 225 which includes side sections provided with control panels 226A and 226B upon which various control switches for operating the apparatus, as well as associated display means, are mounted.

For accepting a stack of currency bills 228 (FIG. 12) which have to be discriminated according to denomination, an input bin 227 is defined on the too surface 220 by a downwardly sloping support surface 229 on which are provided a pair of vertically disposed side walls 230, 232 linked together by a vertically disposed front wall 234. The walls 230, 232 and 234, in combination with the sloping surface 229, define an enclosure where the stack of currency bills 228 is positioned.

From the input bin, currency bills are moved along a trisectional transport path which includes an input path where bills are moved along a first direction in a substantially flat position, a curved guideway where bills are accepted from the input path and guided in such a way as to change the direction of travel to a second different direction, and an output path where the bills are moved in a flat position along the second different direction across currency discrimination means located downstream of the curved guideway, as will be described in detail below. In accordance with the improved optical sensing and correlation technique of this invention, the transport path is defined in such a way that currency bills are accepted, transported along the input path, the curved guideway, and the output path, and stacked with the narrow dimension "W" of the bills being maintained parallel to the transport path and the direction of movement at all times.

The forward sloping section 225 of the document handling apparatus 210 includes a platform surface 235 centrally disposed between the side walls 214, 216 and is adapted to accept currency bills which have been processed through the currency discrimination means for delivery to a stacker plate 242 where the processed bills are stacked for subsequent removal. More specifically, the platform 235 includes an associated angular surface 236 and is provided with openings 237, 237A from which flexible blades 238A. 240A of a corresponding pair of stacker wheels 238, 240, respectively, extend outwardly. The stacker wheels are supported for rotational movement about a stacker shaft 241 disposed about the angular surface 236 and suspended across the side walls 214 and 216. The flexible blades 238A, 240A of the stacker wheels cooperate with the stacker platform 235 and the openings 237, 237A to pick up currency bills delivered thereto. The blades operate to subsequently deliver such bills to a stacker plate 242 which is linked to the angular surface 236 and which also accommodates the stacker wheel openings and the wheels projecting therefrom. During operation, a currency bill which is delivered to the stacker platform 235 is picked up by the flexible blades and becomes lodged between a pair of adjacent blades which, in combination, define a curved enclosure which decelerates a bill entering therein and serves as a means for supporting and transferring the bill from the stacker platform 235 onto the stacker plate 242 as the stacker wheels rotate. The mechanical configuration of the stacker wheels and the flexible blades provided thereupon, as well as the manner in which they cooperate with the stacker platform and the stacker plate, is conventional and, accordingly, is not described in detail herein.

The bill handling and counting apparatus 210 is provided with means for picking up or "stripping" currency bills, one at a time, from bills that are stacked in the input bin 227. In order to provide this stripping action, a feed roller 246 is rotationally suspended about a drive shaft 247 which, in turn, is supported across the side walls 214, 216. The feed roller 246 projects through a slot provided on the downwardly sloping surface 229 of the input bin 227 which defines the input path and is in the form of an eccentric roller at least a part of the periphery of which is provided with a relatively high friction-bearing surface 246A. The surface 246A is adapted to engage the bottom bill of the bill stack 228 as the roller 246 rotates; this initiates the advancement of the bottom bill along the feed direction represented by the arrow 247B (see FIG. 13). The eccentric surface of the feed roller 246 essentially "jogs" the bill stack once per revolution so as to agitate and loosen the bottom currency bill within the stack, thereby facilitating the advancement of the bottom bill along the feed direction.

The action of the feed roller 246 is supplemented by the provision of a capstan or drum 248 which is suspended for rotational movement about a capstan drive shaft 249 which, in turn, is supported across the side walls 214 and 216. Preferably, the capstan 248 comprises a centrally disposed friction roller 248A having a smooth surface and formed of a friction-bearing material such as rubber or hard plastic. The friction roller is sandwiched between a pair of capstan rollers 248B and 248C, at least a part of the external peripheries of which are provided with a high friction-bearing surface 248D.

The friction surface 248D is akin to the friction surface 246A provided on the feed roller and permits the capstan rollers to frictionally advance the bottom bill along the feed direction. Preferably, the rotational movement of the capstan 248 and the feed roller 246 is synchronized in such a way that the frictional surfaces provided on the peripheries of the capstan and the feed roller rotate in unison, thereby inducing complimentary frictional contact with the bottom bill of the bill stack 222.

In order to ensure active contact between the capstan 248 and a currency bill which is jogged by the feed roller 246 and is in the process of being advanced frictionally by the capstan rollers 248B, 248C, a pair of picker rollers 252A, 252B, are provided for a consistent downward force onto the leading edges of the currency bills stationed in the input bin 227. The picker rollers are supported on corresponding picker arms 254A, 254B which, in turn, are supported for arcuate movement about a support shaft 256 suspended across the side walls of the apparatus. The picker rollers are free wheeling about the picker arms and when there are no currency bills in contact with the capstan 248, bear down upon the friction roller 248A and, accordingly, are induced into counter-rotation therewith. However, when currency bills are present and are in contact with the capstan 248, the picker rollers bear down into contact with the leading edges of the currency bills and exert a direct downward force on the bills since the rotational movement of rollers is inhibited. The result is that the advancing action brought about by contact between the friction-bearing surfaces 248D on the capstan rollers 248B, 248C is accentuated, thereby facilitating the stripping away of a single currency bill at a time from the bill stack 228.

In between the picker arms 254A, 254B, the support shaft 256 also supports a separator arm 260 which carries at its end remote from the shaft a stationary stripper shoe 258 which is provided with a frictional surface which imparts a frictional drag upon bills onto which the picker rollers bear down. The separator arm is mounted for arcuate movement about the support shaft 256 and is spring loaded in such a way as to bear down with a selected amount of force onto the capstan.

In operation, the picker rollers rotate with the rotational movement of the friction roller 248A due to their free wheeling nature until the leading edges of one or more currency bills are encountered. At that point, the rotational movement of the picker rollers stops and the leading edges of the bills are forced into positive contact with the friction bearing surfaces on the periphery of the capstan rollers. The effect is to force the bottom bill away from the rest of the bills along the direction of rotation of the capstan. At the same time, the separator shoe 258 also bears down on any of the bills that are propelled forward by the capstan rollers.

The tension on the picker arm 254A is selected to be such that the downward force exerted upon such a propelled bill allows only a single bill to move forward. If two or more bills happen to be propelled out of the contact established between the picker rollers and the capstan rollers, the downward force exerted by the spring loaded shoe should be sufficient to inhibit further forward movement of the bills. The tension under which the picker arm is spring loaded can be conveniently adjusted to control the downward bearing force exerted by the shoe in such a way as to compliment the bill snipping action produced by the picker rollers and the capstan rollers. Thus, the possibility that more than two bills may be propelled forward at the same time due to the rotational movement of the capstan is significantly reduced.

The bill transport path includes a curved guideway 270 provided in front of the capstan 248 for accepting currency bills that have been propelled forward along the input path defined by the forward section of the sloping surface 229 into frictional contact with the rotating capstan. The guideway 270 includes a curved section 272 which corresponds substantially to the curved periphery of the capstan 248 so as to compliment the impetus provided by the capstan rollers 248B, 248C to a stripped currency bill.

A pair of idler rollers 262A, 262B is provided downstream of the picker rollers for guiding bills propelled by the capstan 248 into the curved guideway 270. More specifically, the idler rollers are mounted on corresponding idler arms 264A, 264B which are mounted for arcuate movement about an idler shaft 266 which, in turn, is supported across the side walls of the apparatus. The idler arms are spring loaded on the idler shaft so that a selected downward force can be exerted through the idler rollers onto a stripped bill, thereby ensuring continued contact between the bill and the capstan 248 until the bill is guided into the curved section 272 of the guideway 270.

A modified feed mechanism is described in the assignee's copending U.S. patent application Ser. No. 07/680,585, filed Apr. 4, 1991, for "Feed Arrangement For Currency Handling Machines," which is incorporated herein by reference.

Figure 13:
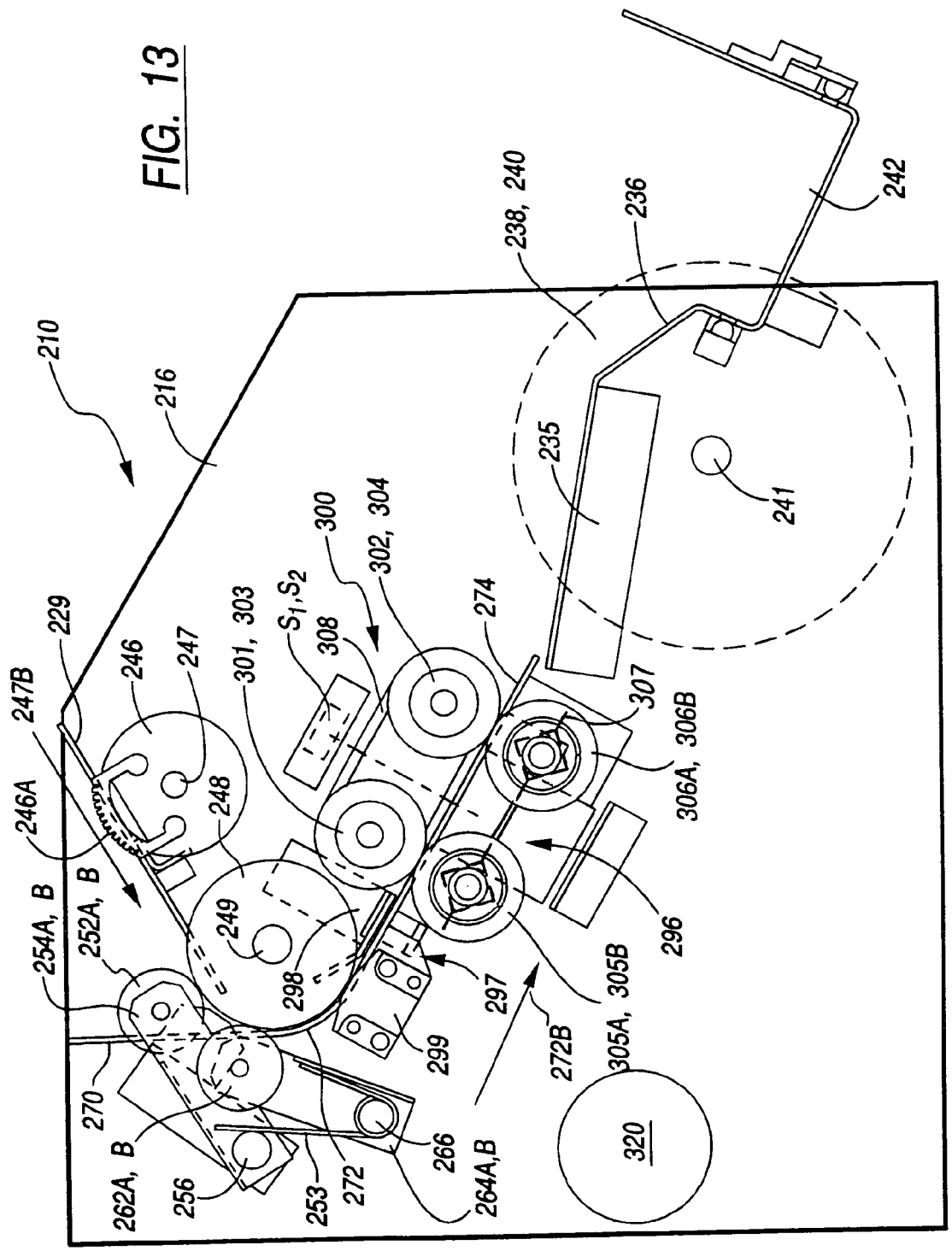
FIG. 13 is a side view of the apparatus of FIG. 11 illustrating the separation mechanism and the transport path.

Downstream of the curved section 272, the bill transport path has an output path for currency bills. The output path is provided in the form of a flat section 274 along which bills which have been guided along the curved guideway 270 by the idler rollers 262A, 262B are moved along a direction which is opposite to the direction along which bills are moved out of the input bin. The movement of bills along the direction of rotation of the capstan, as induced by the picker rollers 252A, 252B and the capstan rollers 248B, 248C, and the guidance provided iii by the section 272 of the curved guideway 270 changes the direction of movement of the currency bills from the initial movement along the sloping surface 229 of input bin 227 (see arrow 247B in FIG. 13) to a direction along the flat section 274 of the output path, as best illustrated in FIG. 13 by the arrow 272B.

Thus, a currency bill which is stripped from the bill stack in the input bin is initially moved along the input path under positive contact between the picker rollers 252A, 252B and the capstan rollers 248B, 243C. Subsequently, the bill is guided through the curved guideway 270 under positive contact with the idler rollers 262A, 262B onto the flat section 274 of the output path.

In the output path, currency bills are positively guided along the flat section 274 by means of a transport roller arrangement which includes a pair of axially spaced, positively driven transport rollers 301, 302 which are respectively disposed on transport shafts 303 and 304 supported across the sidewalls of the apparatus. The first transport roller 301 includes a pair of projecting cylindrical sections 301A, 301B which preferably have a high-friction outer surface, such as by the provision of knurling thereupon. The second transport roller 302 which is downstream of the first roller along the flat section of the transport path also has similar cylindrical high-friction knurled sections 302A and 302B.

The flat section 274 is provided with openings through which each of the knurled sections of the transport rollers 301 and 302 are subjected to counter-rotating contact with corresponding passive transport rollers 305A, 305B, 306A and 306B. The passive rollers are mounted below the flat section 274 of the transport path in such a manner as to be freewheeling about their axes and biased into counter-rotating contact with the corresponding knurled sections of the first and second transport rollers. While any appropriate mechanical suspending and pressuring arrangement may be used for this purpose, in the illustrative embodiment passive rollers 305A and 306A are biased into contact with knurled sections 301A and 3023 by means of an H-shaped leaf spring 307. The rollers are cradled in a freewheeling fashion within each of the two cradle sections of the spring through a support shaft (not shown) appropriately suspended about the spring. The arrangement is such that the leaf spring 307 is mounted relative to the passive rollers 305A and 306A in such a way that a controllable amount of pressure is exerted against the rollers and pushes them against the active rollers 301 and 302. A similar leaf spring/suspension arrangement is used to mount the other set of passive rollers 305B and 306B into spring-loaded, freewheeling counter-rotating contact with the knurled sections 301B and 302B of the active transport rollers 301 and 302.

Preferably, the points of contact between the active and passive rollers are made coplanar with the output path so that currency bills can be moved or positively guided along the path in a flat mariner under the positive contact of the opposingly disposed active and passive rollers.

The distance between the two active transport rollers and of course, the corresponding counter-rotating passive rollers, is selected to be just short of the length of the narrow dimension of the currency bills that are to be discriminated. Accordingly, currency bills are firmly gripped under uniform pressure between the two sets of active and passive rollers within the scanhead area, thereby minimizing the possibility of bill skew and enhancing the reliability of the overall scanning and recognition process.

The first active transport roller 301 is driven at a speed substantially higher than that of the capstan rollers in the feed section. Since the passive rollers are freewheeling and the active rollers are positively driven, the first transport roller 301 causes a bill that comes between the roller and its corresponding passive rollers 305A, 305B along the flat section of the output path to be pulled into the nip formed between the active and passive rollers (more specifically, between these passive rollers and the corresponding knurled sections 301A, 301B on the active transport roller). The higher speed of the active transport roller imparts an abrupt acceleration to the bill which strips the bill away from any other bills that may have been guided into the curved guideway along with the particular bill being acted upon by the transport roller.

Currency bills are subsequently moved downstream of the first transport roller along the flat section into the nip formed between the knurled sections 302A, 302B on the second active transport roller 302 and the corresponding passive rollers 306A, 306B with the second active transport roller being driven at the same speed as that of the first transport roller.

The disposition of the second transport roller is selected to be such that the positive contact exerted by the cylindrical knurled sections 302A, 302BA on the second transport roller 302 and the corresponding passive rollers 306A, 306B upon a currency bill moving along the output path occurs before the bill is released from the similar positive contact between the knurled sections 301A, 301B on the first transport roller 301 and the corresponding passive rollers 305A, 305B. As a result, the second transport roller 302 and its corresponding passive rollers 306A, 306B together positively guide a currency bill through the scanhead area (where the transport rollers are located) onto the stacker platform 235, from where the stacker wheels 238, 240 pick up the bill and deposit it onto the stacker place 242.

Bills are held flat against the scanhead 18 by means of a plurality of O-rings 308 which are disposed in corresponding grooves 309 on the transport rollers 301 and 302. In a preferred arrangement, five such O-rings 308A-E are used, one at each end of the transport rollers and three in the central regions of the rollers.

The positive guiding arrangement described above is advantageous in that uniform guiding pressure is maintained upon bills as they are transported through the optical scanhead area; more importantly, this is realized without adding significantly to mechanical complexity. In effect, the bill feeding operation is made stable, and twisting or skewing of currency bills is substantially reduced. This positive action is supplemented by the use of the H-spring for uniformly biasing the passive rollers into contact with the active rollers so that bill twisting or skew resulting from differential pressure applied to the bills along the transport path is avoided. The O-rings 308 function as simple, yet extremely effective means for ensuring that the bills are held flat. Since the O-rings constitute standard off-the shelf items, any adjustment of the center distance between the two active transport rollers can be conveniently accommodated.

Figure 12:
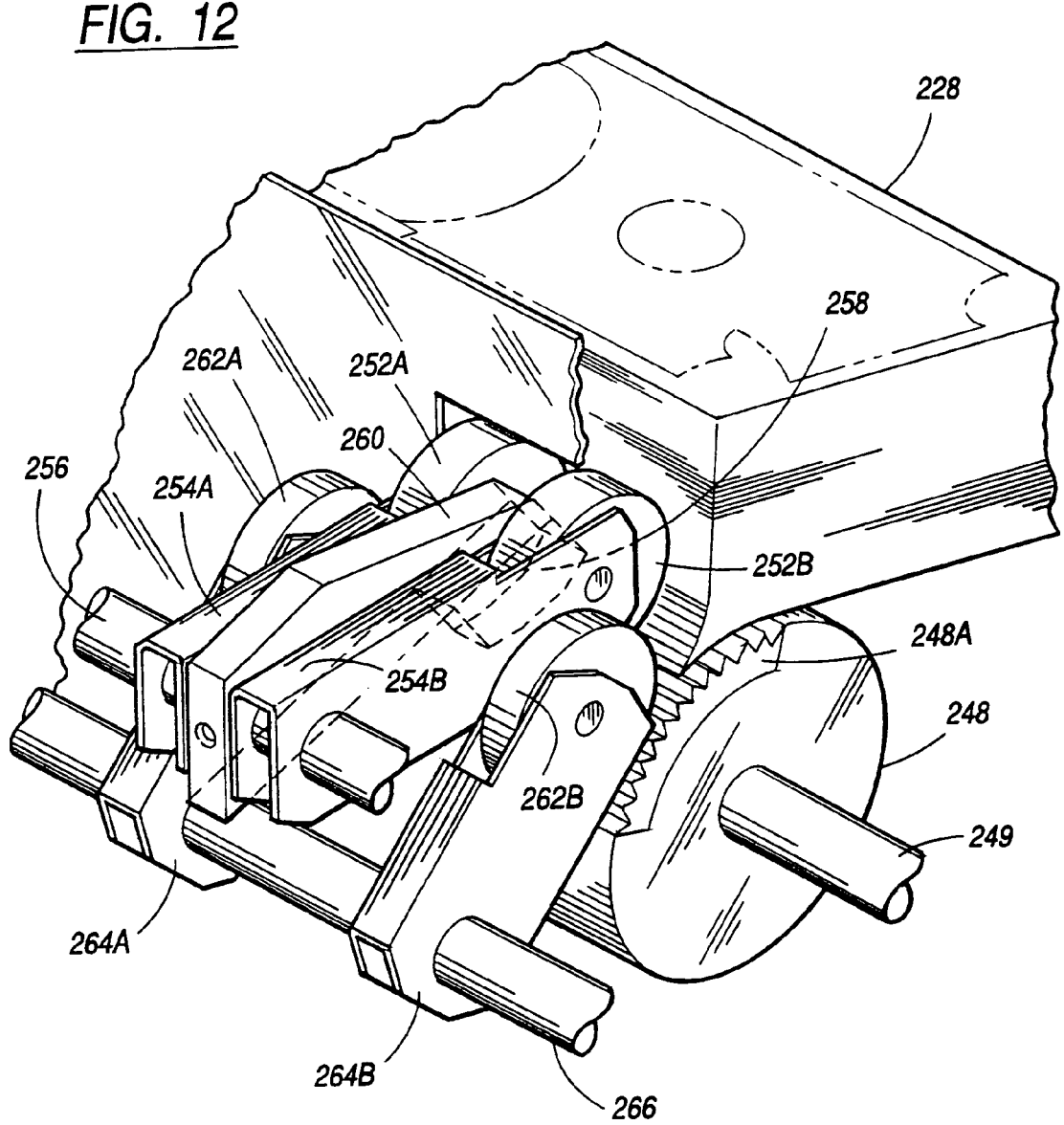
FIG. 12 is a partial perspective view illustrating the mechanism used for separating currency bills and injecting them in a sequential fashion into the transport path.
Figure 14:
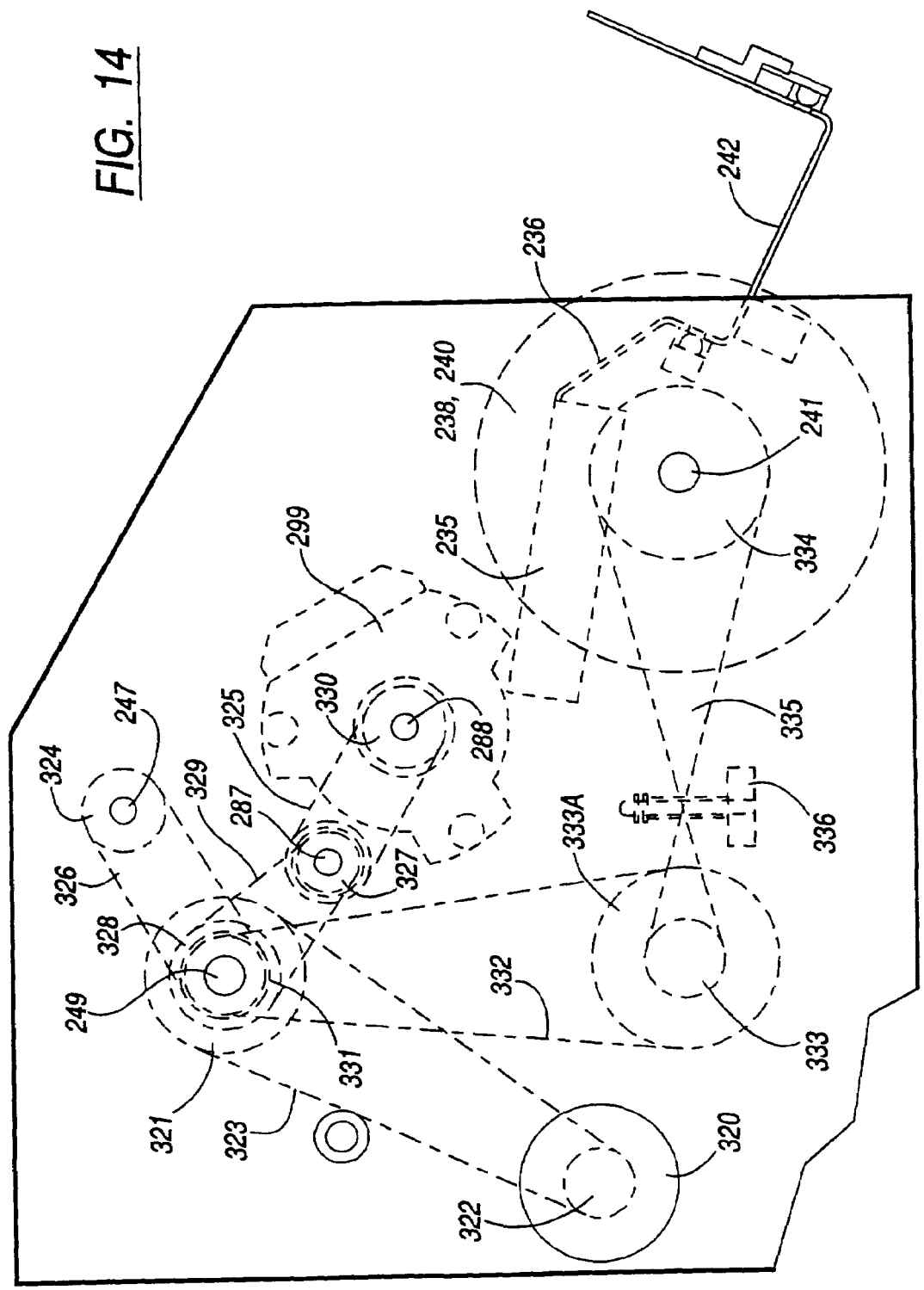
FIG. 14 is a side view of the apparatus of FIG. 11 illustrating details of the drive mechanism.
Figure 15:
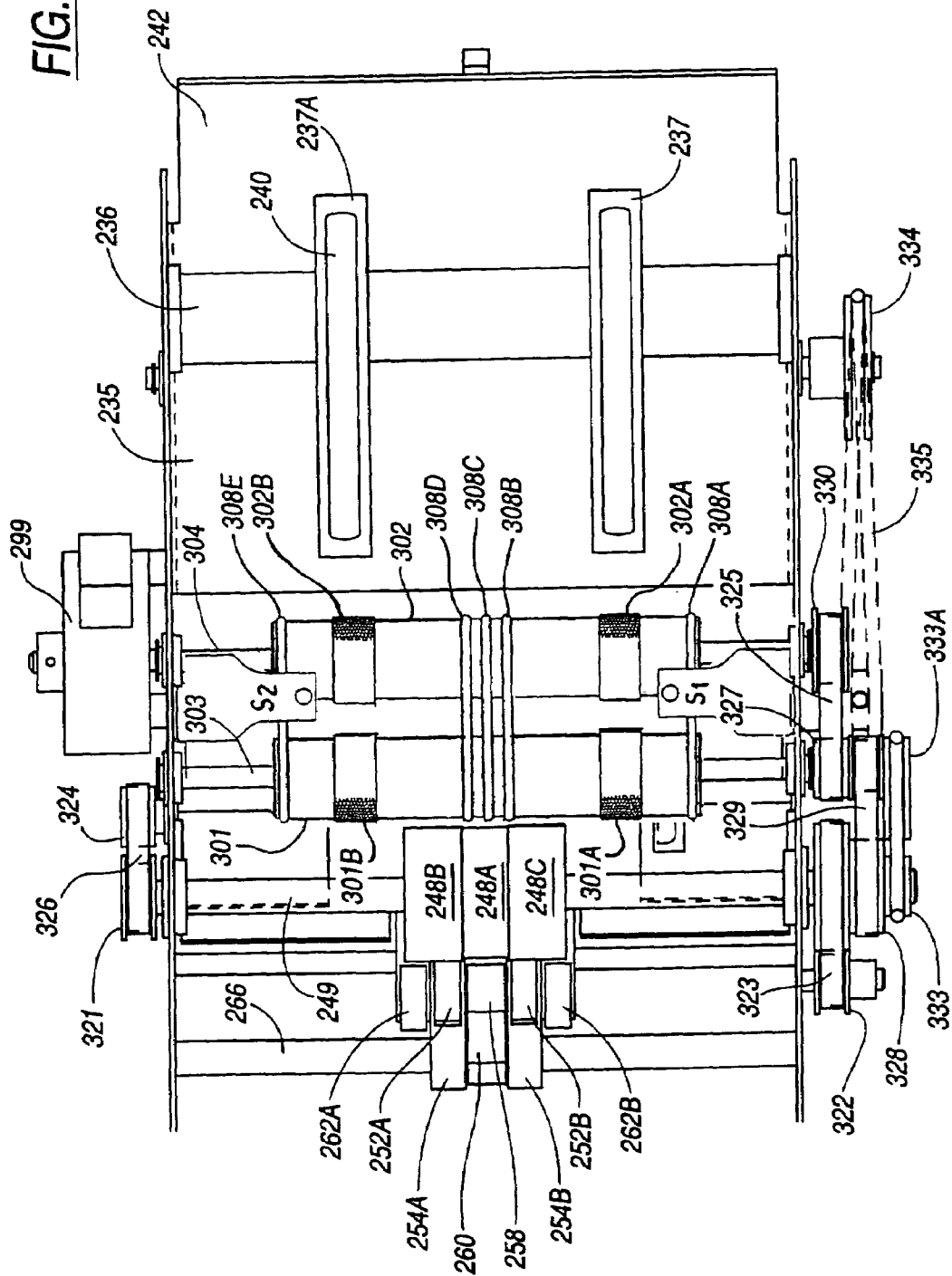
FIG. 15 is a top view of the currency discriminating and counting apparatus shown in FIGS. 11-14.

Referring now in particular to FIGS. 14 and 15, there are shown side and too views, respectively, of the document processing apparatus of FIGS. 11-13, which illustrate the mechanical arrangement for driving the various means for transporting currency bills along the three sections of the transport path. i.e. along the input path, the curved guideway and the output path. As shown therein, a motor 320 is used to impart rotational movement to the capstan shaft 249 by means of a belt/pulley arrangement comprising a pulley 321 provided on the capstan shaft 249 and which is linked to a pulley 322 provided on the motor drive shaft through a belt 323. The diameter of the driver pulley 321 is selected to be appropriately larger than that of the motor pulley 322 in order to achieve the desired speed reduction from the typically high speed at which the motor 320 operates.

The drive shaft 247 for the drive roller 246 is provided with rotary motion by means of a pulley 324 provided thereupon which is linked to a corresponding pulley 321 provided on the capstan shaft 249 through a belt 326. The pulleys 324 and 321 are of the same diameter so that the drive roller shaft 247 and, hence, the drive roller 246, rotate in unison with the capstan 248 mounted on the capstan shaft 249.

In order to impart rotational movement to the transport rollers, a pulley 327 is mounted on the transport roller shaft 287 corresponding to the first set of transport rollers and is linked to a corresponding pulley 328 on the capstan shaft 249 through a belt 329. The diameter of the transport roller pulley 327 is selected to be appropriately smaller than that of the corresponding capstan pulley 328 so as to realize a stepping-up in speed from the capstan rollers to the transport rollers. The second set of transport rollers mounted on the transport roller shaft 288 is driven at the same speed as the rollers on the first set of transport rollers by means of a pulley 330 which is linked to the transport pulley 327 by means of a belt 325.

As also shown in FIGS. 14 and 15, an optical encoder 299 is mounted on one of the transport roller shafts, preferably the passively driven transport shaft 288, for precisely tracking the lateral displacement of bills supported by the transport rollers in terms of the rotational movement of the transport shafts, as discussed in detail above in connection with the optical sensing and correlation technique of this invention.

In order to drive the stacker wheels 238 and 240, an intermediate pulley 330 is mounted on suitable support means (not shown) and is linked to a corresponding pulley 331 provided on the capstan shaft 249 through a belt 332. Because of the time required for transporting currency bills which have been stripped from the currency stack in the input bin through the tri-sectional transport path and onto the stacker platform, the speed at which the stacker wheels can rotate for delivering processed bills to the stacker plate is necessarily less than that of the capstan shaft. Accordingly, the diameter of the intermediate pulley 333a is selected to be larger than that of the corresponding capstan pulley 331 so as to realize a reduction in speed. The intermediate pulley 333a has an associated pulley 333 which is linked to a stacker pulley 334 provided on the drive shaft 241 for the stacker wheels 238, 240 by means of a belt 335. In the preferred embodiment shown in FIGS. 11-15, the stacker wheels 238, 240 rotate in the same direction as the capstan rollers. This is accomplished by arranging the belt 335 between the pulleys 333, 334 in a "Figure-8" configuration about an anchoring pin 336 disposed between the two pulleys.

The curved section 272 of the guideway 270 is provided on its underside with an optical sensor arrangement 299, including an LED 298, for performing standard currency handling operations such as counterfeit detection using conventional techniques, doubles detection, length detection, skew detection, etc. However, unlike conventional arrangements, currency discrimination according to denomination is not performed in this area, for reasons described below.

According to a feature of this invention, optical scanning of currency bills, in accordance with the above-described improved optical sensing and correlation technique, is performed by means of an optical scanhead 296 which is disposed downstream of the curved guideway 270 along the flat section 274 of the output path. More specifically, the scanhead 296 is located under the flat section of the output path between the two sets of transport rollers. The advantage of this approach is that optical scanning is performed on bills when they are maintained in a substantially flat position as a result of positive contact between the two sets of transport rollers at both ends of the bill along their narrow dimension.

It should be understood that the above-described drive arrangement is provided for illustrative purposes only. Alternate arrangements for imparting the necessary rotational movement to generate movement of currency bills along the tri-sectional transport path can be used just as effectively. It is important, however, that the surface speed of currency bills across the two sets of transport rollers be greater than the surface speed of the bills across the capstan rollers in order to achieve optimum bill separation. It is this difference in speed that generates the abrupt acceleration of currency bills as the bills come into contact with the first set of transport rollers.

The drive arrangement may also include a one-way clutch (not shown) provided on the capstan shaft and the capstan shafts, the transport roller shafts and the stacker wheel shafts may be fitted with fly-wheel arrangements (not shown). The combination of the one-way clutch and the fly wheels can be used to advantage in accelerated batch processing of currency bills by ensuring that any bills remaining in the transport path after currency discrimination are automatically pulled off the transport path into the stacker plate as a result of the inertial dynamics of the fly wheel arrangements.

As described above, implementation of the optical sensing and correlation technique of this invention requires only a relatively low number of reflectance samples in order to adequately distinguish between several currency denominations. Thus, highly accurate discrimination becomes possible even though currency bills are scanned along their narrow dimension. However, the accuracy with which a denomination is identified is based on the degree of correlation between reflectance samples on the test pattern and corresponding samples on the stored master patterns. Accordingly, it is important that currency bills be transported across the discrimination means in a flat position and, more importantly, at a uniform speed.

This is achieved in the bill handling apparatus of FIGS. 11-15, by positioning the optical scanhead 296 on one side of the flat section 274 of the output path between the two sets of transport rollers. In this area, currency bills are maintained in positive contact with the two sets of rollers, thereby ensuring that the bills move across the scanhead in a substantially flat fashion. Further, a uniform speed of bill movement is maintained in this area because the second set of passive transport rollers is driven at a speed identical to that of the active transport rollers by means of the drive connection between the two sets of rollers. Disposing the optical scanhead 296 in such a fashion downstream of the curved guideway 270 along the flat section 274 maintains a direct correspondence between reflectance samples obtained by the optically scanning of bills to be discriminated and the corresponding samples in the stored master patterns.

Figure 18:
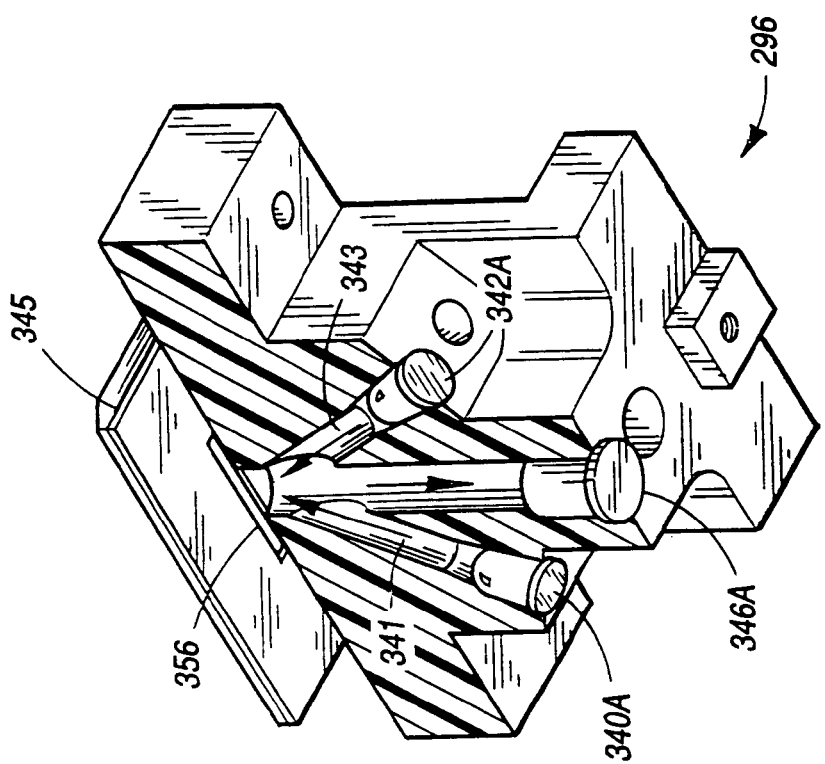
FIG. 18 is a bottom perspective view of the scanhead of FIG. 16, with the body portion of the scanhead sectioned along a vertical plane passing through the narrow slit at the top of the scanhead.
Figure 17:
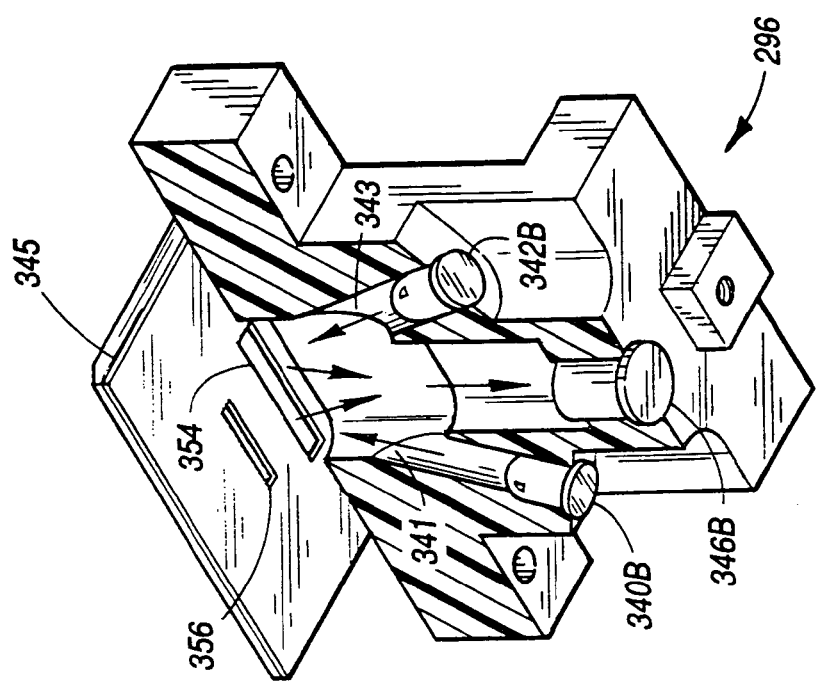
FIG. 17 is a bottom perspective view of the scanhead of FIG. 16, with the body portion of the scanhead sectioned along a vertical plane passing through the wide slit at the top of the scanhead.

According to a preferred embodiment, the Optical scanhead comprises a plurality of light sources acting in combination to uniformly illuminate light strips of the desired dimension upon currency bills positioned on the transport path below the scanhead. As illustrated in FIGS. 17-18, the scanhead 296 includes a pair of LEDs 340, 342, directing beams of lieu 341A and 343B, respectively, onto the flat section 274 of the output path against which the scanhead is positioned. The LEDs 340, 342 are angularly disposed relative to the vertical axis Y in such a way that their respective light beams combine to illuminate the desired light strip. The scanhead 296 includes a photodetector 346 centrally disposed on an axis car normal to the illuminated strip for sensing the light reflected off the strip. The photodetector 346 is linked to a central processing unit (CPU)(not shown) for processing the sensed data in accordance with the above-described principles of this invention. Preferably, the beams of light 340A, 340B from the LEDs 340, 342, respectively, are passed through an optical mask 345 in order to realize the illuminated strips of the desired dimensions.

Figure 19:
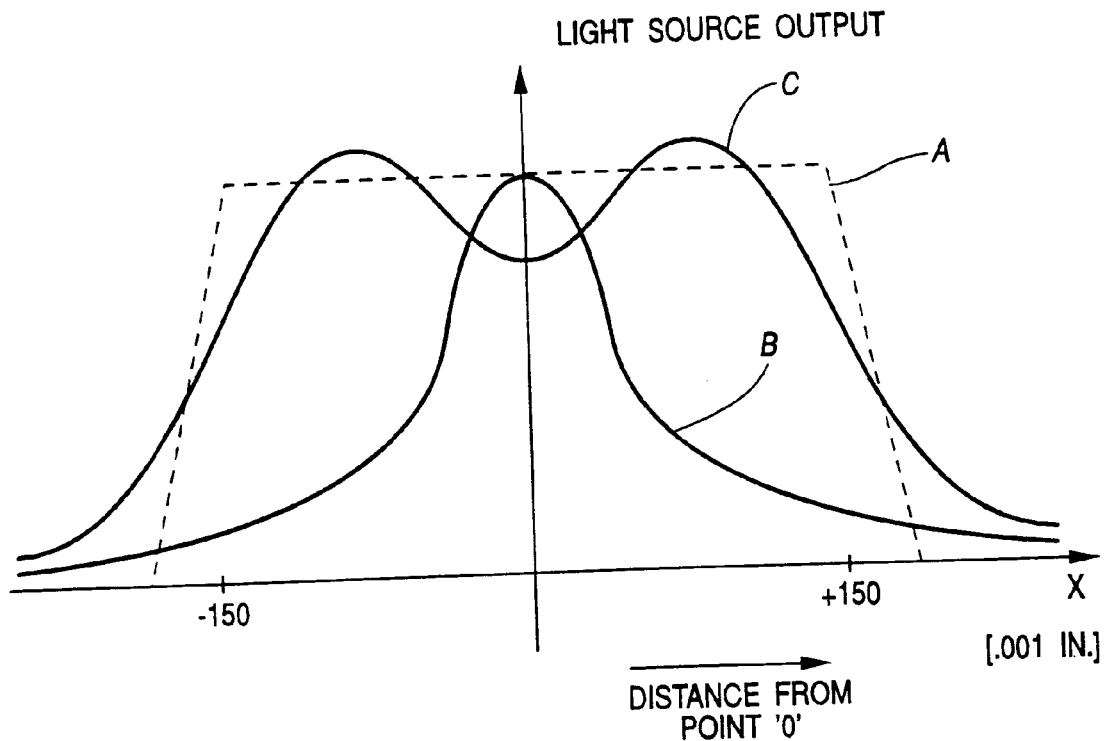
FIG. 19 is an illustration of the light distribution produced about the optical scanhead.

In order to capture reflectance samples with high accuracy, it is important that the photodetector capture reflectance data uniformly across the illuminated strip. In other words, when the photodetector 346 is positioned on an axis passing through the center of the illuminated strip, the illumination by the LED's as a function of the distance from the central point "0" along the X axis, should optimally approximate a step function as illustrated by the curve A in FIG. 19. With the use of a single light source angularly displaced relative to the vertical, the variation in illumination by an LED typically approximates a Gaussian function, as illustrated by the curve B in FIG. 19.

In accordance with a preferred embodiment, the two LEDs 340 and 342 are angularly disposed relative to the vertical axis by angles $\alpha$ and $\beta$, respectively. The angles $\alpha$ and $\beta$ are selected to be such that the resultant strip illumination by the LED's is as close as possible to the optimum distribution curve A in FIG. 19. According to a preferred embodiment, the angles $\alpha$ and $\beta$ are each selected to be 19.9 degrees. The LED illumination distribution realized by this arrangement is illustrated by the curve designated as "C" in FIG. 19 which effectively merges the individual Gaussian distributions of each light source to yield a composite distribution which sufficiently approximates the optimum curve A.

Figure 16:
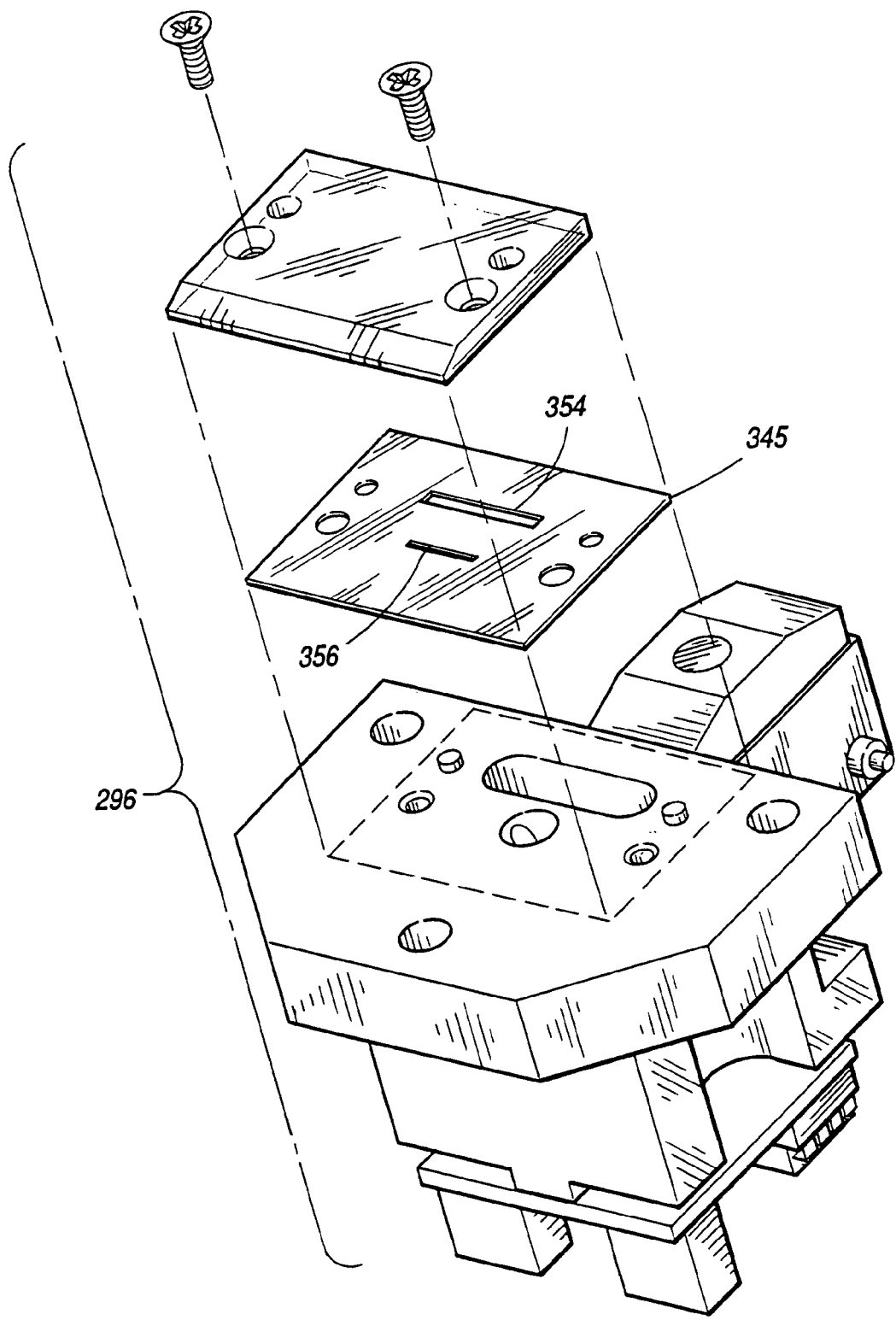
FIG. 16 is an exploded top perspective view of the optical scanhead used in the system of FIGS. 1-15.

The manner in which the plurality of light strips of different dimensions are generated by the optical scanhead by means of an optical mask is illustrated in FIGS. 16-18. As shown therein, the optical mask 345 essentially comprises a generally opaque area in which two slits 354 and 356 are formed to allow light from the light sources to pass through so as to illuminate light strips of the desired dimensions. More specifically, slit 354 corresponds to the wide strip used for obtaining the reflectance samples which correspond to the characteristic pattern for a test bill. In a preferred embodiment, the wide slit 354 has a length of about 0.500" and a width of about 0.050". The second slit 356 forms a relatively narrow illuminated strip used for detecting the thin borderline surrounding the printed indicia on currency bills, as described above in detail. In a preferred embodiment, the narrow slit 356 has a length of about 0.300" and a width of about 0.010".

It is preferred that a separate pair of light sources 340 and 342 be provided for each of the two slits 354 and 356. Thus, as can be seen in FIGS. 17 and 18, a first pair of LED'S 340A and 342A are provided for the narrow slit, and a second pair of LED's 340B and 342B are provided for the second slit. Similarly, two separate photodetectors 346A and 346B are provided for detecting reflected light from the two slits. As can be seen in FIGS. 17 and 18, the channel for transmitting reflected light from the narrow slit to the photodetector 346A is narrower in the transverse direction than the channel for transmitting reflected light from the wide slit to the photodetector 346B.

Figure 20:
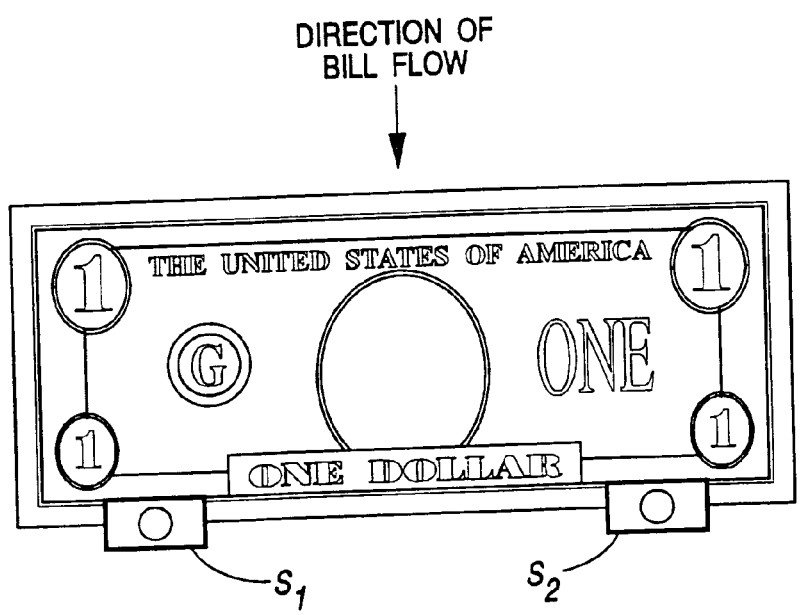
FIG. 20 is a diagrammatic illustration of the location of two auxiliary photo sensors relative to a bill passed thereover by the transport mechanism shown in FIGS. 11-15.

According to another feature of the present invention, the undesired doubling or overlapping of bills in the transport system is detected by the provision of a pair of optical sensors which are co-linearly disposed opposite to each other within the scan head area along a line that is perpendicular to the direction of bill flow, i.e. parallel to the edge of test bills along their wide dimensions as the bills are transported across the optical scan head. As best illustrated in FIG. 20, the pair of optical sensors S1 and S2 (having corresponding light sources and photodetectors which are not shown here) are co-linearly disposed within the scan head area in close parallelism with the wide dimension edges of incoming test bills. In effect, the optical sensors S1 and S2 are disposed opposite each other along a line within the scan head area which is perpendicular to the direction of bill flow.

It should be noted that FIGS. 11, 13 and 15 also include an illustration of the physical disposition of the sensors S1 and S2 within the optical scanhead area of the currency recognition and counting apparatus. For purposes of clarity, the sensors S1 and S2 are represented only in the form of blocks which correspond to the light sources associated with the sensors. Although not illustrated in the drawings, it should be noted that corresponding photodetectors (not shown) are provided within the scanhead area in immediate opposition to the corresponding light sources and underneath the flat section of the transport path. These detectors detect the beam of coherent light directed downwardly onto the bill transport path from the light sources corresponding to the sensors S1 and S2 and generate an analog output which corresponds to the sensed light. Each such output is converted into a digital signal by a conventional ADC convertor unit (not shown) whose output is fed as a digital input to and processed by the system CPU (not shown), in a manner similar to that indicated in the arrangement of FIG. 1.

The presence of a bill which passes under the sensors S1 and S2 causes a change in the intensity of the detected light, and the corresponding change in the analog output of the detectors serves as a convenient means for density-based measurements for detecting the presence of "doubles" (two or more overlaid or overlapped bills) during the currency recognition and counting process. For instance, the sensors may be used to collect a predefined number of density measurements on a test bill, and the average density value for a bill may be compared to predetermined density thresholds (based, for instance, on standardized density readings for aster bills) to determine the presence of overlaid bills or doubles.

Figure 21:
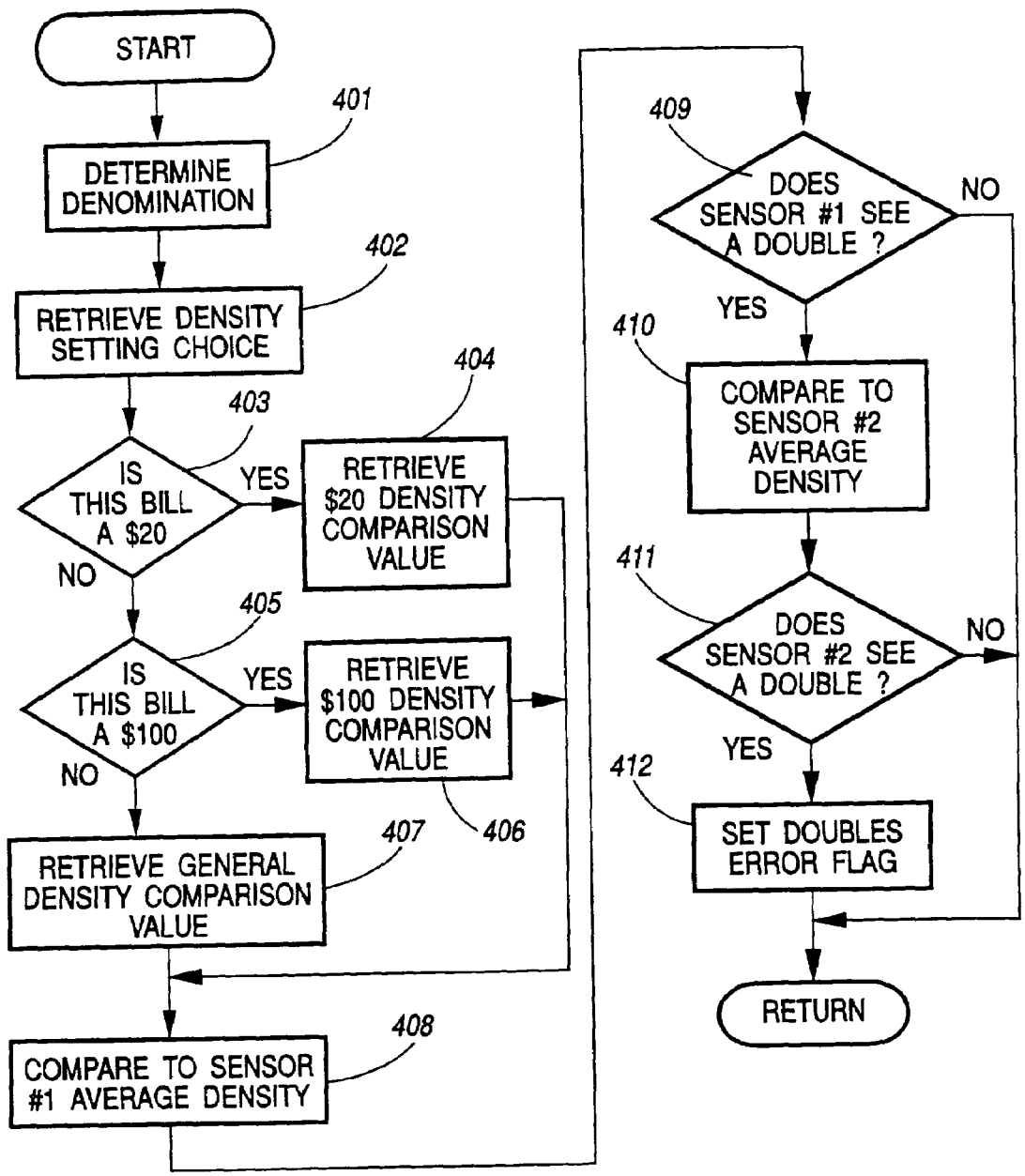
FIGS. 21-23 are flow charts illustrating the sequence of operations involved in various enhancements to the operating program for the basic optical sensing and correlation process.

A routine for using the outputs of the two sensors S1 and S2 to detect any doubling or overlapping of bills is illustrated in FIG. 21. This routine starts when the denomination of a scanned bill has been determined at step 401, as described previously. To permit variations in the sensitivity of the density measurement, a "density setting choice" is retrieved from memory at step 402. The operator makes this choice manually, according to whether the bills being scanned are new bills, requiring only a high degree of sensitivity, or used bills, requiring a lower level of sensitivity. After the "density setting choice" has been retrieved, the system then proceeds through a series of steps which establish a density comparison value according to the denomination of the bill. Thus, step 403 determines whether the bill has been identified as a $20-bill, and if the answer is affirmative, the $20-bill density comparison value is retrieved from memory at step 404. A negative answer at step 403 advances the system to step 405 to determine whether the bill has been identified as a $100-bill, and if the answer is affirmative, the $100-bill density comparison value is retrieved from memory at step 406. A negative answer at step 405 advances the system to step 407 where a general density comparison value, for all remaining bill denominations, is retrieved from memory.

At step 408, the density comparison value retrieved at step 404, 406 or 407 is compared to the average density represented by the output of sensor S1. The result of this comparison is evaluated at step 409 to determine whether the output of sensor S1 identifies a doubling of bills for the particular denomination of bill determined at step 401. If the answer is negative, the system returns to the main program. If the answer is affirmative, step 410 then compares the retrieved density comparison value to the average density represented by the output of the second sensor S2. The result of this comparison is evaluated at step 401 to determine whether the output of sensor S2 identifies a doubling of bills. Affirmative answers at both step 409 and step 411 results in the setting of a "doubles error" flag at step 412, and the system then returns to the main program. The "doubles error" flag can, of course, be used to stop the bill transport motor.

Figure 22:
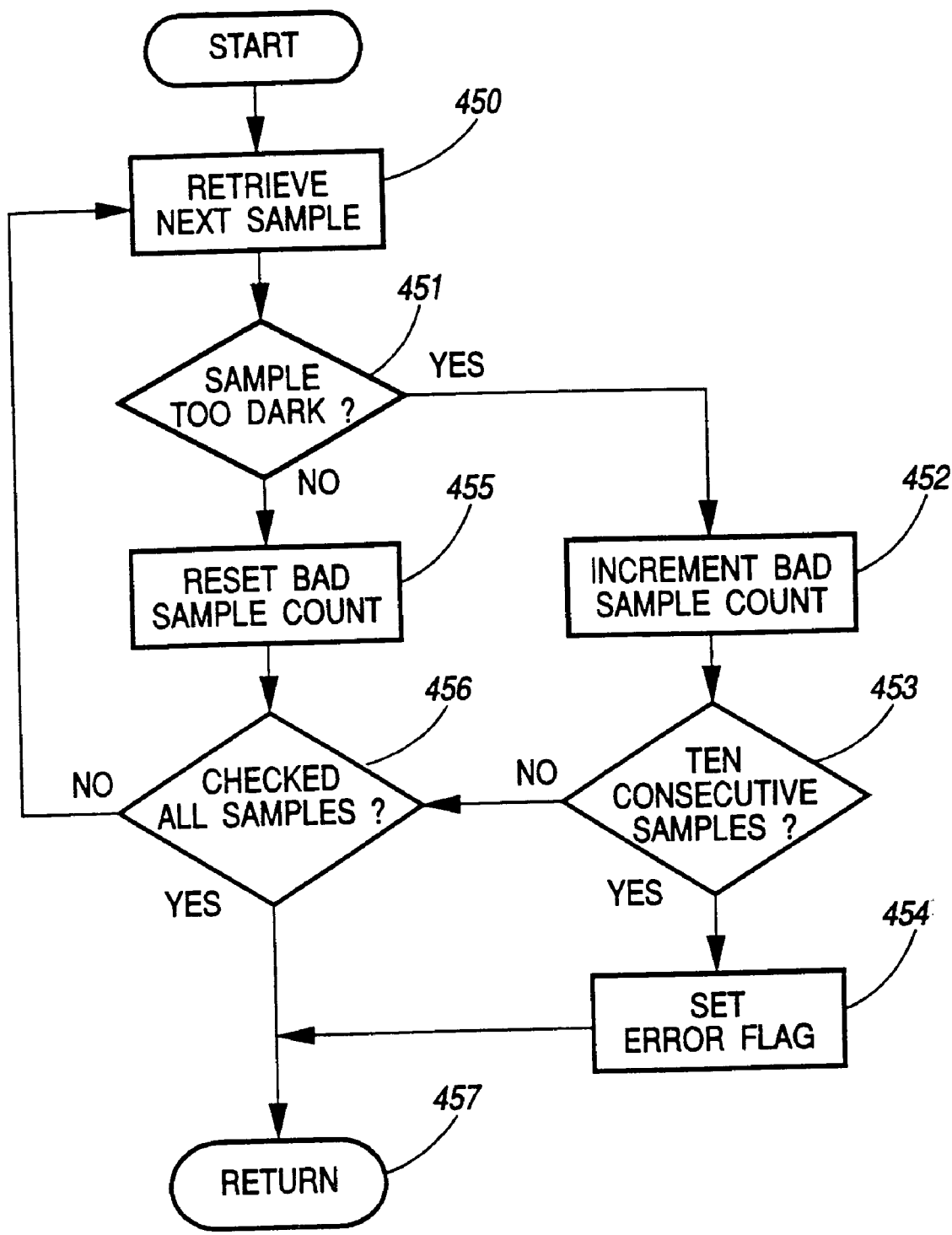

FIG. 22 illustrates a routine that enables the system to detect bills which have been badly defaced by dark marks such as ink blotches, felt-tip pen marks and the like. Such severe defacing of a bill can result in such distorted scan data that the data can be interpreted to indicate the wrong denomination for the bill. Consequently, it is desirable to detect such severely defaced bills and then stop the bill transport mechanism so that the bill in question can be examined by the operator.

The routine of FIG. 22 retrieves each successive data sample at step 450 and then advances to step 451 to determine whether that sample is too dark. As described above, the output voltage from the photodetector 26 decreases as the darkness of the scanned area increases. Thus, the lower the output voltage from the photodetector, the darker the scanned area. For the evaluation carried out at step 451, a preselected threshold level for the photodetector output voltage, such as a threshold level of about 1 volt, is used to designate a sample that is "too dark."

An affirmative answer at step 453 advances the system to step 452 where a "bad sample" count is incremented by one. A single sample that is too dark is not enough to designate the bill as seriously defaced. Thus, the "bad sample" count is used to determine when a preselected number of consecutive samples, e.g., ten consecutive samples, are determined to be too dark. From step 452, the system advances to step 453 to determine whether ten consecutive bad samples have been received. If the answer is affirmative, the system advances to step 454 where an error flag is set. This represents a "no call" condition, which causes the bill transport system to be stopped in the same manner discussed above in connection with FIG. 8A.

When a negative response is obtained at step 451, the system advances to step 455 where the "bad sample" count is reset to zero, so that this count always represents the number of consecutive bad samples received. From step 455 the system advances to step 456 which determines when all the samples for a given bill have been checked. As long as step 456 yields a negative answer, the system continues to retrieve successive samples at step 450. When an affirmative answer is produced at step 456, the system returns to the main program at step 457.

Figure 23:
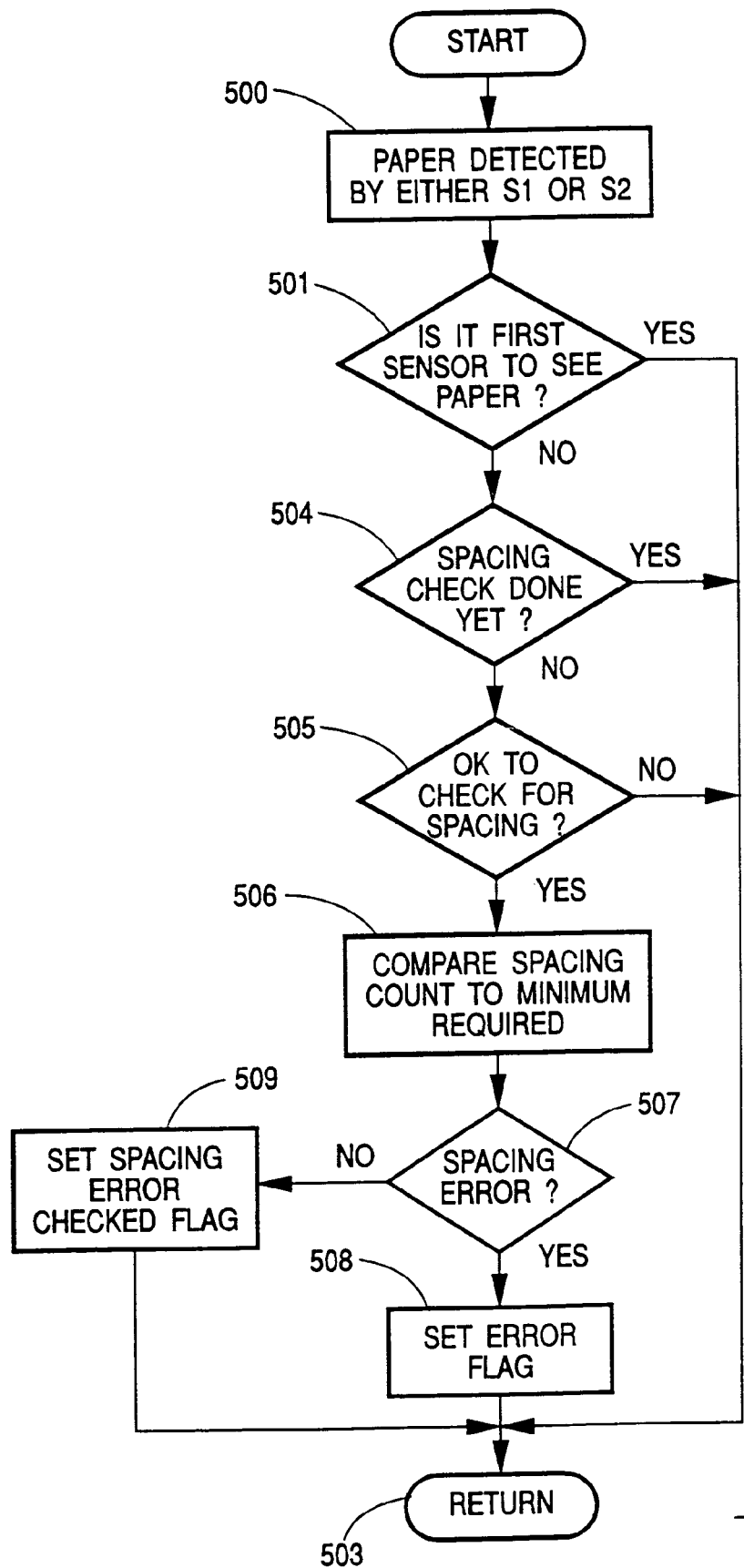

It is desirable to maintain a predetermined space between each pair of successive bills to facilitate the resetting of the scanning system between the trailing edge of the scanned area on one bill and the leading borderline on the next bill. The routine for performing this spacing check is illustrated in FIG. 23. This routine begins with step 500, which checks the output signals from the sensors S1 and S2 to determine when the leading edge of a bill is detected by either sensor. The detection of a predetermined change in the output from either sensor S1 or S2 advances the system to step 501, which determines whether the detected output change is from the first sensor to see the leading edge of a bill. If the answer is affirmative the system returns to the main program at step 503. A negative response at step 501 advances the system to step 504 to determine whether the spacing check is done yet. If the answer is "yes," the system returns to the main program. If the answer is "no," step 505 determines whether a spacing check is to be performed, based on whether the first bill in a new stack of bills placed in the CRU has been detected. That is, there is no need to initiate a spacing check until the first bill reaches the sensors S1 and S2. Thus, a negative answer at step 505 returns the system to the main program, while an affirmative answer advances the system to step 506 which compares the actual spacing count, i.e., the number of encoder pulses produced after detection of the leading edge of the bill, to a preselected minimum spacing count retrieved from memory. If the actual spacing count is above the preselected minimum, there is no error and consequently the next step 507 yields a negative response, indicating that there is no spacing error. Thi negative response sets a "spacing error checked" flag at step 509. If the actual spacing count is below the preselected minimum, step 509 detects a spacing error and consequently produces an affirmative response which sets an error flag at step 508. The system then returns to the main program at step 503. It is this flag that is read at step 504.

Figure 24:
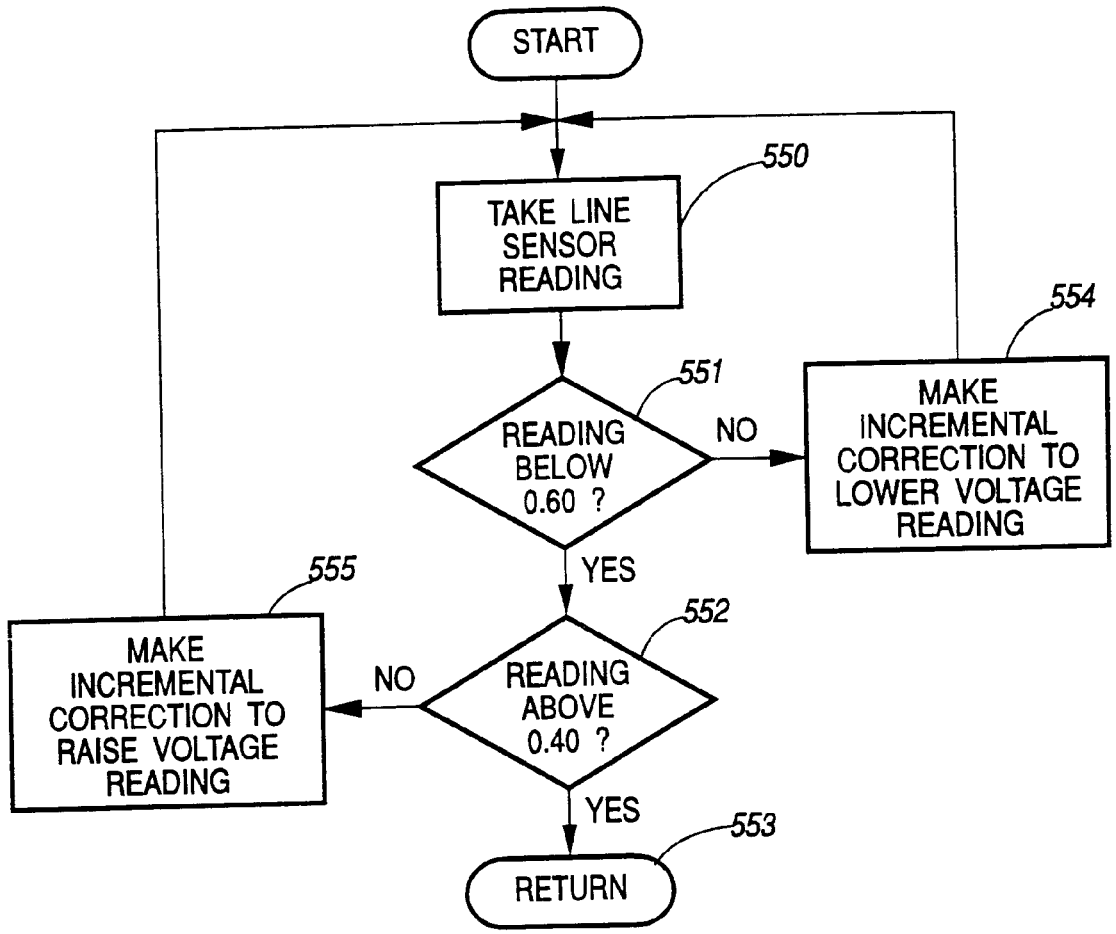
FIG. 24 is a flow chart illustrating a routine for monitoring and correcting various line voltages.

A routine for automatically monitoring and making any necessary corrections in various line voltages is illustrated in FIG. 24. This routine is useful in automatically compensating for voltage drifts due to temperature changes, aging of components and the like. The routine stars at step 550 which reads the output of a line sensor which is monitoring a selected voltage. Step 551 determines whether the reading is below 0.60, and if the answer is affirmative, step 552 determines whether the reading is above 0.40. If step 552 also produces an affirmative response, the voltage is within the required range and thus the system returns to the main program step 553. If step 551 produces a negative response, an incremental correction is made at step 554 to reduce the voltage in an attempt to return it to the desired range. Similarly, if a negative response is obtained at step 552, an incremental correction is made at step 555 to increase the voltage toward the desired range.

The invention claimed is:

1. A U.S. currency processing device for receiving a stack of U.S. currency bills and rapidly processing all the bills in the stack, the device comprising:
   an input receptacle positioned to receive a stack of U.S. bills;
   at least one output receptacle positioned to receive bills, only one of the at least one output receptacle being an output receptacle for receiving denominated bills;
   a transport mechanism comprising a transport drive motor and transport rollers, the transport mechanism being configured to transport the bills, one at a time, from the input receptacle to the at least one output receptacle along a transport path; and
   a denomination discriminating unit comprising a detector positioned along the transport path between the input receptacle and the at least one output receptacle and comprising a processor, the detector generating a characteristic information output signal in response to detected characteristic information, the characteristic information output signal being electrically coupled to the processor, the processor receiving the characteristic information output signal and generating a denomination signal, the discriminating unit being configured to denominate and count bills of a plurality of U.S. denominations;
   wherein the device is configured to deliver any bill that has been denominated to the one and only one of the at least one output receptacle including bills of a plurality of U.S. denominations; and
   wherein the device is configured (a) to halt the transport mechanism when the denomination of a bill is not determined by the denomination discriminating unit and (b) to permit the transport mechanism to be restarted after being halted while maintaining a cumulative value of bills in the stack which have been denominated and delivered to the denominated bill output receptacle.

2. The currency processing device of claim 1 further comprising means for halting the transport mechanism when the denomination of a bill is not determined by the denomination discriminating unit.

3. The currency processing device of claim 2 wherein the means for halting causes the transport mechanism to halt with the bill whose denomination has not been determined being the last bill transported to the one and only one of the at least one output receptacle.

4. The device of claim 1 wherein the device is configured to deliver to the one and only one of the at least one output receptacle (a) all bills that the device has denominated and (b) at least some bills that the device has not denominated and which remain undenominated when delivered to the output receptacle.

5. The currency processing device of claim 4 further comprising means for halting the transport mechanism when the denomination of a bill is not determined by the denomination discriminating unit.

6. The currency processing device of claim 5 wherein the means for halting causes the transport mechanism to halt with the bill whose denomination has not been determined being the last bill transported to the one and only one of the at least one output receptacle.

7. The device of claim 1 further comprising a stacking wheel comprising flexible blades positioned to restack bills that have been denominated in the one and only one of the at least one output receptacle.

8. The device of claim 1 wherein the detector is positioned to receive light reflected off passing bills, the detector generating a reflected light characteristic information output signal in response to detected characteristic information, the reflected light characteristic information output signal being electrically coupled to the processor, the processor receiving the reflected light characteristic information output signal and generating the denomination signal in response thereto.

9. The device of claim 1 wherein the detector is positioned to receive light reflected off passing bills, the detector generating a reflected light characteristic information output signal in response to detected characteristic information, the reflected light characteristic information output signal being electrically coupled to the processor, the processor receiving the reflected light characteristic information output signal and generating the denomination signal in response thereto.

10. The device of claim 1 wherein the transport mechanism is configured to transport bills and the denomination discriminating unit is configured to denominate bills at a rate in excess of about 800 bills per minute.

11. The U.S. currency processing device of claim 1 wherein the bills having edges;
the one and only one of the at least one output receptacle being a single denominated bill output receptacle, the single denominated bill output receptacle having a stacking mechanism comprising flexible blades positioned to restack bills that have been denominated; and
wherein the device is configured to restack bills that have been denominated on their edges in a stack in the single denominated bill output receptacle.

12. The device of claim 11 wherein the device is configured to deliver to the single denominated bill output receptacle (a) all bills that the device has denominated and (b) at least some bills that the device has not denominated and which remain undenominated when delivered to the output receptacle.

13. A system comprising the device of claim 11 and a printer coupled thereto and wherein the printer is configured to print the total value of denominated bills delivered to the single denominated bill output receptacle and the number of denominated bills of each of the plurality of denominations delivered to the single denominated bill output receptacle.

14. The device of claim 1 wherein the discriminating unit is adapted to denominate bills of the plurality of denominations including bills of different denominations having the same size.

15. The device of claim 1 wherein the discriminating unit is adapted to denominate bills independently of the size of the bills.

16. The device of claim 1 wherein each bill is rectangular and has a wide dimension and a narrow dimension and wherein the transport mechanism is adapted to transport bills in a transport direction with their narrow dimension parallel to the transport direction.

17. The device of claim 16 wherein the transport mechanism is adapted to transport and the denomination discriminating unit is adapted to determine the denomination of bills at a rate in excess of about 800 bills per minute.

18. The U.S. currency processing device of claim 1 wherein the at least one output receptacle comprises one and only one stacker wheel containing output receptacle positioned to receive bills after processing.

19. A U.S. currency processing device for receiving a stack of U.S. currency bills and rapidly processing all the bills in the stack, the device comprising:
an input receptacle positioned to receive a stack of U.S. bills;
at least one output receptacle positioned to receive bills after processing, only one of the at least one output receptacle being a denominated bill output receptacle;
a transport mechanism comprising a transport drive motor and transport rollers, the transport mechanism being configured to transport the bills, one at a time, from the input receptacle to the at least one output receptacle along a transport path; and
a denomination discriminating unit comprising a detector positioned along the transport path between the input receptacle and the at least one output receptacle and comprising a processor, the detector generating a characteristic information output signal in response to detected characteristic information, the characteristic information output signal being electrically coupled to the processor, the processor receiving and processing the characteristic information output signal and generating denomination signals, the discriminating unit being configured to denominate bills of a plurality of U.S. denominations; and
a memory storing a cumulative value of the bills that have been denominated;
wherein the device is configured to deliver all bills which have been denominated to the denominated bill output receptacle including bills of a plurality of U.S. denominations;
wherein the device is configured (a) to automatically halt the transport mechanism when the denomination of a bill is not determined by the denomination discriminating unit and (b) to permit the transport mechanism to be re-started while maintaining said cumulative value and the processing of said characteristic information output signal for bills following the bill for which the denomination could not be determined.

20. The U.S. currency processing device of claim 19 which includes an authenticating unit for determining the genuineness of the bills, and wherein the device is configured to automatically halt the transport mechanism when a bill is determined to be a potentially non-genuine bill by the authenticating unit and (b) to permit the transport mechanism to be re-started while maintaining the cumulative value and the processing of the characteristic information output signal for bills following the bill determined to be a potentially non-genuine bill.

21. The currency processing device of claim 19 wherein the device at least one output receptacle comprises one and only one output receptacle.

22. The currency processing device of claim 19 wherein the device is configured to halt the transport mechanism when the denomination of the bill is not determined by the denomination discriminating unit the bill whose denomination has not been determined being the last bill transported to one of the at least one output receptacle.

23. The device of claim 19 wherein each bill is rectangular and has a wide dimension and a narrow dimension and wherein the transport mechanism is adapted to transport bills in a transport direction with their narrow dimension parallel to the transport direction.

24. The device of claim 23 wherein the transport mechanism is adapted to transport and the denomination discriminating unit is adapted to determine the denomination of bills at a rate in excess of about 800 bills per minute.

25. The device of claim 19 wherein the transport mechanism is adapted to transport and the denomination discriminating unit is adapted to determine the denomination of bills at a rate in excess of about 800 bills per minute.

26. A U.S. currency processing device for receiving a stack of U.S. currency bills and rapidly processing all the bills in the stack, the device comprising:
an input receptacle positioned to receive a stack of U.S. bills;
at least one output receptacle positioned to receive bills after processing, only one of the at least one output receptacle being a denominated bill output receptacle;
a transport mechanism comprising a transport drive motor and transport rollers, the transport mechanism being configured to transport the bills, one at a time, from the input receptacle to the at least one output receptacle along a transport path;
a denomination discriminating unit comprising a detector positioned along the transport path between the input receptacle and the at least one output receptacle and comprising a processor, the detector generating a characteristic information output signal in response to detected characteristic information, the characteristic information output signal being electrically coupled to the processor, the processor receiving the characteristic information output signal and generating a denomination signal, the discriminating unit being configured to denominate and count bills of a plurality of U.S. denominations; and a memory storing one or more counts associated with bills in the stack which have been denominated;

wherein the device is configured to deliver all bills which have been denominated to the denominated bill output receptacle including bills of a plurality of U.S. denominations; and wherein the device is configured (a) to automatically halt the transport mechanism when the denomination of a bill is not determined by the denomination discriminating unit and then (b) to be restarted after being halted without any disruption of the one or more counts.

27. The U.S. currency processing device of claim 26 wherein the device is configured to deliver to the denominated bill output receptacle (a) all bills that the device has denominated and (b) at least some bills that the device has not denominated and which remain undenominated when delivered to the output receptacle.

28. The U.S. currency processing device of claim 26 wherein the bills have edges, and further comprising a stacking mechanism comprising flexible blades positioned to restack bills that have been denominated vertically on their edges in the denominated bill output receptacle.

29. The device of claim 26 wherein the discriminating unit is adapted to denominate bills independently of the size of the bills.

30. The device of claim 26 wherein each bill is rectangular and has a wide dimension and a narrow dimension and wherein the transport mechanism is adapted to transport bills in a transport direction with their narrow dimension parallel to the transport direction.

31. The device of claim 30 wherein the transport mechanism is adapted to transport and the denomination discriminating unit is adapted to determine the denomination of bills at a rate in excess of about 800 bills per minute.

32. The device of claim 26 further comprising a display and a housing, the housing containing the input and output receptacles and the transport mechanism, wherein the display is affixed to the housing and wherein the display is positioned between the input receptacle and the at least one output receptacle.

33. The device of claim 26 wherein the detector is positioned to receive light reflected off passing bills and the detector is adapted to generate a reflected light characteristic information output signal in response to detected characteristic information, the reflected light characteristic information output signal being electrically coupled to the processor, the processor receiving the reflected light characteristic information output signal and generating the denomination signal in response thereto.

34. A system comprising the device of claim 26 and a printer coupled thereto and wherein the printer is configured to print the total value of denominated bills delivered to the denominated bill output receptacle and the number of denominated bills of each of the plurality of denominations delivered to the denominated bill output receptacle.

35. The device of claim 26 further comprising a display adapted to communicate the total value of denominated bills delivered to the denominated bill output receptacle and the number of denominated bills of each of the plurality of denominations delivered to the denominated bill output receptacle.

36. The device of claim 26 further comprising a housing, the housing containing the input and output receptacles and the transport mechanism, wherein the display is affixed to the housing and wherein the display is positioned between the input receptacle and the at least one output receptacle.

37. A U.S. currency processing device for receiving a stack of U.S. currency bills and rapidly processing all the bills in the stack, the device comprising:

an input receptacle positioned to receive a stack of U.S. bills having a plurality of U.S. denominations;

a single denominated bill output receptacle;

a transport mechanism comprising a transport drive motor and transport rollers, the transport mechanism being adapted to transport the bills, one at a time, from the input receptacle to the denominated bill output receptacle along a transport path;

a denomination discriminating unit comprising a detector positioned along the transport path between the input receptacle and the output receptacle and comprising a processor, the detector generating a characteristic information output signal in response to detected characteristic information, the characteristic information output signal being electrically coupled to the processor, the processor receiving the characteristic information output signal and generating a denomination signal, the discriminating unit being configured to denominate bills of a plurality of U.S. denominations; and a processor programmed to determine an aggregate total of the amount of denominated bills received in denominated bill output receptacle;

wherein the device is configured to deliver all bills that have been denominated, including bills of a plurality of U.S. denominations, to the single denominated bill output receptacle, the single denominated bill output receptacle being the only output receptacle configured to receive bills that have been denominated; and wherein the device is configured (a) to automatically halt the transport mechanism when the denomination of the bill is not determined by the denomination discriminating unit and then (b) to be restarted after being halted, including restarting the transport mechanism, without any disruption of the aggregate total.

38. The device of claim 37 wherein the device is configured to deliver to the single denominated bill output receptacle (a) all bills that the device has denominated and (b) at least some bills that the device has not denominated and which remain undenominated when delivered to the output receptacle.

39. The device of claim 37 wherein the discriminating unit is adapted to denominate bills independently of the size of the bills.

40. The device of claim 37 wherein each bill is rectangular and has a wide dimension and a narrow dimension and wherein the transport mechanism is adapted to transport bills in a transport direction with their narrow dimension parallel to the transport direction.

41. The device of claim 40 wherein the transport mechanism is adapted to transport and the denomination discriminating unit is adapted to determine the denomination of bills at a rate in excess of about 800 bills per minute.

42. The device of claim 41 wherein the transport mechanism does not employ a vacuum.

43. The device of claim 40 wherein the transport mechanism is adapted to transport and the denomination discriminating unit is adapted to determine the denomination of bills at a rate in excess of about 1000 bills per minute.

44. The device of claim 43 wherein the transport mechanism does not employ a vacuum.

45. A system comprising the device of claim 37 and a printer coupled thereto and wherein the printer is configured to print the total value of denominated bills delivered to the denominated bill output receptacle and the number of denominated bills of each of the plurality of denominations delivered to the denominated bill output receptacle.

46. The device of claim 37 further comprising a display adapted to communicate the total value of denominated bills delivered to the denominated bill output receptacle and the number of denominated bills of each of the plurality of denominations delivered to the denominated bill output receptacle.

47. The device of claim 46 further comprising a housing, the housing containing the input and output receptacles and the transport mechanism, wherein the display is affixed to the housing and wherein the display is positioned between the input receptacle and the output receptacle.

48. The device of claim 46 wherein each bill is rectangular and has a wide dimension and a narrow dimension and wherein the transport mechanism is adapted to transport bills in a transport direction with their narrow dimension parallel to the transport direction.

49. The device of claim 48 wherein the transport mechanism is adapted to transport and the denomination discriminating unit is adapted to determine the denomination of bills at a rate in excess of about 800 bills per minute.

50. The device of claim 49 wherein the transport mechanism does not employ a vacuum.

51. The device of claim 48 wherein the transport mechanism is adapted to transport and the denomination discriminating unit is adapted to determine the denomination of bills at a rate in excess of about 1000 bills per minute.

52. The device of claim 51 wherein the transport mechanism does not employ a vacuum.

53. The device of claim 37 further comprising a display and a housing, the housing containing the input and output receptacles and the transport mechanism, wherein the display is affixed to the housing and wherein the display is positioned between the input receptacle and the output receptacle.

54. The device of claim 37 wherein the detector is positioned to receive light reflected off passing bills and the detector generates a reflected light characteristic information output signal in response to detected characteristic information.

55. A U.S. currency processing device for receiving a stack of U.S. currency bills including bills of a plurality of U.S. denominations and rapidly processing all the bills in the stack, the device comprising:
an input receptacle positioned to receive a stack of U.S. bills including bills of a plurality of U.S. denominations;
at least one output receptacle positioned to receive bills after processing, one and only one of the at least one output receptacle being configured to receive denominated bills;
a transport mechanism comprising a transport drive motor and transport rollers, the transport mechanism being adapted to transport the bills, one at a time, from the input receptacle to the at least one output receptacle along a transport path; and
a denomination discriminating unit comprising a detector positioned along the transport path between the input receptacle and the output receptacle and comprising a processor, the detector generating a characteristic information output signal in response to detected characteristic information, the characteristic information output signal being electrically coupled to the processor, the processor receiving and processing the characteristic information output signal and generating denomination signals, the discriminating unit being adapted to denominate and total bills of a plurality of U.S. denominations;
wherein the device is configured to deliver any bill that has been denominated and totaled to the one and only one of the at least one output receptacle including bills of a plurality of U.S. denominations.

56. The device of claim 55 further comprising a memory storing a cumulative value of the bills that have been denominated; and
wherein the device is configured (a) to automatically halt the transport mechanism when the denomination of a bill is not determined by the denomination discriminating unit and (b) to permit the transport mechanism to be re-started while maintaining the cumulative value and the processing of the characteristic information output signal for bills following the bill for which the denomination could not be determined.

57. The U.S. currency processing device of claim 56 which includes an authenticating unit for determining the genuineness of said bills, and wherein the device is configured to automatically halt the transport mechanism when a bill is determined to be a potentially non-genuine bill by the authenticating unit and (b) to permit the transport mechanism to be re-started while maintaining the cumulative value and the processing of the characteristic information output signal for bills following the bill determined to be a potentially non-genuine bill.

58. The device of claim 55 wherein the device is the discriminating unit is configured to denominate and count bills of a plurality of U.S. denominations;
wherein the device is configured (a) to halt the transport mechanism when the denomination of a bill is not determined by the denomination discriminating unit and (b) to permit the transport mechanism to be restarted after being halted while maintaining a cumulative value of bills in the stack which have been denominated and delivered to the one and only one of the at least one output receptacle.

59. The device of claim 55 further comprising a memory storing one or more counts associated with bills in the stack which have been denominated;
wherein the discriminating unit is configured to denominate and count bills of a plurality of U.S. denominations; and
wherein the device is configured (a) to automatically halt the transport mechanism when the denomination of a bill is not determined by the denomination discriminating unit and then (b) to be restarted after being halted without any disruption of the one or more counts.

60. The device of claim 55 comprising a processor programmed to determine an aggregate total of the amount of denominated bills received in the one and only one of the at least one output receptacle;
wherein the device is configured (a) to automatically halt the transport mechanism when the denomination of the bill is not determined by the denomination discriminating unit and then (b) to be restarted after being halted, including restarting the transport mechanism, without any disruption of the aggregate total.

61. The device of claim 55 wherein the device is configured to deliver to the one and only one of the at least one output receptacle (a) all bills that the device has denominated and (b) at least some bills that the device has not denominated and which remain undenominated when delivered to the output receptacle.

62. The device of claim 55 wherein the bills having edges and wherein the output receptacle to which any denominated bill is delivered comprises a stacker wheel and wherein the device is adapted to receive bills of a plurality of U.S. denominations in the input receptacle and transport bills of a plurality of U.S. denominations to the stacker wheel containing output receptacle and to stack any bill that has been denominated in the stacker wheel containing output receptacle vertically on an edge of the bill.

63. The device of claim 55 wherein bills of at least two of the plurality of denominations have the same size and the discriminating unit is adapted to denominate bills of the plurality of denominations including bills of different denominations having the same size.

64. The device of claim 55 wherein the discriminating unit is adapted to denominate bills independently of the size of the bills.

65. The device of claim 55 wherein each bill is rectangular and has a wide dimension and a narrow dimension and wherein the transport mechanism is adapted to transport bills in a transport direction with their narrow dimension parallel to the transport direction.

66. The device of claim 65 wherein the transport mechanism is adapted to transport and the denomination discriminating unit is adapted to determine the denomination of bills at a rate in excess of about 800 bills per minute.

67. A system comprising the device of claim 55 and a printer coupled thereto and wherein the device is configured to receive and denominate bills of a plurality of U.S. denominations and transport bills of a plurality of U.S. denominations to the one and only one of the at least one output receptacle, and wherein the printer is configured to print the total value of denominated bills delivered to the one and only one of the at least one output receptacle and the number of denominated bills of each of the plurality of denominations delivered to the one and only one of the at least one output receptacle.

68. The device of claim 55 wherein the device is adapted to receive and denominate bills of a plurality of U.S. denominations and transport bills of a plurality of U.S. denominations to the one and only one of the at least one output receptacle, the device further comprising a display adapted to communicate the total value of denominated bills delivered to the one and only one of the at least one output receptacle and the number of denominated bills of each of the plurality of denominations delivered to the one and only one of the at least one output receptacle.

69. The device of claim 68 further comprising a housing, the housing containing the input and output receptacles and the transport mechanism, wherein the display is affixed to the housing and wherein the display is positioned between the input receptacle and the output receptacle.

70. The device of claim 55 further comprising a display and a housing, the housing containing the input and output receptacles and the transport mechanism, wherein the display is affixed to the housing and wherein the display is positioned between the input receptacle and the output receptacle.

71. The device of claim 55 wherein the detector is positioned to receive light reflected off passing bills and the detector is adapted to generate a reflected light characteristic information output signal in response to detected characteristic information, the reflected light characteristic information output signal being electrically coupled to the processor, the processor receiving the reflected light characteristic information output signal and generating the denomination signal in response thereto.

72. A high-speed U.S. currency processing device for receiving a stack of U.S. currency bills and rapidly processing all the bills in the stack, the device comprising:

an input receptacle positioned to receive a stack of U.S. bills to be processed;

at least one output receptacle positioned to receive bills after processing, a single one of the at least one output receptacle for receiving all denominated bills;

a transport mechanism comprising a transport drive motor and transport rollers, the transport mechanism being adapted to transport the bills, one at a time, from the input receptacle to the output receptacle along a transport path, the transport mechanism being adapted to transport bills at a rate in excess of about 800 bills per minute; and a denomination discriminating unit comprising a detector positioned along the transport path between the input receptacle and the output receptacle and comprising a processor, the detector generating a characteristic information output signal in response to detected characteristic information, the characteristic information output signal being electrically coupled to the processor, the processor receiving the characteristic information output signal and generating a denomination signal in response thereto, the discriminating unit being adapted to denominate and total bills of a plurality of U.S. denominations at a rate in excess of about 800 bills per minute;

wherein the device is configured to deliver any bill that has been denominated and totaled to the single output receptacle for receiving all denominated bills.

73. The device of claim 72 further comprising a memory storing a cumulative value of the bills that have been denominated and delivered to the single output receptacle for receiving all denominated bills; and wherein the device is configured (a) to automatically halt the transport mechanism when the denomination of a bill is not determined by the denomination discriminating unit and (b) to permit the transport mechanism to be re-started while maintaining the cumulative value and the processing of the characteristic information output signal for bills following the bill for which the denomination could not be determined.

74. The U.S. currency processing device of claim 72 further comprising a memory storing a cumulative value of the bills that have been denominated and delivered to the single output receptacle for receiving all denominated bills; and an authenticating unit for determining the genuineness of said bills; and wherein the device is configured to automatically halt the transport mechanism when a bill is determined to be a potentially non-genuine bill by the authenticating unit and (b) to permit the transport mechanism to be re-started while maintaining the cumulative value and the processing of the characteristic information output signal for bills following the bill determined to be a potentially non-genuine bill.

75. The device of claim 72 wherein the device is the discriminating unit is configured to denominate and count bills of a plurality of U.S. denominations;

wherein the device is configured (a) to halt the transport mechanism when the denomination of a bill is not determined by the denomination discriminating unit and (b) to permit the transport mechanism to be restarted after being halted while maintaining a cumulative value of bills in the stack which have been denominated and delivered to the single output receptacle for receiving all denominated bills.

76. The device of claim 72 further comprising a memory storing one or more counts associated with bills in the stack which have been denominated;
wherein the discriminating unit is configured to denominate and count bills of a plurality of U.S. denominations; and
wherein the device is configured (a) to automatically halt the transport mechanism when the denomination of a bill is not determined by the denomination discriminating unit and then (b) to be restarted after being halted without any disruption of the one or more counts.

77. The device of claim 72 comprising a processor programmed to determine an aggregate total of the amount of denominated bills received in the single output receptacle for receiving all denominated bills;
wherein the device is configured (a) to automatically halt the transport mechanism when the denomination of the bill is not determined by the denomination discriminating unit and then (b) to be restarted after being halted, including restarting the transport mechanism, without any disruption of the aggregate total.

78. The device of claim 72 wherein the device is configured to deliver to the one and only one of the at least one output receptacle (a) all bills that the device has denominated and (b) at least some bills that the device has not denominated and which remain undenominated when delivered to the output receptacle.

79. The currency evaluation device of claim 72 wherein bills of at least two of the plurality of denominations have the same size and the discriminating unit is adapted to denominate bills of the plurality of denominations including bills of different denominations having the same size.

80. The currency evaluation device of claim 72 wherein the discriminating unit is adapted to denominate bills independently of the size of the bills.

81. The currency evaluation device of claim 72 wherein each bill is rectangular and has a wide dimension and a narrow dimension and wherein the transport mechanism is adapted to transport bills in a transport direction with their narrow dimension parallel to the transport direction.

82. The currency evaluation device of claim 72 wherein the device is adapted to receive bills of a plurality of U.S. denominations in the input receptacle and transport bills of a plurality of U.S. denominations to the one and only one of the at least one output receptacle.

83. The currency evaluation device of claim 82 wherein the detector is positioned to receive light reflected off passing bills and the detector is adapted to generate a reflected light characteristic information output signal in response to detected characteristic information, the reflected light characteristic information output signal being electrically coupled to the processor, the processor receiving the reflected light characteristic information output signal and generating the denomination signal in response thereto.

84. A system comprising the device of claim 82 and a printer coupled thereto and wherein the printer is configured to print the total value of denominated bills delivered to the one and only one of the at least one output receptacle and the number of denominated bills of each of the plurality of denominations delivered to the one and only one of the at least one output receptacle.

85. The device of claim 82 further comprising a display adapted to communicate the total value of denominated bills delivered to the one and only one of the at least one output receptacle and the number of denominated bills of each of the plurality of denominations delivered to the one and only one of the at least one output receptacle.

86. The device of claim 85 further comprising a housing, the housing containing the input and output receptacles and the transport mechanism, wherein the display is affixed to the housing and wherein the display is positioned between the input receptacle and the at least one output receptacle.

87. The device of claim 82 further comprising a display and a housing, the housing containing the input and output receptacles and the transport mechanism, wherein the display is positioned between the input receptacle and the at least one output receptacle.

88. A U.S. currency processing device for receiving a stack of U.S. currency bills and rapidly processing all the bills in the stack, the device comprising:
an input receptacle positioned to receive a stack of U.S. bills including bills of a plurality of U.S. denominations, each bill being rectangular and having a wide dimension and a narrow dimension;
a single denominated bill output receptacle positioned to receive bills after processing;
a stacking mechanism comprising flexible blades positioned to restack bills that have been denominated in the denominated bill output receptacle, the denominated bill output receptacle being the only output receptacle having a stacking mechanism comprising flexible blades associated therewith;
a transport mechanism comprising a transport drive motor and transport rollers, the transport mechanism being adapted to transport the bills, one at a time, from the input receptacle to the denominated bill output receptacle along a transport path in a transport direction, the transport mechanism being adapted to transport bills with their narrow dimension parallel to the transport direction; and
a denomination discriminating unit comprising a detector positioned along the transport path between the input receptacle and the output receptacle and comprising a processor, the detector generating a characteristic information output signal in response to detected characteristic information, the characteristic information output signal being electrically coupled to the processor, the processor receiving the characteristic information output signal and generating a denomination signal in response thereto, the discriminating unit being adapted to denominate bills of a plurality of U.S. denominations;
wherein the device is configured such that after processing the entire stack of bills, the denominated bill output receptacle includes denominated bills of a plurality of U.S. denominations.

89. The device of claim 88 wherein the device is configured to deliver to the denominated bill output receptacle (a) all bills that the device has denominated and (b) at least some bills that the device has not denominated and which remain undenominated when delivered to the output receptacle.

90. The device of claim 88 wherein the discriminating unit is adapted to denominate bills independently of the size of the bills.

91. The device of claim 88 wherein the transport mechanism is adapted to transport and the denomination discriminating unit is adapted to determine the denomination of bills of a plurality of U.S. denominations at a rate in excess of about 800 bills per minute.

92. A system comprising the device of claim 88 and a printer coupled thereto and wherein the printer is configured to print the total value of denominated bills delivered to the denominated bill output receptacle and the number of bills of each of the plurality of denominations delivered to the denominated bill output receptacle.

93. The device of claim 88 wherein the device is adapted to receive and denominate bills of a plurality of denominations and further comprising a display adapted to communicate the total value of denominated bills delivered to the denominated bill output receptacle and the number of denominated bills of each of the plurality of denominations delivered to the denominated bill output receptacle.

94. The device of claim 93 further comprising a housing, the housing containing the input and output receptacles and the transport mechanism, wherein the display is affixed to the housing and wherein the display is positioned between the input receptacle and the output receptacle.

95. The device of claim 88 further comprising a display and a housing, the housing containing the input and output receptacles and the transport mechanism, wherein the display is affixed to the housing and wherein the display is positioned between the input receptacle and the output receptacle.

96. The device of claim 88 wherein the detector is positioned to receive light reflected off passing bills and the detector is adapted to generate a reflected light characteristic information output signal in response to detected characteristic information, the reflected light characteristic information output signal being electrically coupled to the processor, the processor receiving the reflected light characteristic information output signal and generating the denomination signal in response thereto.

97. A high-speed U.S. currency processing device for receiving a stack of U.S. currency bills and rapidly processing all the bills in the stack, the device comprising:
   an input receptacle positioned to receive a stack of U.S. bills;
   one and only one stacker wheel containing output receptacle positioned to receive denominated bills after processing and form a stack of U.S. bills;
   a transport mechanism comprising a transport drive motor and transport rollers, the transport mechanism being adapted to transport the bills, one at a time, from the input receptacle to the output receptacle along a transport path, the transport mechanism being adapted to transport bills at a rate in excess of about 800 bills per minute; and
   a denomination discriminating unit comprising a detector positioned along the transport path between the input receptacle and the output receptacle and comprising a processor, the detector generating a characteristic information output signal in response to detected characteristic information, the characteristic information output signal being electrically coupled to the processor, the processor receiving the characteristic information output signal and generating a denomination signal, the discriminating unit being adapted to denominate bills of a plurality of U.S. denominations at a rate in excess of about 800 bills per minute.

98. The device of claim 97 wherein the device is configured to deliver to the one and only one stacker wheel containing output receptacle (a) all bills that the device has denominated and (b) at least some bills that the device has not denominated and which remain undenominated when delivered to the output receptacle.

99. The device of claim 97 wherein bills of at least two of the plurality of denominations have the same size and the discriminating unit is adapted to denominate bills of the plurality of denominations including bills of different denominations having the same size.

100. The device of claim 97 wherein the discriminating unit is adapted to denominate bills independently of the size of the bills.

101. The device of claim 97 wherein each bill is rectangular and has a wide dimension and a narrow dimension and wherein the transport mechanism is adapted to transport bills in a transport direction with their narrow dimension parallel to the transport direction.

102. A system comprising the device of claim 97 and a printer coupled thereto and wherein the device is configured to send any denominated bill to the stacker wheel containing output receptacle and wherein the printer is configured to print the total value of denominated bills delivered to the stacker wheel containing output receptacle and the number of denominated bills of each of the plurality of denominations delivered to the stacker wheel containing output receptacle.

103. The device of claim 97 wherein the device is adapted to receive and denominate bills of a plurality of denominations and further comprising a display adapted to communicate the total value of denominated bills delivered to the stacker wheel containing output receptacle and the number of denominated bills of each of the plurality of denominations delivered to the stacker wheel containing output receptacle.

104. The device of claim 97 further comprising a housing, the housing containing the input and output receptacles and the transport mechanism, wherein the display is affixed to the housing and wherein the display is positioned between the input receptacle and the output receptacle.

105. The device of claim 97 further comprising a display and a housing, the housing containing the input and output receptacles and the transport mechanism, wherein the display is affixed to the housing wherein the display is positioned between the input and the output receptacle.

106. The device of claim 97 wherein the device is adapted to receive bills of a plurality of denominations in the input receptacle and transport denominated bills of a plurality of denominations to the stacker wheel containing output receptacle.

107. The device of claim 106 wherein the detector is positioned to receive light reflected off passing bills and the detector is adapted to generate a reflected light characteristic information output signal in response to detected characteristic information, the reflected light characteristic information output signal being electrically coupled to the processor, the processor receiving the reflected light characteristic information output signal and generating the denomination signal in response thereto.

108. The device of claim 97 wherein the detector is positioned to receive light reflected off passing bills and the detector is adapted to generate a reflected light characteristic information output signal in response to detected characteristic information, the reflected light characteristic information output signal being electrically coupled to the processor, the processor receiving the reflected light characteristic information output signal and generating the denomination signal in response thereto.

109. The device of claim 97 wherein the stacker wheel comprises flexible blades.

110. A system comprising the device of claim 97 and a printer coupled thereto and wherein the printer is configured to print the total value of denominated bills delivered to the stacker wheel containing output receptacle and the number of denominated bills of each of the plurality of denominations delivered to the stacker wheel containing output receptacle.

* * * * *

US007672499C1

(12) EX PARTE REEXAMINATION CERTIFICATE (9423rd)

United States Patent
Raterman et al.

(10) Number: US 7,672,499 C1
(45) Certificate Issued: Nov. 26, 2012

(54) METHOD AND APPARATUS FOR CURRENCY DISCRIMINATION AND COUNTING

(75) Inventors: Donald R. Raterman, Deerfield, IL (US); Bradford T. Graves, Arlington Heights, IL (US); Lars R. Stromme, Arlington Heights, IL (US); Aaron M. Bauch, Boxborrow, MA (US)

(73) Assignee: Cummins-Allison Corp., Mt. Prospect, IL (US)

Reexamination Request:
No. 90/011,719, Jun. 11, 2011

Reexamination Certificate for:
Patent No.: 7,672,499
Issued: Mar. 2, 2010
Appl. No.: 10/163,757
Filed: Jun. 6, 2002

Related U.S. Application Data

(63) Continuation of application No. 09/453,200, filed on Dec. 2, 1999, now Pat. No. 6,459,806, which is a continuation of application No. 08/841,203, filed on Apr. 29, 1997, now Pat. No. 6,028,951, which is a continuation of application No. 08/339,337, filed on Nov. 14, 1994, now Pat. No. 5,692,067, which is a continuation of application No. 08/127,334, filed on Sep. 27, 1993, now Pat. No. 5,467,405, which is a continuation of application No. 07/885,648, filed on May 19, 1992, now Pat. No. 5,295,196, which is a continuation-in-part of application No. 07/475,111, filed on Feb. 5, 1990, now abandoned.

(51) Int. Cl.
*G06K 9/00* (2006.01)
*G06K 7/10* (2006.01)
(52) U.S. Cl. .................................. 382/135; 382/321

(58) Field of Classification Search .................. None
See application file for complete search history.

(56) References Cited

To view the complete listing of prior art documents cited during the proceeding for Reexamination Control Number 90/011,719, please refer to the USPTO's public Patent Application Information Retrieval (PAIR) system under the Display References tab.

*Primary Examiner* — Yuzhen Ge

(57) ABSTRACT

A U.S. currency evaluation device for receiving a stack of U.S. currency bills and rapidly evaluating all the bills in the stack. According to one embodiment the device comprises an input receptacle positioned to receive a stack of bills to be evaluated and at least one output receptacle positioned to receive bills after evaluation. A transport mechanism transports the bills, one at a time, from the input receptacle to the at least one output receptacle. The device also comprises a denomination discriminating unit adapted to denominate bills of a plurality of U.S. denominations. According to some embodiments, the device is adapted to deliver any bill that has been denominated to one and only one of the at least one output receptacle. According to some embodiments, the device has a single output receptacle.

At the time of issuance and publication of this certificate, the patent remains subject to pending reexamination control number 95/001,419 filed Aug. 27, 2010. The claim content of the patent may be subsequently revised if a reexamination certificate issues from the reexamination proceeding.

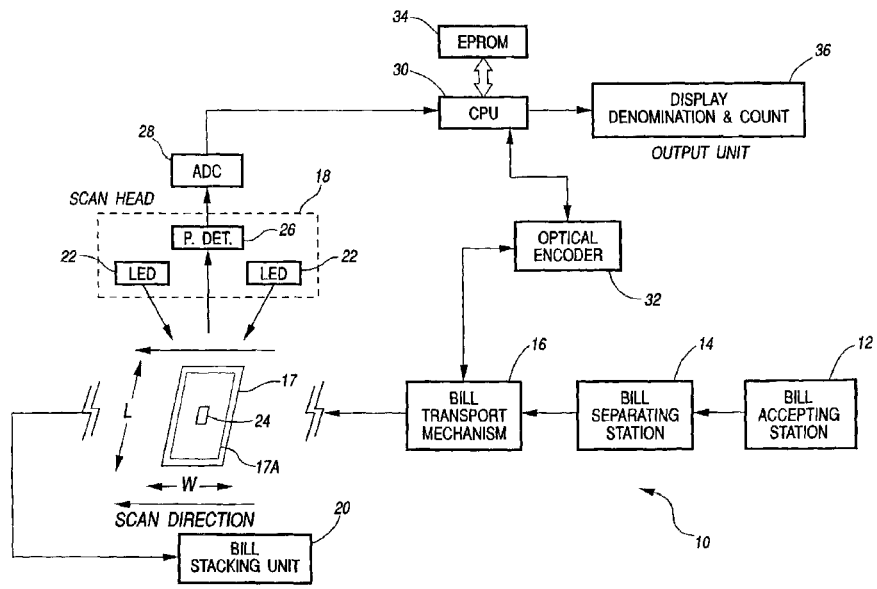

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 1-25, 27-36, 38-54, 56-71, 73-87, 89-96 and 98-110 is confirmed.

Claims 26, 37, 55, 72, 88 and 97 are cancelled.

* * * * *

INTER PARTES REEXAMINATION CERTIFICATE (869th)
United States Patent
Raterman et al.

(10) Number: US 7,672,499 C2
(45) Certificate Issued: May 5, 2014

(54) METHOD AND APPARATUS FOR CURRENCY DISCRIMINATION AND COUNTING

(75) Inventors: Donald R. Raterman, Deerfield, IL (US); Bradford T. Graves, Arlington Heights, IL (US); Lars R. Stromme, Arlington Heights, IL (US); Aaron M. Bauch, Boxborrow, MA (US)

(73) Assignee: Cummins-Allison Corp., Mt. Prospect, IL (US)

Reexamination Request:
No. 95/001,419, Aug. 27, 2010

Reexamination Certificate for:
Patent No.: 7,672,499
Issued: Mar. 2, 2010
Appl. No.: 10/163,757
Filed: Jun. 6, 2002

Reexamination Certificate C1 7,672,499 issued Nov. 26, 2012

Related U.S. Application Data

(63) Continuation of application No. 09/453,200, filed on Dec. 2, 1999, now Pat. No. 6,459,806, which is a continuation of application No. 08/841,203, filed on Apr. 29, 1997, now Pat. No. 6,028,951, which is a continuation of application No. 08/339,337, filed on Nov. 14, 1994, now Pat. No. 5,692,067, which is a continuation of application No. 08/127,334, filed on Sep. 27, 1993, now Pat. No. 5,467,405, which is a continuation of application No. 07/885,648, filed on May 19, 1992, now Pat. No. 5,295,196, which is a continuation-in-part of application No. 07/475,111, filed on Feb. 5, 1990, now abandoned.

(51) Int. Cl.
*G06K 9/00* (2006.01)
*G06K 7/10* (2006.01)

(52) U.S. Cl.
USPC .......................................... 382/135; 382/321

(58) Field of Classification Search
None
See application file for complete search history.

(56) References Cited

To view the complete listing of prior art documents cited during the proceeding for Reexamination Control Number 95/001,419, please refer to the USPTO's public Patent Application Information Retrieval (PAIR) system under the Display References tab.

*Primary Examiner* — Colin Larose

(57) ABSTRACT

A U.S. currency evaluation device for receiving a stack of U.S. currency bills and rapidly evaluating all the bills in the stack. According to one embodiment the device comprises an input receptacle positioned to receive a stack of bills to be evaluated and at least one output receptacle positioned to receive bills after evaluation. A transport mechanism transports the bills, one at a time, from the input receptacle to the at least one output receptacle. The device also comprises a denomination discriminating unit adapted to denominate bills of a plurality of U.S. denominations. According to some embodiments, the device is adapted to deliver any bill that has been denominated to one and only one of the at least one output receptacle. According to some embodiments, the device has a single output receptacle.

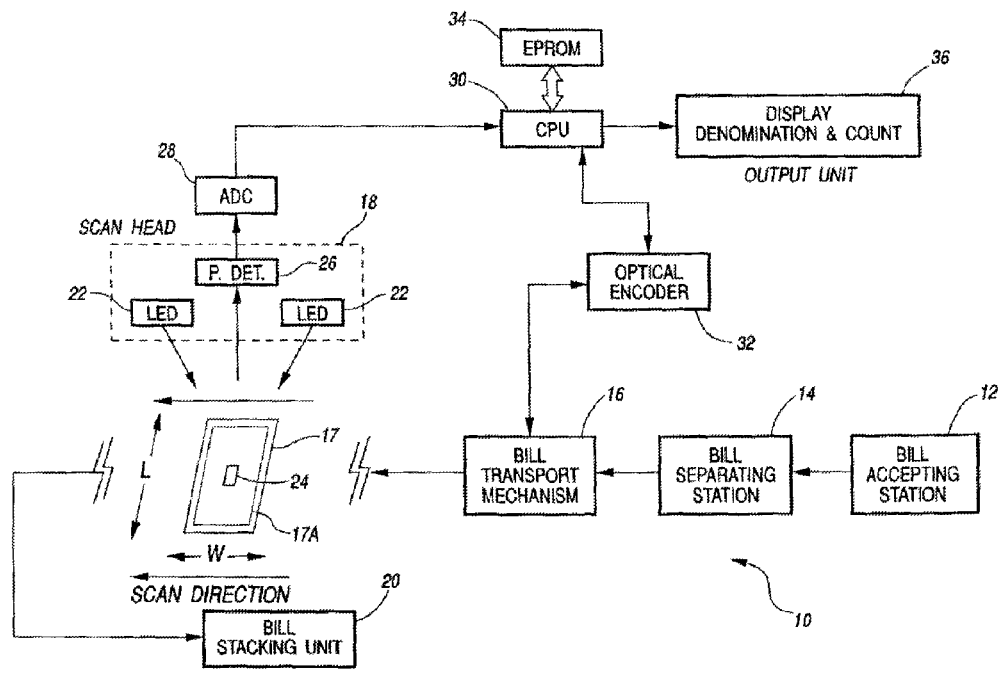

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

The patentability of claims 10, 17, 24, 25, 31, 41, 42, 49, 50, 52, 66, 73-87, 91 and 98-110 is confirmed.

Claims 26, 37, 55, 72, 88 and 97 were previously cancelled.

Claims 1-9, 11-16, 18-23, 27-30, 32-36, 38-40, 43-48, 51, 53, 54, 56-65, 67-71, 89, 90 and 92-96 are cancelled.

* * * * *